(12) United States Patent
Shimura

(10) Patent No.: US 11,923,878 B2
(45) Date of Patent: *Mar. 5, 2024

(54) WIRELESS SIGNAL PROCESSING CIRCUIT AND WIRELESS DEVICE

(71) Applicant: FUJITSU LIMITED, Kawasaki (JP)

(72) Inventor: Toshihiro Shimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,527

(22) Filed: Feb. 10, 2022

(65) Prior Publication Data

US 2022/0345160 A1 Oct. 27, 2022

(30) Foreign Application Priority Data

Apr. 26, 2021 (JP) ................................ 2021-074442

(51) Int. Cl.
*H04B 1/00* (2006.01)
*H04B 1/04* (2006.01)
*H04B 1/30* (2006.01)

(52) U.S. Cl.
CPC ......... *H04B 1/0064* (2013.01); *H04B 1/0032* (2013.01); *H04B 1/04* (2013.01);
(Continued)

(58) Field of Classification Search
CPC ...... H04B 1/0032; H04B 1/0064; H04B 1/04; H04B 1/0483; H04B 1/30; H04B 1/40;
(Continued)

(56) References Cited

U.S. PATENT DOCUMENTS 10,673,475 B1* 6/2020 Zhuo .................... H04B 7/0617
10,854,945 B2* 12/2020 Zhu ........................... H01P 5/18
(Continued)

FOREIGN PATENT DOCUMENTS

CN 1167299 C 9/2004
CN 101207235 B 10/2011
(Continued)

OTHER PUBLICATIONS

The Extended European Search Report dated Aug. 9, 2022, issued in counterpart EP Application No. 22154385.3. (9 pages).
(Continued)

*Primary Examiner* — Nguyen T Vo
(74) *Attorney, Agent, or Firm* — WHDA, LLP

(57) ABSTRACT

A wireless signal processing circuit includes plural phase switchers, plural variable amplifiers and plural mixers. The plural phase switchers are provided on each of plural paths along which all in-phase signal and a quadrature signal are distributed. The plural phase switchers rotate the phases of the signals by signal phase rotation amounts according to a transmission direction of a transmission signal. The plural variable amplifiers alter amplitudes of input signals or output signals of the corresponding phase switchers in accordance with the transmission direction of the transmission signal. The plural mixers up-convert frequencies of the signals processed by the corresponding phase switchers and variable amplifiers.

16 Claims, 32 Drawing Sheets

(52) U.S. Cl.
CPC ....... *H04B 1/30* (2013.01); *H04B 2001/0408* (2013.01); *H04B 2001/0491* (2013.01); *H04B 2001/307* (2013.01)

(58) Field of Classification Search
CPC .... H04B 2001/0408; H04B 2001/0491; H04B 2001/307; H04B 7/0617; H04B 7/086
See application file for complete search history.

(56) References Cited

U.S. PATENT DOCUMENTS

| | | | |
|---|---|---|---|
| 11,469,501 | B2 | 10/2022 | Tang et al. |
| 2002/0000937 | A1 | 1/2002 | Kozakai |
| 2002/0057219 | A1 | 5/2002 | Obayashi |
| 2012/0121043 | A1 | 5/2012 | Wambacq |
| 2012/0280861 | A1* | 11/2012 | Kishimoto ........... H04B 7/0408 342/368 |
| 2017/0288762 | A1* | 10/2017 | Miyanaga ............. G01S 7/4008 |
| 2017/0365925 | A1 | 12/2017 | Jian et al. |
| 2019/0028153 | A1 | 1/2019 | Suyama et al. |
| 2020/0169332 | A1* | 5/2020 | Tervo .................... H04B 17/12 |

FOREIGN PATENT DOCUMENTS

| | | |
|---|---|---|
| EP | 3764563 A1 | 1/2021 |
| JP | 5-191153 A | 7/1993 |
| JP | 2002-76749 A | 3/2002 |
| JP | 2003-332953 A | 11/2003 |
| JP | 2014-003430 A | 1/2014 |
| JP | 2017-152872 A | 8/2017 |
| TW | 202116024 A | 4/2021 |
| WO | 2011/077617 A1 | 6/2011 |
| WO | 2017/135389 A1 | 8/2017 |

OTHER PUBLICATIONS

Extended European Search Report dated Jul. 21, 2021, issued in counterpart EP application No. 21165411.6 of U.S. Appl. No. 17/218,223. (9 pages).

Notice of Allowance dated Feb. 1, 2023, issued in U.S. Appl. No. 17/218,223. (15 pages).

Non-Final Office Action dated Aug. 1, 2022, issued in U.S. Appl. No. 17/218,223. (18 pages).

Office Action dated May 26, 2023, issued in counterpart CN application No. 202110409533.5 of U.S. Appl. No. 17/218,223, with English translation. (15 pages).

Office Action dated Jun. 2, 2023, issued in counterpart CN application No. 202210170094.1 of U.S. Appl. No. 17/218,223, with English translation. (16 pages).

Office Action dated Jan. 9, 2024, issued in counterpart JP application No. 2020-092672, with English translation. (7 pages).

Ohashi et al., "Millimeter-Wave Beam Forming Technology by high precision phase control—millimeter-wave circuits for automotive radar and 5G—", Technical Research Report of Electronic Information Communication Engineers, 2018, vol. 118, No. 177, pp. 37-42, cited in JP Office Action dated Jan. 9, 2024. (7 pages).

* cited by examiner

REFERENCE EXAMPLE

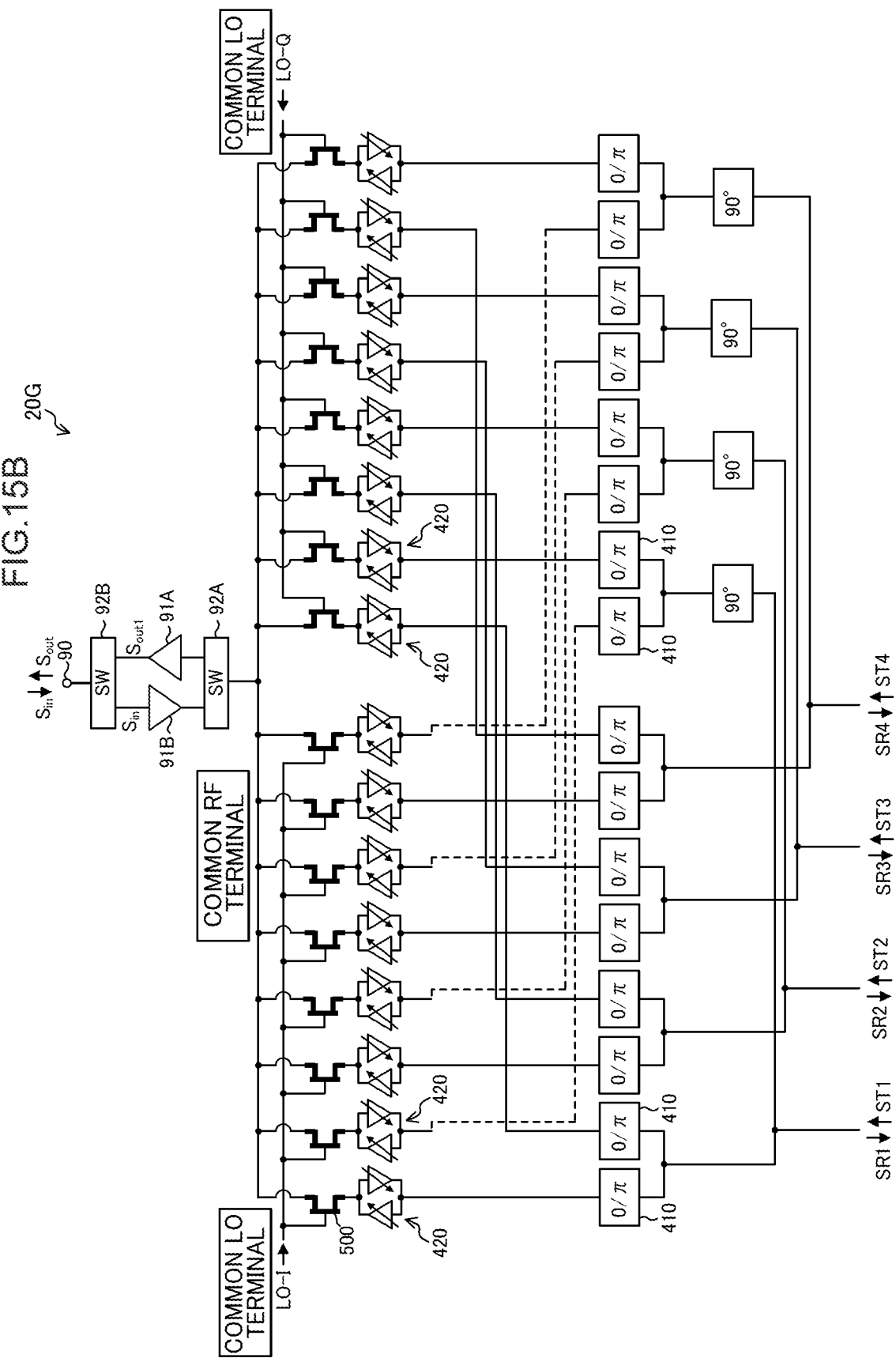

| [1] IDENTIFIER SYMBOLS OF RF SIGNAL OUTPUT PHASE STATES (DURING TRANSMISSION) OR IF SIGNAL OUTPUT PHASE STATES (DURING RECEPTION) | [2] IDENTIFIER SYMBOLS OF MIXERS | [3] LO SIGNAL INPUT PHASES AT MIXERS (°) | [4] LO INVERSION RF SIDEBAND GROUPS | [5] LO SIGNAL PHASE INVERSION (1=NON-INVERTED, -1=INVERTED) | [6] IF SIGNAL INPUT PHASES AT MIXERS (DURING TRANSMISSION) OR OUTPUT PHASES FROM MIXERS (DURING RECEPTION) | [7] IF INVERSION RF SIDEBAND GROUPS | [8] IF SIGNAL PHASE INVERSION (1=NON-INVERTED, -1=INVERTED) | [9] IF SIGNAL PHASE INVERSION GROUPS | [10] RF SIGNAL UPPER SIDE SIDEBAND PHASES | [11] RF SIGNAL LOWER SIDE SIDEBAND PHASES | [12] RF SIGNAL PHASES AT COMBINATION (DURING TRANSMISSION) OR AT DISTRIBUTION (DURING RECEPTION) (1=IN-PHASE COMBINATION (OR DISTRIBUTION), -1=ANTIPHASE COMBINATION (OR DISTRIBUTION)) | [13] LEAKAGE LO SIGNAL PHASES | [14] RF SIGNAL OUTPUT PHASES (DURING TRANSMISSION) OR IF SIGNAL OUTPUT PHASES (DURING RECEPTION) | [15] RF SIGNAL UPPER SIDE SIDEBAND AMPLITUDE (0=NO OUTPUT, 1=OUTPUT) | [16] RF SIGNAL LOWER SIDE SIDEBAND AMPLITUDE (0=NO OUTPUT, 1=OUTPUT) | [17] LO SIGNAL LEAKAGE TO RF TERMINAL (0=NO LEAKAGE, 1=LEAKAGE) |
|---|---|---|---|---|---|---|---|---|---|---|---|---|---|---|---|---|
| U1 | A | 0 | g | 1 | 0 | e | 1 | a | 0 | 0 | 1 | 0 | -45 | 1 | 0 | 0 |
| | B | 0 | g | 1 | -90 | f | 1 | b | -90 | 90 | 1 | 0 | | | | |
| | C | 180 | g | 1 | 0 | e | 1 | a | 0 | 0 | 1 | 180 | | | | |
| | D | 180 | g | 1 | -90 | f | 1 | b | -90 | 90 | 1 | 180 | | | | |
| | E | 90 | h | 1 | 0 | e | 1 | a | -90 | -90 | 1 | 90 | | | | |
| | F | 90 | h | 1 | -90 | f | 1 | b | 0 | 180 | 1 | 90 | | | | |
| | G | -90 | h | 1 | 0 | e | 1 | a | -90 | -90 | 1 | -90 | | | | |
| | H | -90 | h | 1 | -90 | f | 1 | b | 0 | 180 | 1 | -90 | | | | |
| U2 | A | 0 | g | 1 | 0 | e | -1 | a | 180 | 180 | 1 | 0 | -135 | 1 | 0 | 0 |
| | B | 0 | g | 1 | 180 | f | -1 | b | -90 | 90 | 1 | 0 | | | | |
| | C | 180 | g | 1 | 0 | e | -1 | a | 180 | 180 | 1 | 180 | | | | |
| | D | 180 | g | 1 | 180 | f | -1 | b | -90 | 90 | 1 | 180 | | | | |
| | E | 90 | h | 1 | 0 | e | -1 | a | 90 | 90 | 1 | 90 | | | | |
| | F | 90 | h | 1 | 180 | f | -1 | b | 180 | 0 | 1 | 90 | | | | |
| | G | -90 | h | 1 | 0 | e | -1 | a | 90 | 90 | 1 | -90 | | | | |
| | H | -90 | h | 1 | 180 | f | -1 | b | 180 | 0 | 1 | -90 | | | | |
| U3 | A | 0 | g | 1 | 0 | e | 1 | a | 0 | 0 | 1 | 0 | 135 | 1 | 0 | 0 |
| | B | 0 | g | 1 | 180 | f | -1 | b | 180 | -90 | 1 | 0 | | | | |
| | C | 180 | g | 1 | 0 | e | 1 | a | 180 | 180 | 1 | 180 | | | | |
| | D | 180 | g | 1 | 180 | f | -1 | b | -90 | -90 | 1 | 180 | | | | |
| | E | 90 | h | 1 | 0 | e | 1 | a | 90 | 90 | 1 | 90 | | | | |
| | F | 90 | h | 1 | 180 | f | -1 | b | 180 | 0 | 1 | 90 | | | | |
| | G | -90 | h | 1 | 0 | e | 1 | a | 90 | 90 | 1 | -90 | | | | |
| | H | -90 | h | 1 | 180 | f | -1 | b | 0 | 180 | 1 | -90 | | | | |
| U4 | A | 0 | g | 1 | 0 | e | 1 | a | 0 | 0 | 1 | 0 | 45 | 1 | 0 | 0 |
| | B | 0 | g | 1 | -90 | f | -1 | b | 90 | -90 | 1 | 0 | | | | |
| | C | 180 | g | 1 | 0 | e | 1 | a | 180 | 180 | 1 | 180 | | | | |
| | D | 180 | g | 1 | -90 | f | -1 | b | 90 | -90 | 1 | 180 | | | | |
| | E | 90 | h | 1 | 0 | e | 1 | a | 90 | 90 | 1 | 90 | | | | |
| | F | 90 | h | 1 | -90 | f | -1 | b | 0 | 180 | 1 | 90 | | | | |
| | G | -90 | h | 1 | 0 | e | 1 | a | 90 | 90 | 1 | -90 | | | | |
| | H | -90 | h | 1 | -90 | f | 1 | a | 0 | 180 | 1 | -90 | | | | |

FIG.28

| [1] Identifier symbols of RF signal output phase states (during transmission) or IF signal output phase states (during reception) | [2] Identifier symbols of mixers | [3] LO signal input phases at mixers (°) | [4] LO inversion RF sideband groups | [5] LO signal phase inversion (1=non-inverted; -1=inverted) | [6] IF signal input phases at mixers (during transmission) or output phases from mixers (during reception) | [7] IF inversion RF sideband groups | [8] IF signal phase inversion (1=non-inverted, -1=inverted) | [9] IF signal phase inversion groups | [10] RF signal upper side sideband phases | [11] RF signal lower side sideband phases | [12] RF signal phases at combination (during transmission) or at distribution (during reception) (1=in-phase combination (or distribution) -1=antiphase combination (or distribution)) | [13] Leakage LO signal phases | [14] RF signal output phases (during transmission) or IF signal output phases (during reception) | [15] RF signal upper side sideband amplitude (0=no output, 1=output) | [16] RF signal lower side sideband amplitude (0=no output, 1=output) | [17] LO signal leakage to RF terminal (0=no leakage, 1=leakage) |
|---|---|---|---|---|---|---|---|---|---|---|---|---|---|---|---|---|
| U1 | A | 0 | g | 1 | 0 | e | 1 | a | 0 | 0 | 1 | 0 | 45 | 1 | 0 | 0 |
| | B | 0 | g | 1 | 180 | e | 1 | a | 180 | 180 | -1 | 180 | | | | |
| | C | 0 | g | 1 | 90 | e | 1 | b | 90 | 90 | 1 | 0 | | | | |
| | D | 0 | g | 1 | -90 | e | 1 | b | -90 | -90 | -1 | 180 | | | | |
| | E | 180 | g | 1 | 0 | e | 1 | a | 180 | 180 | -1 | 0 | | | | |
| | F | 180 | g | 1 | 180 | e | 1 | a | 0 | 0 | 1 | 180 | | | | |
| | G | 180 | g | 1 | 90 | e | 1 | b | -90 | -90 | -1 | 0 | | | | |
| | H | 180 | g | 1 | -90 | e | 1 | b | 90 | 90 | 1 | 180 | | | | |
| | I | 90 | h | 1 | 0 | f | 1 | b | 90 | 90 | 1 | 90 | | | | |
| | J | 90 | h | 1 | 180 | f | 1 | b | -90 | -90 | -1 | -90 | | | | |
| | K | 90 | h | 1 | 90 | f | 1 | a | 180 | 0 | 1 | -90 | | | | |
| | L | 90 | h | 1 | -90 | f | 1 | a | 0 | 180 | 1 | 90 | | | | |
| | M | -90 | h | 1 | 0 | f | 1 | b | -90 | -90 | -1 | 90 | | | | |
| | N | -90 | h | 1 | 180 | f | 1 | b | 90 | 90 | 1 | -90 | | | | |
| | O | -90 | h | 1 | 90 | f | 1 | a | 0 | 180 | 1 | -90 | | | | |
| | P | -90 | h | 1 | -90 | f | 1 | a | 180 | 0 | -1 | 90 | | | | |
| U2 | A | 0 | g | 1 | 0 | e | -1 | a | 180 | 180 | 1 | 0 | 135 | 1 | 0 | 0 |
| | B | 0 | g | 1 | 180 | e | -1 | a | 0 | 0 | -1 | 180 | | | | |
| | C | 0 | g | 1 | 90 | e | 1 | b | 90 | -90 | 1 | 0 | | | | |
| | D | 0 | g | 1 | 270 | e | 1 | b | -90 | 90 | -1 | 180 | | | | |
| | E | 180 | g | 1 | 0 | e | -1 | a | 0 | 0 | -1 | 0 | | | | |
| | F | 180 | g | 1 | 180 | e | -1 | a | 180 | 180 | 1 | 180 | | | | |
| | G | 180 | g | 1 | 90 | e | 1 | b | -90 | 90 | -1 | 0 | | | | |
| | H | 180 | g | 1 | 270 | e | 1 | b | 90 | -90 | 1 | 180 | | | | |
| | I | 90 | h | 1 | 0 | f | 1 | b | 90 | 90 | 1 | 90 | | | | |
| | J | 90 | h | 1 | 180 | f | 1 | b | -90 | -90 | -1 | -90 | | | | |
| | K | 90 | h | 1 | 90 | f | -1 | a | 0 | 180 | -1 | -90 | | | | |
| | L | 90 | h | 1 | 270 | f | -1 | a | 180 | 0 | 1 | 90 | | | | |
| | M | 270 | h | 1 | 0 | f | 1 | b | -90 | -90 | -1 | 90 | | | | |
| | N | 270 | h | 1 | 180 | f | 1 | b | 90 | 90 | 1 | -90 | | | | |
| | O | 270 | h | 1 | 90 | f | -1 | a | 180 | 0 | 1 | -90 | | | | |
| | P | 270 | h | 1 | 270 | f | -1 | a | 0 | 180 | -1 | 90 | | | | |
| U3 | A | 0 | g | 1 | 0 | e | -1 | a | 180 | 180 | 1 | 0 | -135 | 1 | 0 | 0 |
| | B | 0 | g | 1 | 180 | e | -1 | a | 0 | 0 | -1 | 180 | | | | |
| | C | 0 | g | 1 | 90 | e | -1 | b | -90 | 90 | 1 | 0 | | | | |
| | D | 0 | g | 1 | 270 | e | -1 | b | 90 | -90 | -1 | 180 | | | | |
| | E | 180 | g | 1 | 0 | e | -1 | a | 0 | 0 | -1 | 0 | | | | |
| | F | 180 | g | 1 | 180 | e | -1 | a | 180 | 180 | 1 | 180 | | | | |
| | G | 180 | g | 1 | 90 | e | -1 | b | 90 | -90 | -1 | 0 | | | | |
| | H | 180 | g | 1 | 270 | e | -1 | b | -90 | 90 | 1 | 180 | | | | |
| | I | 90 | h | 1 | 0 | f | -1 | b | -90 | -90 | 1 | 90 | | | | |
| | J | 90 | h | 1 | 180 | f | -1 | b | 90 | 90 | -1 | -90 | | | | |
| | K | 90 | h | 1 | 90 | f | -1 | a | 0 | 180 | -1 | -90 | | | | |
| | L | 90 | h | 1 | 270 | f | -1 | a | 180 | 0 | 1 | 90 | | | | |
| | M | 270 | h | 1 | 0 | f | -1 | b | 90 | 90 | -1 | 90 | | | | |
| | N | 270 | h | 1 | 180 | f | -1 | b | -90 | -90 | 1 | -90 | | | | |
| | O | 270 | h | 1 | 90 | f | -1 | a | 180 | 0 | 1 | -90 | | | | |
| | P | 270 | h | 1 | 270 | f | -1 | a | 0 | 180 | -1 | 90 | | | | |
| U4 | A | 0 | g | 1 | 0 | e | -1 | a | 0 | 0 | 1 | 0 | -45 | 0 | 0 | 0 |
| | B | 0 | g | 1 | 180 | e | -1 | a | 180 | 180 | -1 | 180 | | | | |
| | C | 0 | g | 1 | 90 | e | -1 | b | -90 | 90 | 1 | 0 | | | | |
| | D | 0 | g | 1 | 270 | e | -1 | b | 90 | -90 | -1 | 180 | | | | |
| | E | 180 | g | 1 | 0 | e | -1 | a | 180 | 180 | -1 | 0 | | | | |
| | F | 180 | g | 1 | 180 | e | -1 | a | 0 | 0 | 1 | 180 | | | | |
| | G | 180 | g | 1 | 90 | e | -1 | b | 90 | -90 | -1 | 0 | | | | |
| | H | 180 | g | 1 | 270 | e | -1 | b | -90 | 90 | 1 | 180 | | | | |
| | I | 90 | h | 1 | 0 | f | -1 | b | -90 | -90 | 1 | 90 | | | | |
| | J | 90 | h | 1 | 180 | f | -1 | b | 90 | 90 | -1 | -90 | | | | |
| | K | 90 | h | 1 | 90 | f | -1 | a | 180 | 0 | -1 | -90 | | | | |
| | L | 90 | h | 1 | 270 | f | -1 | a | 0 | 180 | 1 | 90 | | | | |
| | M | 270 | h | 1 | 0 | f | -1 | b | 90 | 90 | -1 | 90 | | | | |
| | N | 270 | h | 1 | 180 | f | -1 | b | -90 | -90 | 1 | -90 | | | | |
| | O | 270 | h | 1 | 90 | f | -1 | a | 0 | 180 | 1 | -90 | | | | |
| | P | 270 | h | 1 | 270 | f | -1 | a | 180 | 0 | -1 | 90 | | | | |

WIRELESS SIGNAL PROCESSING CIRCUIT AND WIRELESS DEVICE

CROSS-REFERENCE TO RELATED APPLICATION

This application is based upon and claims the benefit of priority of the prior Japanese Patent Application No. 2021-074112 filed on Apr. 26, 2021, the entire content of which is incorporated herein by reference.

FIELD

The disclosed technology relates to a wireless sip al processing circuit and a wireless device.

BACKGROUND

In recent years, beamforming has been implemented at wireless devices using high frequency bands (for example, microwaves and millimeter waves), which is a technology for multiplexing transmitted and received signals or for achieving higher accuracy of sensing (radar). The technologies described below are known as technologies relating to wireless devices that employ beamforming.

For example, a wireless device is known that is provided with: a full digital array including a first antenna element group but not including an analog variable phase shifter; and a hybrid beam former including a second antenna element group and an analog variable phase shifter, in which the second antenna element group has plural antenna elements.

A wireless relay device is known that is provided with a receiving antenna, a transmitting array antenna formed with plural antenna elements, a low noise amplifier (LNA), a noise rejection bandpass filter (BPF), a mixer, a local oscillator, a narrowband BPF, an amplifier, a controller, a wireless phase shifter, an image rejection BPF and a power amplifier (PA).

An image rejection mixer is mown that is provided with a distributor that distributes an RF signal along two paths in phase, a distributor that distributes a local signal along two paths with a phase difference of 90°, and first and second mixers that mix the respective distributed outputs of the distributors. This image rejection mixer includes a pair of resistance-capacitance circuits connected in series with outputs of the first and second mixers, negative resistances connected to connection points between the respective resistances and capacitances, and an IF output terminal that suppresses image signals at one of the negative resistances.

Related Patent Documents

Patent Document 1: International Patent Publication No. 2017/135389
Patent Document 2: Japanese Patent Application Laid-Open (JP-A) No. 2003-332953
Patent Document 3: JP -A No. H5-191153

SUMMARY

According to an aspect of the embodiments, wireless signal processing circuit includes plural phase switchers, plural variable amplifiers and plural mixers. The plural phase switchers are provided on each of plural paths along which an in-phase signal is distributed and each of plural paths along which a quadrature signal is distributed. The in-phase signal is in phase with a transmission signal, and the quadrature signal is rotated 90° in phase from the transmission signal. Each of the plural phase switchers switches a phase rotation amount of the one of the in-phase sural and the quadrature signal that is distributed along the corresponding path selectively in accordance with a transmission direction of the transmission signal, and the phase switcher rotates the phase of the signal. The plural variable amplifiers are provided in respective correspondence with the plural phase switchers on the plural respective paths. Each of the plural variable amplifiers alters an amplitude of an input signal or output signal of the corresponding phase switcher in accordance with the transmission direction of the transmission signal. The plural mixers are provided in respective correspondence with the plural phase switchers and the plural variable amplifiers. Each of the plural mixers up-converts a frequency of the sural processed by the corresponding phase switcher and variable amplifier.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15B is a diagram showing another example of the structures of the wireless signal processing circuit according to the eighth exemplary embodiment of the disclosed technology.

FIG. 18 is a table showing examples of operations of the wireless signal processing circuit according to the ninth exemplary embodiment of the disclosed technology.

FIG. 23 is a table showing examples of operations of the wireless signal processing circuit according to the tenth exemplary embodiment of the disclosed technology.

FIG. 28 is a table showing examples of operations of the wireless signal processing circuit according to the eleventh exemplary embodiment of the disclosed technology.

DESCRIPTION OF EMBODIMENTS

Below, examples of embodiments of the disclosure are described with reference to the drawings. Structural elements and portions that are the same or equivalent in the respective drawings are assigned the same reference symbols, and duplicative descriptions are omitted as appropriate.

A wireless device that conducts beamforming uses plural antenna elements to form beams towards each of terminals. The beamforming is realized by controlling the direction and shape of each transmission beam or reception beam, by controlling one or both of phases and Amplitudes of signals transmitted or received via the antenna elements, in accordance With a location of the corresponding terminal.

Development of wireless devices that employ beam multiplexing, in which plural different signals are superposed and beams are formed in different directions, is progressing. Full-digital-system beamforming has been proposed as a method for realizing beam multiplexing.

In full-digital-system beamforming, one or both of the phases and amplitudes of signals transmitted or received via antenna elements is controlled by digital processing. Accordingly, in order to form transmission beams, a wireless device conducting full-digital beamforming is equipped with a digital-analog converter (DAC) for each antenna element. That is, a wireless device that performs full-digital-system beamforming is equipped with the same number of DACs as of antenna elements. Further, in order to form reception beams, the wireless device that performs full-digital beamforming is equipped with the same number of analog-digital converter (ADCs) as of antenna elements. The power consumptions of these DACs and ADCs depend on data signal rates. Therefore, when a wireless device that performs full-digital-system beamforming is employed in, for example, a wideband communications system employing the millimeter wave band or the like, data signal rates are high and power consumption is large.

Figure 1:
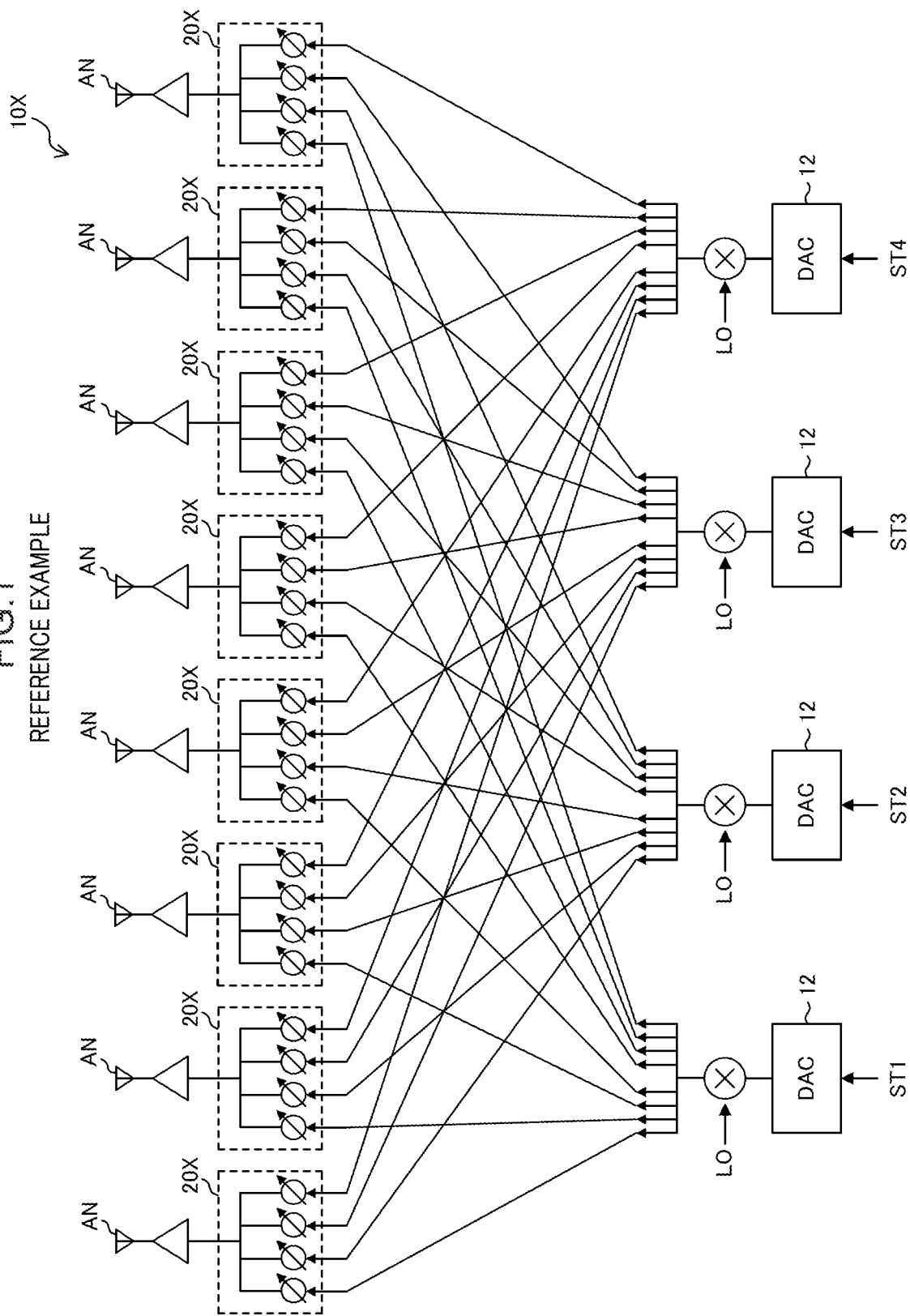
FIG. 1 is a diagram showing an example of structures of a wireless device according to a first reference example.

An analog full-connection system has been proposed as an alternative system for realizing beamforming. FIG. 1 is a diagram showing an example of structures of a wireless device that conducts analog full-connection-system beamforming (a first reference example).

A wireless device 10X illustrated in FIG. 1 is equipped with four DACs 12 for dealing with four terminals (not depicted in the drawing). Each DAC 12 converts a transmission signal to be transmitted to the corresponding terminal to an analog signal. It is preferable if the wireless device 10X is equipped with a greater number of antenna elements than the number of terminals (that is, the number of transmission signals). In the example depicted in FIG. 1, the wireless device 10X is provided with eight antenna elements AN. In this configuration, transmission signals ST1 to ST4 in a baseband range or intermediate frequency band are to be transmitted to the terminals. A local signal LO is used to up-convert the transmission signals ST1 to ST4 to a radio frequency (RF) band, and the transmission signals ST1 to ST4 are then distributed to eight wireless signal processing circuits 20X that are provided in correspondence with the antenna elements AN. Each wireless signal processing circuit 20X controls the phases of the corresponding transmission signal ST1 to ST4. Output signals froth the wireless signal processing circuits 20X are outputted via the respective corresponding antenna elements AN. The wireless signal processing circuits 20X form beams that correspond with the respective terminals by controlling the phases of the transmission signals ST1 to ST4 in accordance with locations of the terminals.

According to the analog full-connection system, it is sufficient to provide a number of the DACs 12 that corresponds with the number of terminals (the number of signals). Thus, the number of DACs may be reduced in comparison with a full-digital system and power consumption may be restrained. However, according to the analog full-connection system, numerous signal lines between the plural DACs 12 and the plural wireless signal processing circuits 20X cross over. In the example depicted in FIG. 1, 32 signal lines are provided between the four DACs 12 and the eight wireless signal processing circuits 20X, and relatively high frequency RF band signals are propagated through these signal lines. Consequently, transmission losses are large and practical implementation is difficult.

To solve the problem described above, for example, adding loss correction circuits can be considered. However, when a reduction in size of the wireless device is called for, adding loss correction circuits increases circuit size (areas occupied by circuitry) and is therefore not preferable. Moreover, adding, loss correction circuits may increase power consumption.

First Exemplary Embodiment

Figure 2:
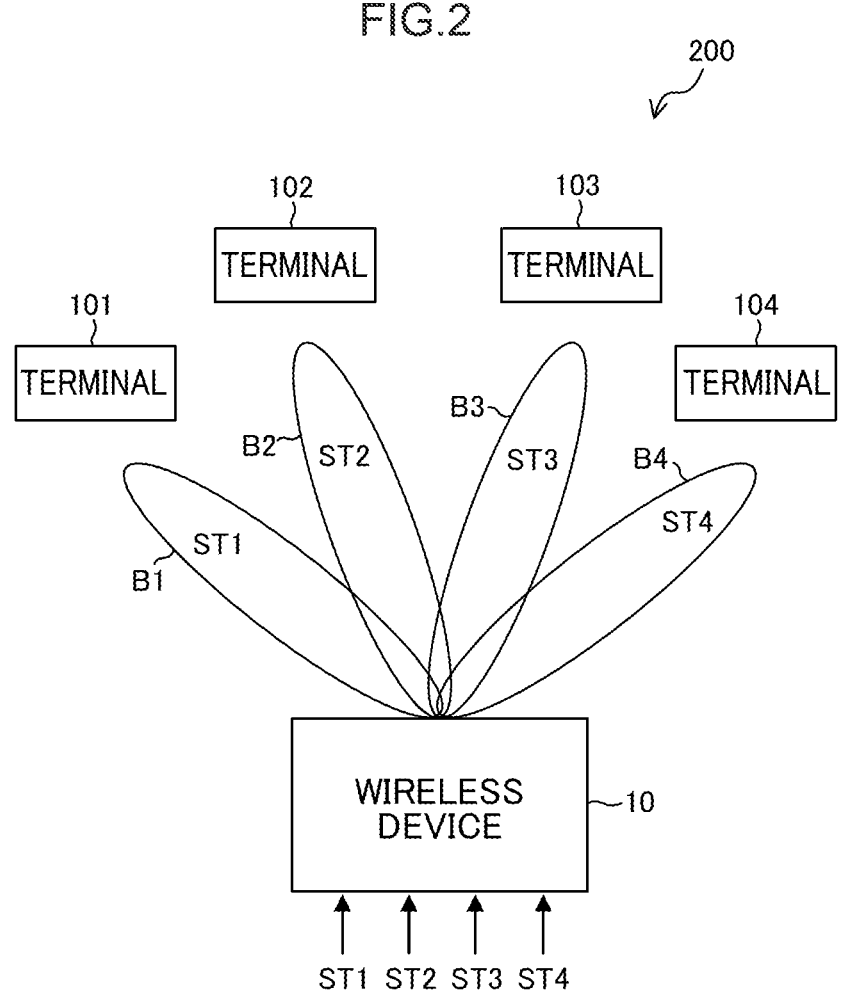
FIG. 2 is a diagram showing an example of structures of a wireless system according to an exemplary embodiment of the disclosed technology.

FIG. 2 is a diagram showing an example of structures of a wireless system 200 according to an exemplary embodiment of the disclosed technology. The wireless system 200 is provided with a wireless device 10 and plural terminals 101, 102, 103 and 104. The wireless device 10 is not particularly limited and may be, for example, mounted at a wireless system base station, in which case the terminals 101 to 104 are user terminals such as smartphones or the like. In the present exemplary embodiment, the number of terminals dealt with by the wireless system 200 is four, but the number of terminals dealt with by the wireless system 200 may increase or decrease as appropriate. The wireless device 10 is capable of forming transmission beams for transmitting signals to the terminals 101 to 104 and reception beams for receiving signals from the terminals 101 to 104. That is, the wireless device 10 features functions for forming transmission beams to transmit signals and functions for forming reception beams to receive signals. Below, mainly functions far receiving signals are described.

The wireless device 10 is supplied with transmission signals ST1 to ST4 to be transmitted to the terminals 101 to 104. The wireless device 10 forms the transmission signals ST1 to ST4 into transmission beams B1 to B4 for transmission to, respectively, the terminals 101 to 104. The transmission beam B1 is formed so as to propagate the transmission signal ST1 from the wireless device 10 to the terminal 101. Accordingly, the transmission beam B1 is formed in a direction from the wireless device 10 toward the terminal 101. Similarly, the transmission beams B2 to B4 are formed so as to propagate the transmission signals ST2 to ST4 from the wireless device 10 to, respectively, the terminals 102 to 104. In this manner, the wireless device 10 may form the plural transmission beams B1 to B4 corresponding with the terminals 101 to 104 simultaneously. The wireless device 10 individually controls the radiation directions and shapes of the transmission beams B1 to B4 in accordance with locations of the terminals 101 to 104. That is, the wireless device 10 implements beam multiplexing.

Figure 3:
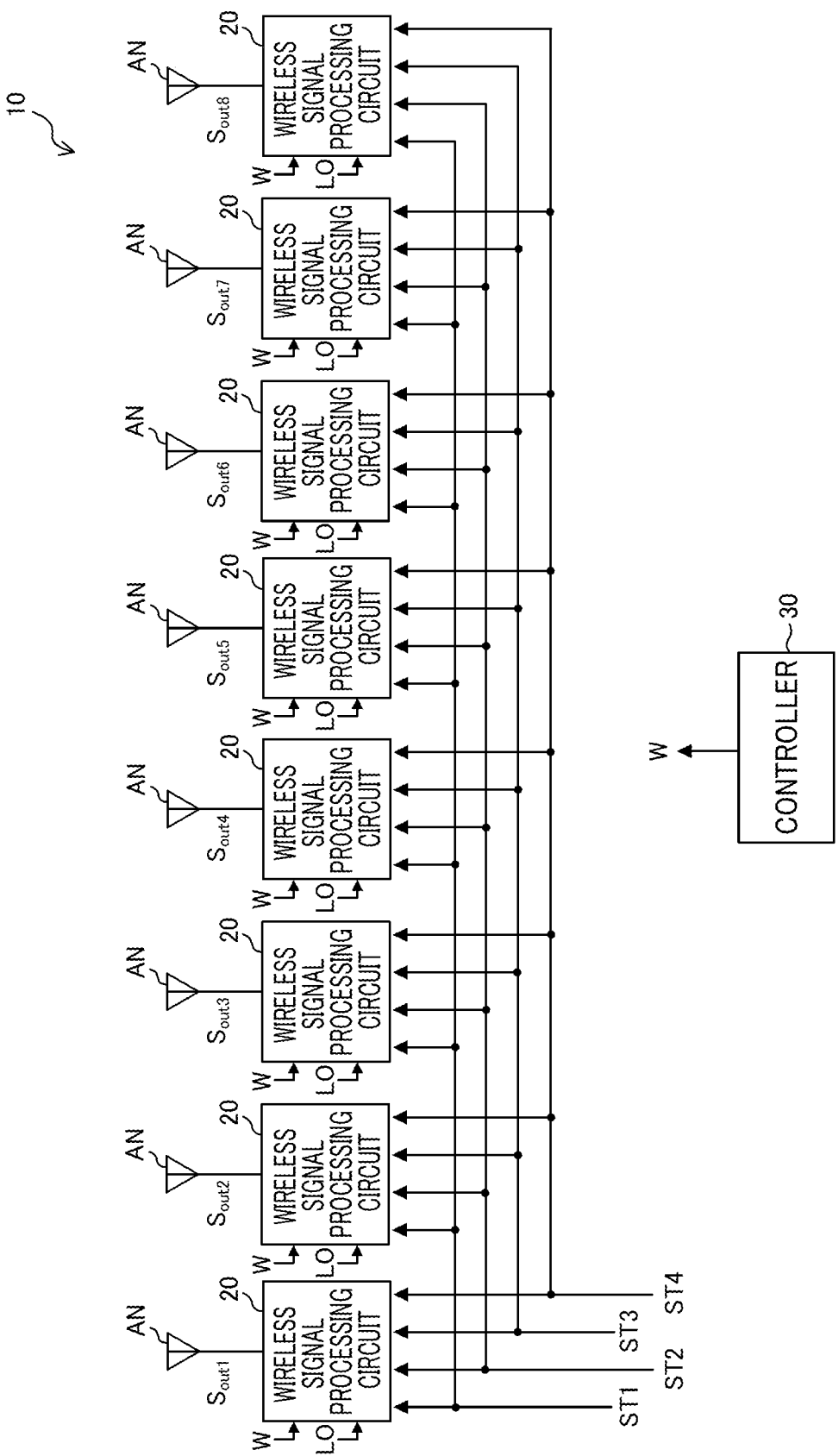
FIG. 3 is a diagram showing an example of structures of a wireless device according to the exemplary embodiment of the disclosed technology.

FIG. 3 is a diagram showing an example of structures of the wireless device 10 according to the exemplary embodiment of the disclosed technology. The wireless device 10 is provided with a plural number of wireless signal processing circuits 20, the plural number of antenna elements AN, and a controller 30. Reception circuits for forming reception beams are not depicted in FIG. 3. It is preferable if the wireless device 10 is provided with a greater number of the antenna elements AN than a number of terminals to be dealt with by the wireless system 200. In the present exemplary embodiment, eight of the antenna elements AN are provided at the wireless device 10 to correspond with the four terminals 101 to 104 being dealt with by the wireless system 200. The antenna elements AN are disposed in an array pattern. That is, the wireless device 10 is equipped with an array antenna system. The plural antenna elements AN may be arranged in a single row, and may be arranged in a matrix pattern so as to form rows and columns. Further, the antennas may be arranged in three dimensions.

The wireless signal processing circuits 20 are provided in respective correspondence with the plural antenna elements AN. That is, the number of wireless signal processing circuits 20 provided at the wireless device 10 is the same as the number of the antenna elements AN, which is eight in the present exemplary embodiment. The transmission signals ST1 to ST4 are analog signals in a baseband range or an intermediate frequency band. Frequencies of the transmission signals ST1 to ST4 are not particularly limited but are, as an example, around 3 GHz. When the transmission signals provided to the wireless device 10 are digital signals, the wireless device 10 is provided with DACs that convert the digital signals to analog signals. The transmission signals ST1 to ST4 that have been converted to analog signals by the DACs are respectively distributed to the eight wireless signal processing circuits 20. The wireless signal processing circuits 20 respectively form the transmission beams B1 to B4 for transmitting the transmission signals ST1 to ST4 to the corresponding terminals 101 to 104, by performing phase control of the transmission signals ST1 to ST4 using weightings W provided from the controller 30. That is, the wireless device 10 conducts beamforming with an analog full-connection system that distributes the transmission signals ST1 to ST4 to be transmitted to the terminals 101 to 104 to all of the wireless signal processing circuits 20 provided at the wireless device 10 to form the transmission beams B1 to B4.

The controller 30 generates the weightings W for phase control at the respective wireless signal processing circuits 20 on the basis of locations of the terminals 101 to 104. The respective wireless signal processing circuits 20 use the weightings W generated by the controller 30 to apply phase control represented by the following expression (1) to the transmission signals ST1 to ST4, and output signals $S_{out1}$ to $S_{out8}$.

$$\begin{pmatrix} W_{1,1} & \cdots & W_{1,4} \\ \vdots & \ddots & \vdots \\ W_{8,1} & \cdots & W_{8,4} \end{pmatrix} \begin{pmatrix} ST1 \\ ST2 \\ ST3 \\ ST4 \end{pmatrix} = \begin{pmatrix} S_{out1} \\ \vdots \\ S_{out8} \end{pmatrix} \quad (1)$$

For example, the output signal $S_{out1}$ that is outputted from one of the eight wireless signal processing circuits 20 is expressed by the following expression (2).

$$S_{out1} = W_{1,1} \cdot ST1 + W_{1,2} \cdot ST2 + W_{1,3} \cdot ST3 + W_{1,4} \cdot ST4 \quad (2)$$

On the basis of the location of the terminal 101, the controller 30 generates weightings $W_{1,1}$, $W_{2,1}$, $W_{3,1}$, $W_{4,1}$, $W_{5,1}$, $W_{6,1}$, $W_{7,1}$ and $W_{8,1}$. On the basis of the location of the terminal 102, the controller 30 generates weightings $W_{1,2}$, $W_{2,2}$, $W_{3,2}$, $W_{4,2}$, $W_{5,2}$, $W_{6,2}$, $W_{7,2}$ and $W_{8,2}$. On the basis of the location of the terminal 103, the controller 30 generates weightings $W_{1,3}$, $W_{2,3}$, $W_{33}$, $W_{4,3}$, $W_{5,3}$, $W_{6,3}$, $W_{7,3}$ and $W_{8,3}$. On the basis of the location of the terminal 104, the controller 30 generates weightings $W_{1,4}$, $W_{2,4}$, $W_{3,4}$, $W_{4,4}$, $W_{5,4}$, $W_{6,4}$, $W_{7,4}$ and $W_{8,4}$. The weightings W are updated in accordance with changes in locations of the terminals 101 to 104 and changes in communication conditions between the wireless device 10 and the terminals 101 to 104.

The respective wireless signal processing circuits 20 use a local signal LO to up-convert the transmission signals ST1 to ST4 in the baseband range or intermediate frequency band to an RF band (or millimeter wave band), and output the up-converted signals as the output signals $S_{out1}$ to $S_{out8}$. The output signals $S_{out1}$ to $S_{out8}$ are radiated from the respectively corresponding antenna elements AN. The transmission beams B1 to B4 are formed towards the terminals 101 to 104 by the output signals $S_{out1}$ to $S_{out8}$ whose phases have been controlled being radiated from the eight respective antenna elements AN. That is, the wireless device 10 constitutes an array antenna system and forms the transmission beams B1 to B4.

Figure 4:
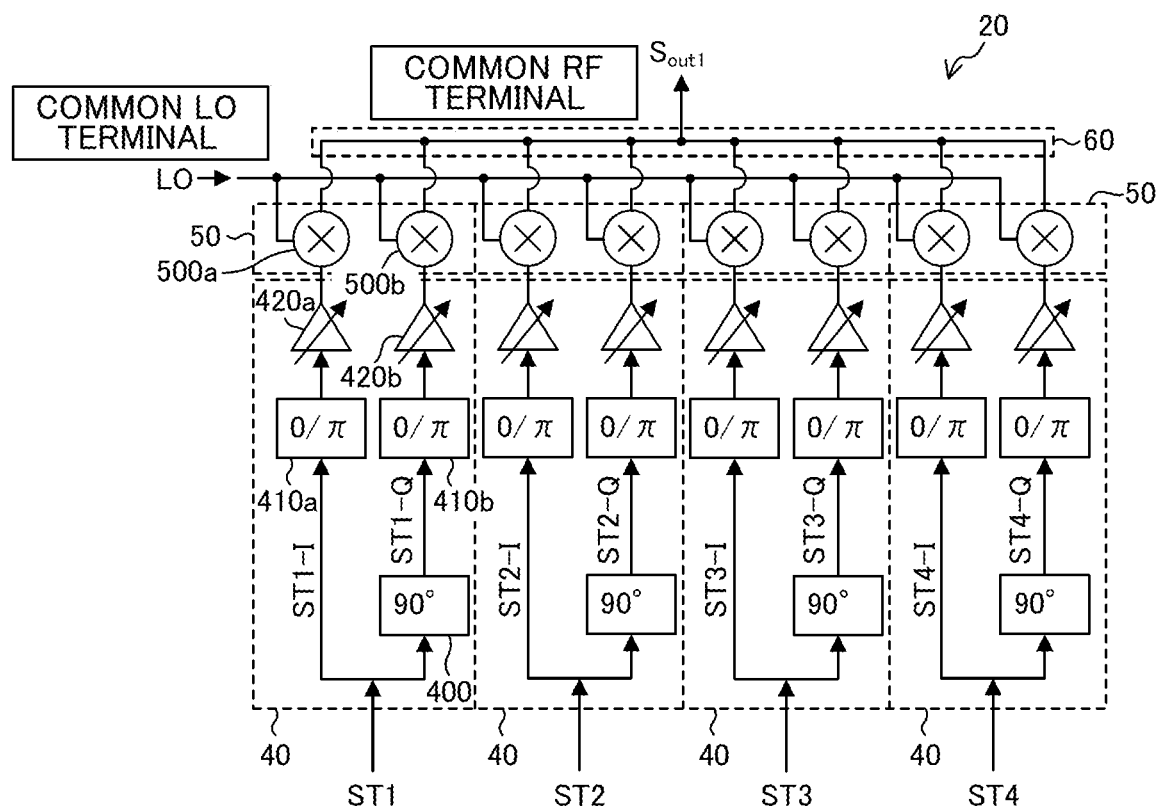
FIG. 4 is a diagram showing an example of structures of a wireless signal processing circuit according to the exemplary embodiment of the disclosed technology.

FIG. 4 is a diagram showing an example of structures of each wireless signal processing circuit 20. The structures of the plural wireless signal processing circuits 20 are the same as one another. Of the eight wireless signal processing circuits 20. FIG. 4 illustrates the wireless signal processing circuit 20 that outputs the output signal $S_{out1}$. The wireless signal processing circuit 20 is provided with plural phase control sections 40, plural mixer sections 50 and a combination portion 60. The plural phase control sections 40 and the plural mixer sections 50 are provided in respective correspondence with the transmission signals ST1 to ST4 to be transmitted to the terminals 101 to 104.

A passive circuit region of each phase control section 40 includes, for example, at least one of a lumped element circuit or a circuit conforming to a lumped element model such as a spiral inductor or meander inductor. On the basis of a weighting W provided from the controller 30, the phase control section 40 controls the phase of the corresponding transmission signal in accordance with a transmission direction of the corresponding transmission signal (a radiation direction of the corresponding transmission beam). The phase control section 40 is provided with a phase rotation section 400, a first phase switching section 410a, a second phase switching section 410b, a first variable amplifier 420a and a second variable amplifier 420b. The phase control section 40 distributes the corresponding transmission signal along two paths, supplying one distributed signal to the first phase switching section 410a and supplying the other to the phase rotation section 400.

The corresponding transmission signal among the transmission signals ST1 to ST4 is supplied to each first phase switching section 410a without the phase thereof being rotated. That is, an in-phase signal ST1-I that is in phase with the transmission signal ST1 is supplied to the first phase switching section 410a corresponding to the transmission signal ST1. Similarly, in-phase signals ST2-I to ST4-I are supplied to the first phase switching sections 410a corresponding to the transmission signals ST2 to ST4. Each first phase switching section 410a switches a phase rotation amount of the corresponding in-phase signal selectively in accordance with the transmission direction of the corresponding transmission signal, and the first phase snitching section 410a rotates the phase of the in-phase signal in correspondence with the selected rotation amount. For example, the first phase switching section 410a corresponding to the transmission signal ST1 selectively switches the phase rotation amount of the in-phase signal ST1-I in accordance with the transmission direction of the transmission signal ST1 (the radiation direction of the transmission beam B1) and rotates the phase of the in-phase signal ST1-I. Similarly, the first phase switching sections 410a corresponding to the transmission signals ST2 to ST4 selectively switch phase rotation amounts of the in-phase signals ST2-I to ST4-I in accordance with the transmission directions of the transmission signals ST2 to ST4 (the radiation directions of the transmission beams B2 to B4) and rotate the phases of the in-phase signals ST2-I to ST4-I.

Each phase rotation section 400 rotates the phase of the corresponding transmission signal among the transmission signals ST1 to ST4 by 90°. Below, a transmission signal whose phase has been rotated 90° by the phase rotation section 400 is referred to as the quadrature signal. That is, the phase rotation section 400 corresponding to the transmission signal ST1 outputs a quadrature signal ST1-Q. Similarly, the phase rotation sections 400 corresponding to the transmission signals ST2 to ST4 output respective quadrature signals ST2-Q to ST4-Q. The quadrature signals ST1-Q to ST4-Q are supplied to the corresponding second phase switching sections 410b.

Each second phase switching section 410b switches a phase rotation amount of the corresponding quadrature signal selectively in accordance with the transmission direction of the corresponding transmission signal, and the second phase switching section 410b rotates the phase of the quadrature signal in correspondence with the selected rotation amount. For example, the second phase switching section 410b corresponding to the transmission signal ST1 selectively switches the phase rotation amount of the quadrature signal ST1-Q in accordance with the transmission direction of the transmission signal ST1 (the radiation direction of the transmission beam B1) and rotates the phase of the quadrature signal ST1-Q. Similarly, the second phase switching sections 410b corresponding to the transmission signals ST2 to ST4 selectively switch phase rotation amounts of the quadrature signals ST2-Q to ST4-Q in accordance with the transmission directions of the transmission signals ST2 to ST4 (the radiation directions of the transmission beams B2 to B4) and rotate the phases of the quadrature signals ST2-Q to ST4-Q. The phase rotation amounts of the first phase switching section 410a and second phase switching section 410b are set to 0° or 180° in accordance with the weightings W provided from the controller 30.

Each first variable amplifier 420a alters the amplitude of the output signal of the first phase switching section 410a in accordance with the transmission direction of the corresponding transmission signal. For example, the first variable amplifier 420a corresponding to the transmission signal ST1 alters the amplitude of the in-phase signal ST1-I whose phase has been rotated by 0° or 180° in accordance with the transmission direction of the transmission signal ST1. Similarly, the first variable amplifiers 420a corresponding to the transmission signals ST2 to ST4 alter the respective amplitudes of the in-phase signals ST2-I to ST4-I whose phases have been rotated by 0° or 180° in accordance with the transmission directions of the transmission signals ST2 to ST4.

Each second variable amplifier 420b alters the amplitude of an output signal of the second phase switching section 410b in accordance with the transmission direction of the corresponding transmission signal. For example, the second variable amplifier 420b corresponding to the transmission signal ST1 alters the amplitude of the quadrature signal ST1-Q whose phase has been rotated by 0° or 180° in accordance with the transmission direction of the transmission signal ST1. Similarly, the second variable amplifiers 420b corresponding to the transmission signals ST2 to ST4 alter the respective amplitudes of the quadrature signals ST2-Q to ST4-Q whose phases have been rotated by 0° or 180° in accordance with the transmission directions of the transmission signals ST2 to ST4. Amplitude alteration ratios (amplification factor) of the first variable amplifier 420a and second variable amplifier 420b are set in accordance with the weightings W provided from the controller 30.

The plural mixer sections 50 are provided in respective correspondence with the plural phase control sections 40 and up-convert the frequencies of the transmission signals whose phases have been controlled by the phase control sections 40. Each mixer section 50 is provided with a first mixer 500a and a second mixer 500b. The first mixer 500a up-converts the frequency of an output signal of the first variable amplifier 420a using a local signal LO with a higher frequency than the frequencies of the transmission signals ST1 to ST4. The second mixer 500b uses the local signal LO to up-convert the frequency of an output signal of the second variable amplifier 420b. Each of the plural mixer sections 50 uses the common local signal LO. The transmission signals ST1 to ST4 in the baseband range or intermediate frequency band are up-converted to the RF band (or millimeter wave band) by the mixer sections 50. The frequency of the local signal LO is not particularly limited but may be, for example, around 25 GHz. Local terminals at which the local signal LO is fed into the first and second mixers 500a and 500b are common (connected together), and RF terminals at which RF signals are fed out are common (connected together).

The combination portion 60 is a conduction path connecting the outputs of the plural mixer sections 50 with one another. That is, the transmission signals ST1 to ST4 are respectively controlled in phase at the corresponding phase control sections 40, altered in frequency at the corresponding mixer sections 50, and then combined at the combination portion 60. Thus, the output signals $S_{out1}$ to $S_{out8}$ are generated at the respective wireless signal processing circuits 20. Each combination portion 60 is connected to the corresponding antenna element AN, and the output signals $S_{out1}$ to $S_{out8}$ are radiated from the corresponding antenna elements AN.

The phases of the transmission signals ST1 to ST4 can be switched in quadrants by settings of the phase rotation amounts at the first and second phase switching sections 410a and 410b. In accordance with settings of the amplitude alteration ratios (amplification factors) at the first and second variable amplifiers 420a and 420b, phase rotation amounts of the transmission signals ST1 to ST4 may be controlled in ranges from 0° to 360°. That is, the phase control sections 40 control the phase rotation amounts of the transmission signals ST1 to ST4 in ranges from 0° to 360° by vector composition of the in-phase signals and quadrature signals that have been phase-switched and amplitude-controlled.

For example, if the phase rotation amount of the corresponding transmission signal ST1 to ST4 at each phase control section 40 is to be controlled in a range from 0° to 90° (a first quadrant), 0° is selected as the phase rotation amount at the first phase switching section 410a, and 0° is selected as the phase rotation amount at the second phase switching section 410b. The phase rotation amount of the transmission signal ST1 to ST4 can be controlled in the range from 0° to 90° according to a ratio of the amplification factors at the first and second variable amplifiers 420a and 420b.

Alternatively, for example, if the phase rotation amount of the corresponding transmission signal ST1 to ST4 at the phase control section 40 is to be controlled in a range from 90° to 180° (a second quadrant), 180° is selected as the phase rotation amount at the first phase switching section 410a, and 0° is selected as the phase rotation amount at the second phase switching section 410b. The phase rotation amount of the transmission signal ST1 to ST4 can be controlled in the range from 90° to 180° according to the ratio of the amplification factors at the first and second variable amplifiers 420a and 420b.

If, for example, the phase rotation amount of the corresponding transmission signal ST1 to ST4 at the phase control section 40 is to be controlled in a range from 180° to 270° (a third quadrant), 180° is selected as the phase rotation amount at the first phase switching section 410a, and 180° is selected as the phase rotation amount at the second phase switching section 410b. The phase rotation amount of the transmission signal ST1 to ST4 can be controlled in the range from 180° to 270° according to the ratio of the amplification factors at the first and second variable amplifiers 420a and 420b.

If, for example, the phase rotation amount of the corresponding transmission signal ST1 to ST4 at the phase control section 40 is to be controlled in a range from 270° to 360° (a fourth quadrant), 0° is selected as the phase rotation amount at the first phase switching section 410a, and 180° is selected as the phase rotation amount at the second phase switching section 410b. The phase rotation amount of the transmission signal ST1 to ST4 can be controlled in the range from 270° to 360° according to the ratio of the amplification factors at the first and second variable amplifiers 420a and 420b.

The amplitude of each transmission signal ST1 to ST4 may be changed by changing the amplification factors of the first and second variable amplifiers 420a and 420b while keeping the ratio of the amplification factors fixed. That is, all elements of the weightings W may apply weighting to the amplitudes as well as the phases. For example, by weighting the amplitudes, respective beam shapes such as beam widths and the like of the transmission beams B1 to B4 may be changed.

According to the wireless device 10X according to the first reference example depicted in FIG. 1, the transmission signals ST1 to ST4 to be transmitted to the terminals are up-converted to the RF band using the local signal LO and are then distributed to the plural wireless signal processing circuits 20X. According to the wireless device 10X according to the first reference example, 32 signal lines are provided between the four DACs 12 and the eight wireless signal processing circuits 20X, and signals with relatively high frequencies in the RF band are propagated through these signal lines. Therefore, signal losses are large.

In contrast, according to the wireless device 10 according to this exemplary embodiment of the disclosed technology, distribution of the transmission signals ST1 to ST4 to the wireless signal processing circuits 20 is conducted at relatively low frequencies in the baseband range or intermediate frequency band. Therefore, according to the wireless device 10 provided with the wireless signal processing circuits 20 according to the exemplary embodiment of the disclosed technology, signal losses may be smaller than in the wireless device 10X provided with the wireless signal processing circuits 20X according to the first reference example.

Figure 5:
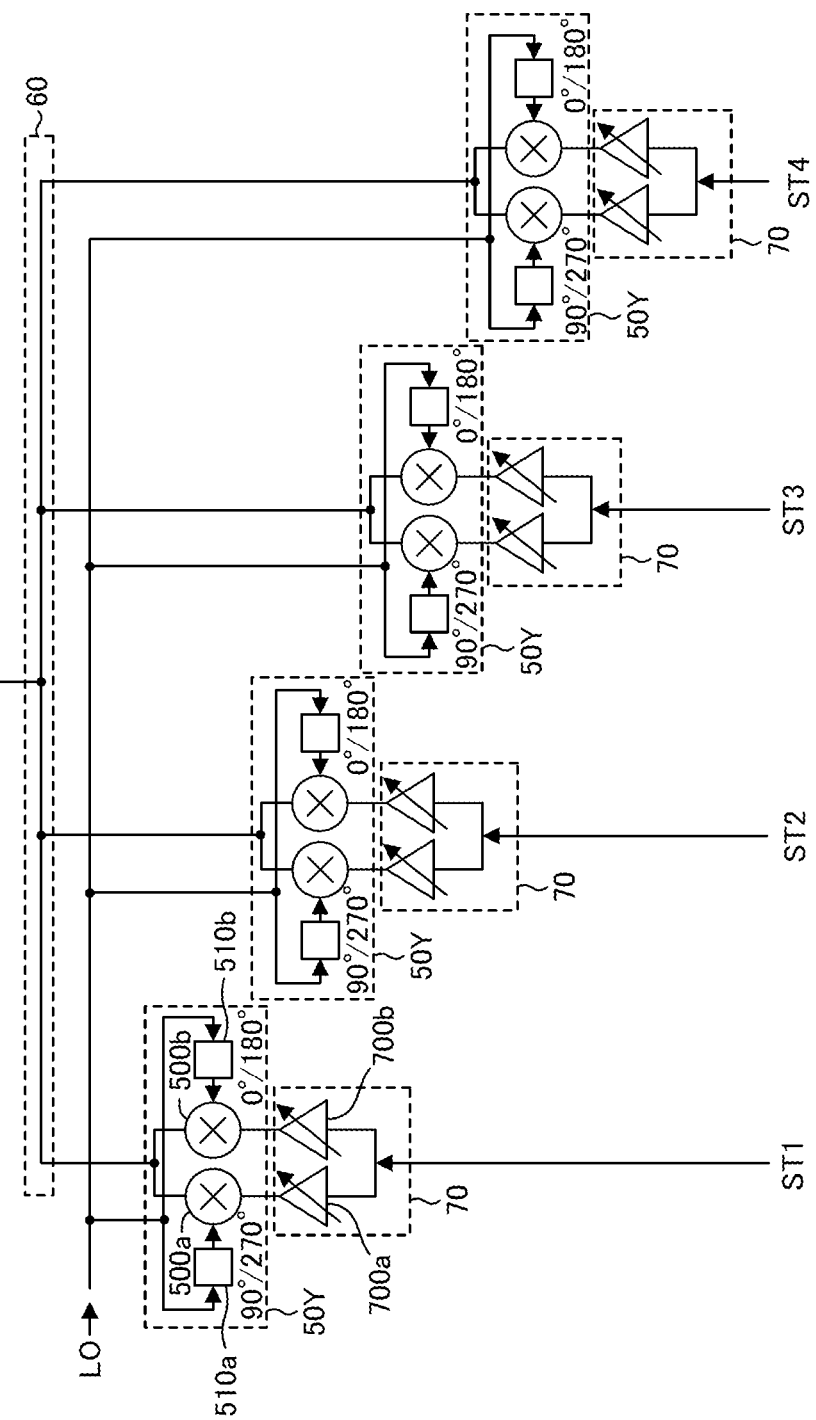
FIG. 5 is a diagram showing an example of structures of a wireless signal processing circuit according to a second reference example.

FIG. 5 is a diagram showing an example of structures of a wireless signal processing circuit 20Y according to a second reference example. The wireless signal processing circuits 20Y are provided in respective correspondence with plural antenna elements AN. Each wireless signal processing circuit 20Y has similar fluid to the wireless signal processing circuit 20 according to the exemplary embodiment of the disclosed technology described above. The wireless signal processing circuit 20Y is provided with a plural number of amplitude control sections 70, a plural number of mixer sections 50Y, and the combination portion 60. The plural amplitude control sections 70 and the plural mixer sections 50Y are provided in respective correspondence with the transmission signals ST1 to ST4.

Each amplitude control section 70 alters the amplitude of the corresponding transmission signal in accordance with the transmission direction of the transmission signal. The amplitude control section 70 is provided with a first variable amplifier 700a and a second variable amplifier 700b. The amplitude control section 70 distributes the corresponding transmission signal along two paths, supplying one distributed signal to the first variable amplifier 700a and supplying the other to the second variable amplifier 700b.

The first and second variable amplifiers 700a and 700b alter respective amplitudes of the corresponding transmission signal in accordance with the transmission direction of the transmission signal. For example, the first and second variable amplifiers 700a and 700b corresponding to the transmission signal ST1 alter the amplitudes of the transmission signal ST1 in accordance with the transmission direction of the transmission signal ST1. Amplitude alteration ratios (amplification factors) of the first and second variable amplifiers 700a and 700b are set in accordance with the weightings W provided from the controller 30.

Each of the plural mixer sections 50Y is provided with a first phase switching section 510a, a second phase switching section 510b, the first mixer 500a and the second mixer 500b. Each of the first and second phase switching sections 510a and 510b switches a phase rotation amount of the local signal LO selectively in accordance with the transmission direction of the corresponding transmission signal, and the first and second phase switching sections 510a and 510b rotate the phase of the local signal LO by the selected rotation amounts. A phase rotation amount at the first phase switching section 510a is set to 90° or 270° in accordance with the weighting W provided from the controller 30. A phase rotation amount at the second phase switching section 510b is set to 0° or 180° in accordance with the weighting W provided from the controller 30.

The first mixer 500a uses the local signal LO whose phase has been rotated by the first phase switching section 510a to up-convert the frequency of the output signal from the first variable amplifier 700a. The second mixer 500b uses the local signal LO whose phase has been rotated by the second phase switching section 510b to up-convert the frequency of the output signal from the second variable amplifier 700b. Thus, the transmission signals ST1 to ST4 in the baseband range or intermediate frequency band are up-converted to the RF band (or millimeter wave band) by the mixer sections 50Y.

The transmission signals ST1 to ST4 whose amplitudes have been controlled at the corresponding amplitude control sections 70 and whose frequencies have been converted at the corresponding mixer sections 50Y are then combined at the combination portion 60. Thus, the output signals $S_{out1}$ to $S_{out8}$ are generated at the respective wireless signal processing circuits 20Y. FIG. 5 shows the wireless signal processing circuit 20Y that outputs the output signal $S_{out1}$ as an example. Each combination portion 60 is connected to the corresponding antenna element AN, and the output signals $S_{out1}$ to $S_{out8}$ are radiated from the corresponding antenna elements N.

The phases of the transmission signals ST1 to ST4 can be switched in quadrants by settings of the phase rotation amounts at the first and second phase switching sections 510a and 510b. In accordance with settings of the amplitude alteration ratios (amplification factors) at the first and second variable amplifiers 700a and 700b, phase rotation amounts of the transmission signals ST1 to ST4 can be controlled in ranges from 0° to 360°.

According to the wireless signal processing circuit 20Y according to the second reference example, similarly to the wireless signal processing circuit 20 according to the exemplary embodiment of the disclosed technology, transmission beams towards the terminals 101 to 104 may be formed. In addition, distribution of the transmission signals ST1 to ST4 to the wireless signal processing circuits 20Y is conducted at relatively low frequencies in the baseband range or intermediate frequency band. Therefore, signal losses may be smaller than in the wireless device 10X according to the first reference example depicted in FIG. 1.

Figure 6:
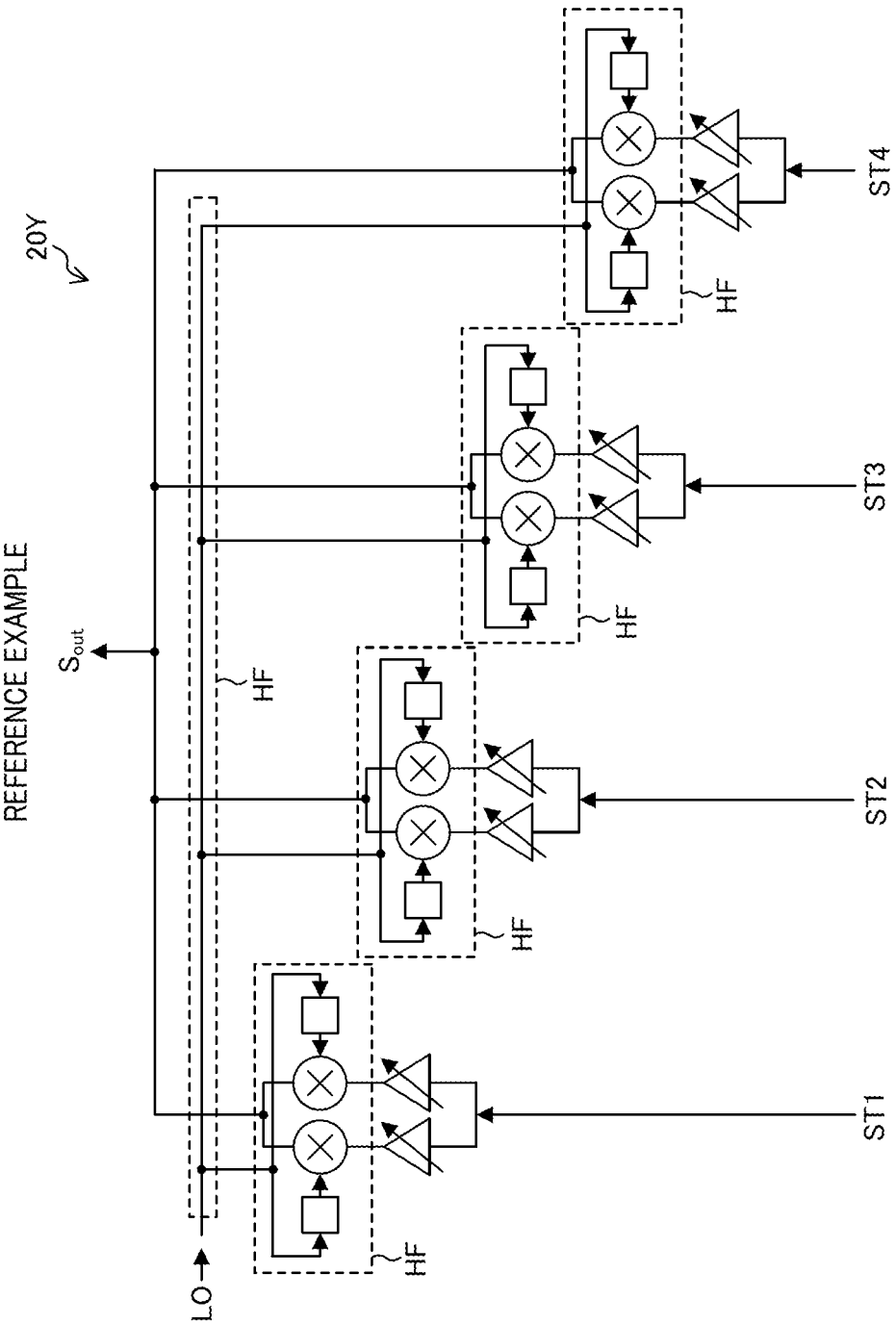
FIG. 6 is a diagram showing an example of the structures of the wireless signal processing circuit according to the second reference example.

However, according to the wireless signal processing circuit 20Y according to the second reference example, as depicted in FIG. 6, a number of high-frequency blocks HF through which the local signal LO is propagated with a relatively high frequency is large. For example, in a structure dealing with the four transmission signals ST1 to ST4, the number of the high-frequency blocks HF is five, as depicted in FIG. 5. Each high-frequency block HF is constituted with a distributed element circuit of a size corresponding with the wavelength of the high-frequency signal. Therefore, it is difficult to constitute the wireless signal processing circuit 20Y according to the second reference example with a smaller circuit size (areas occupied by circuitry). For example, if the circuit described above is constituted in a semiconductor integrated circuit and the high-frequency wavelength is close to the size of the semiconductor integrated circuit, the plural high-frequency blocks HF occupy most of interior regions of the semiconductor integrated circuit or are larger than the integrated circuit area.

Figure 7:
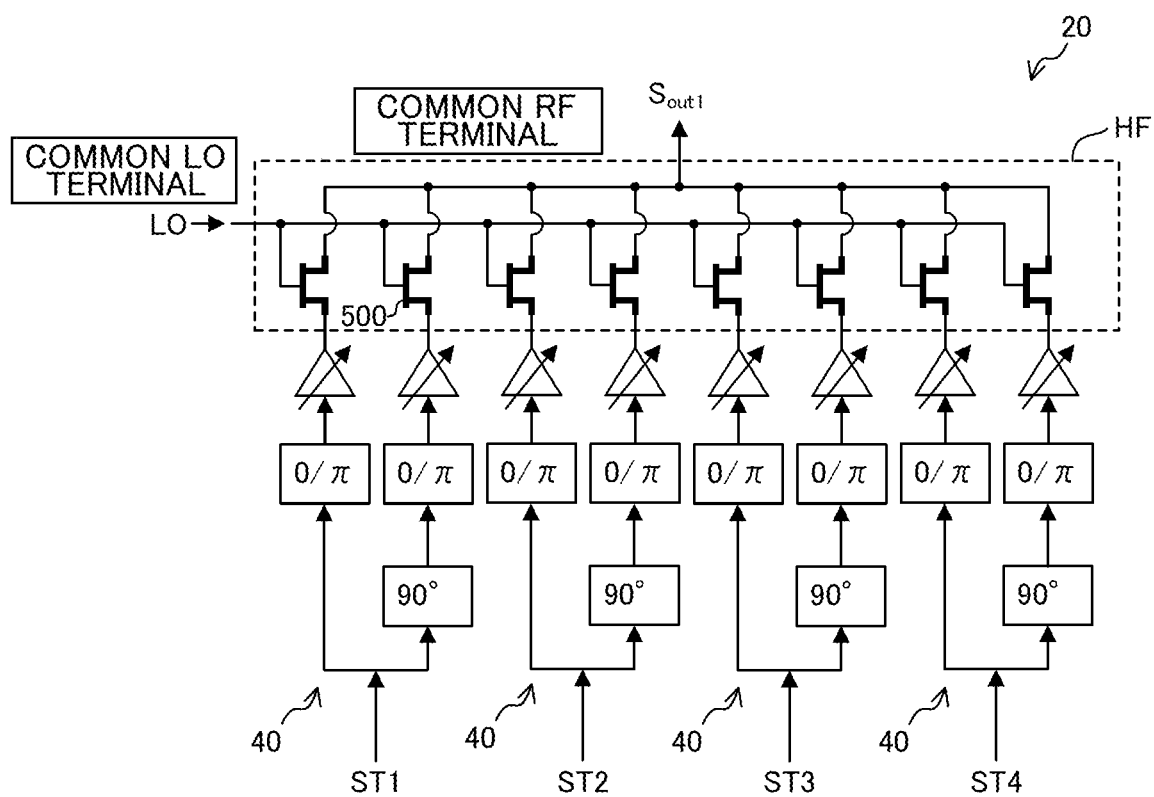
FIG. 7 is a diagram showing an example of the structures of the wireless signal processing circuit according to the exemplary embodiment of the disclosed technology.

In contrast, according to the wireless signal processing circuit 20 according to the exemplary embodiment of the disclosed technology, as depicted in FIG. 7, the number of high-frequency blocks HF may be kept to one. In addition, the mixers structuring the mixer sections may be constituted by transistors 500. The drains (or sources) of the transistors 500 are connected in common to the combination portion 60, and the local signal LO is supplied in common to the gates of the transistors 500. Therefore, the transistor 500 structuring each mixer may be constituted by a single multifinger transistor provided with a single drain electrode (or source electrode), a single gate electrode, and a plural number of source electrodes (or drain electrodes) that are separated from one another. Thus, the plural mixer sections 50 may be structured very compactly. That is, according to the wireless signal processing circuit 20 according to the exemplary embodiment of the disclosed technology, the circuit size (areas occupied by circuitry) may be smaller than the wireless signal processing circuit 20Y according to the second reference example.

According to the wireless signal processing circuit 20 according to the exemplary embodiment of the disclosed technology, because the transmission signals ST1 to ST4 that are propagated to the phase control sections 40 are signals with relatively low frequencies in the baseband range or intermediate frequency band, a passive circuit of each phase control section 40 may be structured with a lumped element circuit or a circuit conforming to a lumped element model. The term "a circuit conforming to a lumped element model" as used herein is intended to include circuits that include distributed element model elements such as spiral inductors and meander inductors, but encompasses circuits that may be constituted with small areas. Because the passive elements of the phase control section 40 are constituted by a lumped element circuit or a circuit conforming to a lumped element model, the circuit size (areas occupied by circuitry) of the wireless signal processing circuit 20 may be made relatively small.

Figure 8:
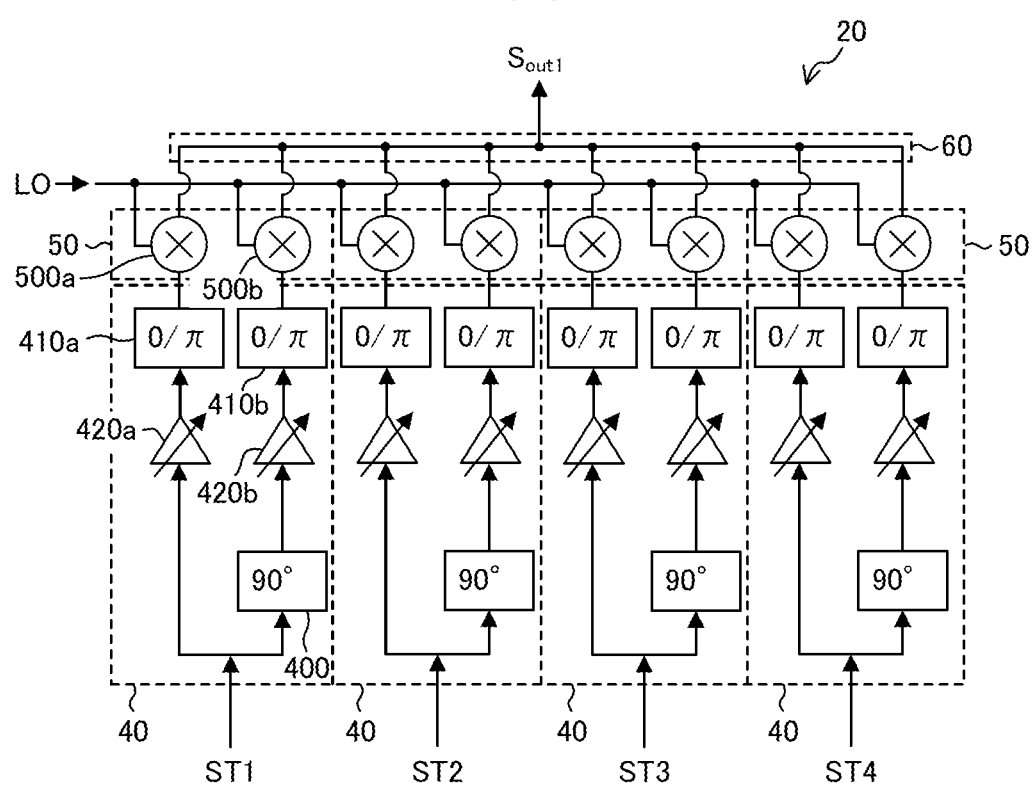
FIG. 8 is a diagram showing an example of the structures of the wireless signal processing circuit according to the exemplary embodiment of the disclosed technology.

FIG. 4 shows a structure in which the first and second variable amplifiers 420*a* and 420*b* are disposed at the respective output sides of the first and second phase switching sections 410*a* and 410*b*, but this is not limiting. As illustrated in FIG. 8, the first and second variable amplifiers 420*a* and 420*b* may be disposed at the respective input sides of the first and second phase switching sections 410*a* and 410*b*.

Second Exemplary Embodiment

Figure 9:
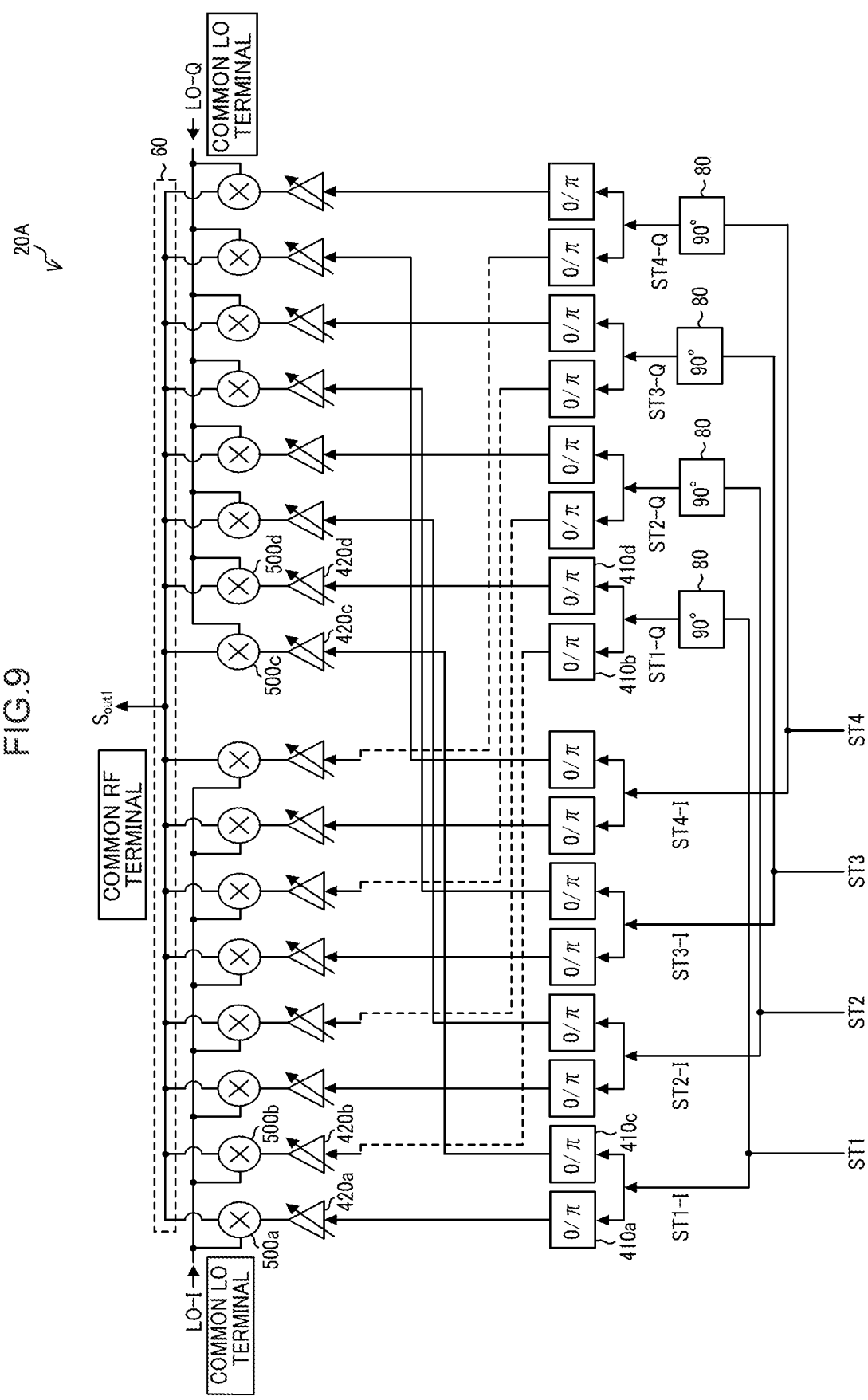
FIG. 9 is a diagram showing an example of structures of a wireless signal processing circuit according to a second exemplary embodiment of the disclosed technology.

FIG. 9 is a diagram showing an example of structures of a wireless signal processing circuit 20A according to a second exemplary embodiment of the disclosed technology. The wireless signal processing circuits 20A are provided in respective correspondence with plural antenna elements AN.

The wireless signal processing circuit 20A includes a plural number of phase rotation sections 80. The plural phase rotation sections 80 are provided respective correspondence with the transmission signals ST1 to ST4. Each phase rotation section 80 rotates the phase of the corresponding transmission signal by 90°. That is, the phase rotation section 80 corresponding to the transmission signal ST1 outputs the quadrature signal ST1-Q. Similarly, the phase rotation Sections 80 corresponding to the transmission signals ST2 to ST4 output respective quadrature signals ST2-Q to ST4-Q.

In the wireless signal processing circuit 20A, each of a plural number of phase control sections provided in respective correspondence with the transmission signals ST1 to ST4 includes first to fourth phase switching sections 410*a* to 410*d* and first to fourth variable amplifiers 420*a* to 420*d*.

The first and third phase switching sections 410*a* and 410*c* respectively switch phase rotation amounts of the corresponding in-phase signal selectively in accordance with the transmission direction of the corresponding transmission signal, and the first and third phase switching sections 410*a* and 410*c* rotate the phase of the in-phase signal in correspondence with the selected rotation amounts. For example, the first and third phase switching sections 410*a* and 410*c* corresponding to the transmission signal ST1 selectively switch phase rotation amounts of the in-phase signal ST1-I in accordance with the transmission direction of the transmission signal ST1 and rotate the phase of the in-phase signal ST1-I.

The second and fourth phase switching sections 410*b* and 410*d* respectively switch phase rotation amounts of the corresponding quadrature signal selectively in accordance with the transmission direction of the corresponding transmission signal, and the second and fourth phase switching sections 410*b* and 410*d* rotate the phase of the quadrature signal in correspondence with the selected rotation amounts. For example, the second and fourth phase switching sections 410*b* and 410*d* corresponding to the transmission signal ST1 selectively switch phase rotation amounts of the quadrature signal ST1-Q in accordance with the transmission direction of the transmission signal ST1 and rotate the phase of the quadrature signal ST1-Q. The phase rotation amounts of the first to fourth phase switching sections 410*a* to 410*d* are set to 0° or 180° in accordance with the weightings W provided from the controller 30.

Each first variable amplifier 420*a* alters the amplitude of the output signal of the first phase switching section 410*a* in accordance with the transmission direction of the corresponding transmission signal. Similarly, the second to fourth variable amplifiers 420*b* to 420*d* alter the respective amplitudes of the output signals of the second to fourth phase switching sections 410*b* to 410*d* in accordance with the transmission direction of the corresponding transmission signal. Amplitude alteration ratios (amplification factors of the first to fourth variable amplifiers 420*a* to 420*d* are set in accordance with the weightings W provided from the controller 30.

In the wireless signal processing circuit 20A, plural mixer sections that are provided in respective correspondence with the transmission signals ST1 to ST4 each include first to fourth mixers 500*a* to 500*d*. The first mixer 500*a* up-converts the frequency of the output signal of the first variable amplifier 420*a* using a first local signal LO-I with a higher frequency than the frequencies of the transmission signals ST1 to ST4. The second mixer 500*b* uses the first local signal LO-I to up-convert the frequency of the output signal of the second variable amplifier 420*b*. That is, the first and second mixers 500*a* and 500*b* use the first local signal LO-I in common to up-convert the frequency.

The third mixer 500*c* up-converts the frequency of the output signal of the third variable amplifier 420*c* using a second local signal LO-Q, which is rotated in phase by 90° relative to the first local signal LO-I. The fourth mixer 500*d* uses the second local signal LO-Q to up-convert the frequency of the output signal of the fourth variable amplifier 420*d*. That is, the third and fourth mixers 500*c* and 500*d* use the second local signal LO-Q in common to up-convert the frequency.

The transmission signals ST1 to ST4 are respectively controlled in phase at the corresponding phase control sections (the first to fourth phase switching sections 410*a* to 410*d* and the first to fourth variable amplifiers 420*a* to 420*d*), altered in frequency at the corresponding mixer sections (the first to fourth mixers 500*a* to 500*d*), and then combined at the combination portion 60. Thus, the output signals $S_{out1}$ to $S_{out8}$ are generated at the respective wireless signal processing circuits 20A. Each combination portion 60 is connected to the corresponding antenna element AN, and the output signals $S_{out1}$ to $S_{out8}$ are radiated from the corresponding antenna elements AN. FIG. 9 shows the wireless signal processing circuit 20A that outputs the output signal $S_{out1}$ as an example.

Now, when the frequencies of the transmission signals ST1 to ST4 in the baseband range or intermediate frequency band are up-converted by use of the mixers to mix the transmission signals ST1 to ST4 with the local signals, image signals are introduced into the output signals of the mixers. Image signals are interference signals occurring with a desired signal in a target frequency range, which are centered on the frequency band of the local signal. The image signals may be suppressed by mixing the in-phase signals ST1-I to ST4-I and the quadrature signals ST1-Q to ST4-Q With the two local signals LO-I and LO-Q that ate orthogonal to one another at the mixers and then combining these signals.

The wireless signal processing circuit 20A has a structure in which the third and fourth phase switching sections 410c and 410d, the third and fourth variable amplifiers 420c and 420d, and the third and fourth mixers 500c and 500d are added to the wireless signal processing circuit 20 according to the first exemplary embodiment. Thus, image signals may be suppressed by processing that mixes the in-phase signals ST1-I to ST4-I and quadrature signals ST1-Q to ST4-Q with the two local signals LO-I and LO-Q that are orthogonal to one another and combines the up-converted signals.

In the wireless signal processing circuit 20A, the in-phase signals ST1-I to ST4-I and quadrature signals ST1-Q to ST4-Q are used in switching the phases of the transmission signals ST1 to ST4 to the four quadrants and are used for suppression of image signals. Thus, because the in-phase sisals and quadrature signals are used for both phase control and image signal suppression, an increase in circuit size (areas occupied by circuitry) may be suppressed.

According to the wireless signal processing circuit 20A, similarly to the wireless signal processing circuit 20 according to the first exemplary embodiment, distribution of the transmission signals ST1 to ST4 to the wireless signal processing circuits 20A is conducted at relatively low frequencies in the baseband range or intermediate frequency band. Therefore, according to the wireless device 10 equipped with the wireless signal processing circuits 20A, signal losses may be smaller than in the wireless device 10X according to the first reference example. Further, according to the wireless signal processing circuit 20A, similarly to the wireless signal processing circuit 20 according to the first exemplary embodiment, the number of high-frequency blocks HF may be reduced and thus an increase in circuit size (areas occupied by circuitry) may be suppressed. Local terminals at which the first local signal LO-I is inputted to the first and second mixers 500a and 500b are common (connected together) and local terminals at which the second local signal LO-Q is inputted to the third and fourth mixers 500c and 500d are common (connected together). RF terminals at which RF signals are outputted from the first to fourth mixers 500a to 500d are common (connected together). Therefore, the mixer sections may be constituted by, for example, multifinger transistors, and the mixer sections may be structured very compactly.

In a modification of the example depicted in FIG. 8, the first to fourth variable amplifiers 420a to 420d may be disposed at the respective input sides of the first to fourth phase switching sections 410a to 410d.

Third Exemplary Embodiment

Figure 10:
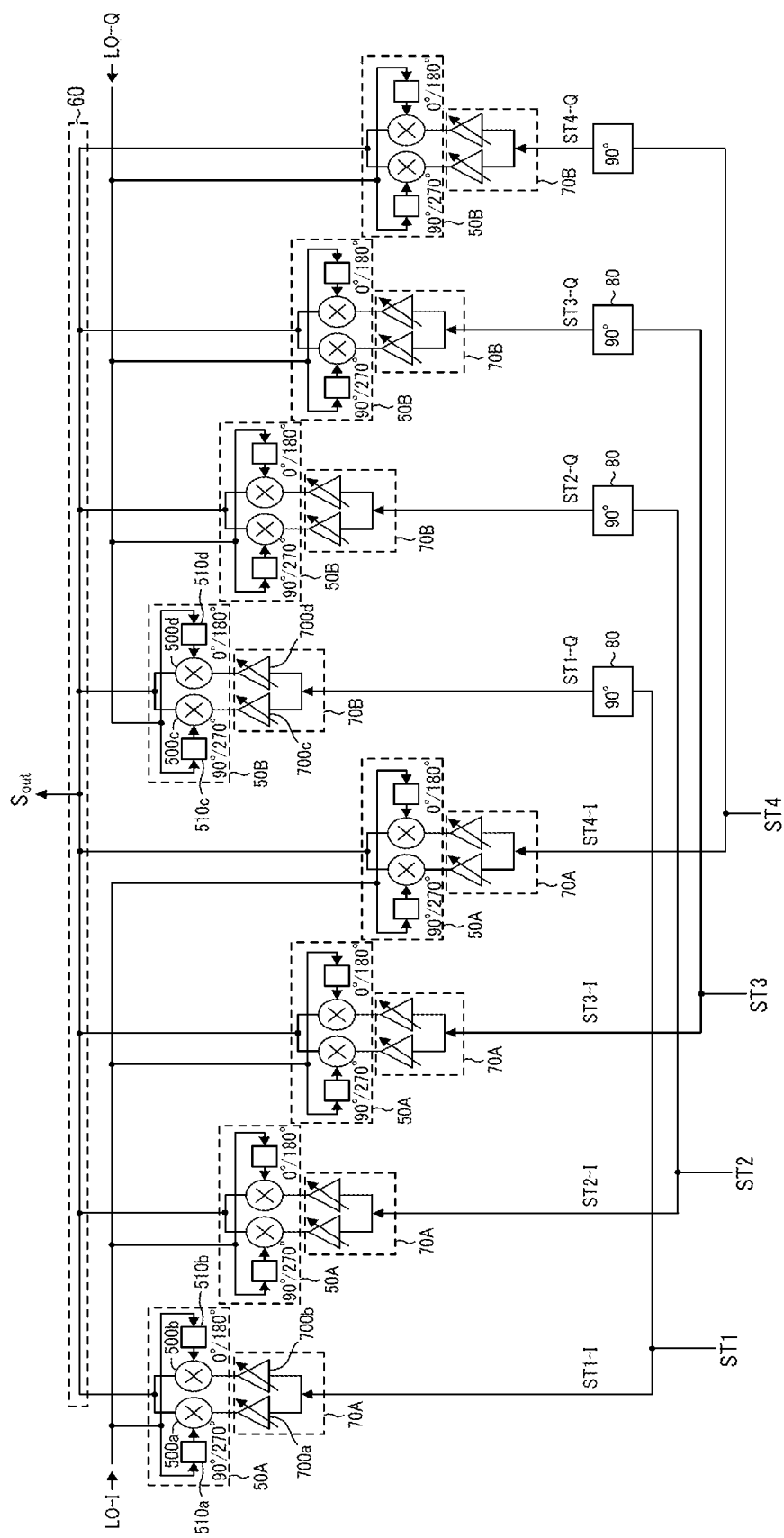
FIG. 10 is a diagram showing an example of structures of a wireless signal processing circuit according to a third exemplary embodiment of the disclosed technology.

FIG. 10 is a diagram showing an example of structures of a wireless signal processing circuit 20B according to a third exemplary embodiment of the disclosed technology. The wireless signal processing circuits 20B are provided in respective correspondence with the plural antenna elements AN. Each wireless signal processing circuit 20B has a structure in which a function that suppresses image signals is added to the wireless signal processing circuit 20Y according to the second reference example depicted in FIG. 5.

The wireless signal processing circuit 20B includes a plural number of the phase rotation sections 80, a plural number of first amplitude control sections 70A, a plural number of second amplitude control sections 70B, a plural number of first mixer sections 50A, a plural number of second mixer sections 50B, and the combination portion 60.

The plural phase rotation sections 80 are provided in respective correspondence with the transmission signals ST1 to ST4. Each phase rotation section 80 rotates the phase of the corresponding transmission signal by 90°. That is, the phase rotation section 80 corresponding to the transmission signal ST1 outputs the quadrature signal ST1-Q. Similarly, the phase rotation sections 80 corresponding to the transmission signals ST2 to ST4 output respective quadrature signals ST2-Q to ST4-Q.

The plural first amplitude control sections 70A and the plural first mixer sections 50A are provided in respective correspondence with the transmission signals ST1 to ST4. Similarly, the plural second amplitude control sections 70B and the plural second mixer sections 50B are provided in respective correspondence with the transmission signals ST1 to ST4.

Each first amplitude control section 70A alters the amplitude of the corresponding transmission signal. The first amplitude control section 70A is provided with the first variable amplifier 700a and second variable amplifier 700b. The first amplitude control section 70A distributes the corresponding transmission signal along two paths, supplying one distributed signal to the first variable amplifier 700a and supplying the other to the second variable amplifier 700b.

The first and second variable amplifiers 700a and 700b alter respective amplitudes of the corresponding transmission signal in accordance with the transmission direction of the transmission signal. For example, the first and second variable amplifiers 700a and 700b corresponding to the transmission signal ST1 alter respective amplitudes of the in-phase signal ST1-1 that is in phase with the transmission signal ST1 in accordance with the transmission direction of the transmission signal ST1. Amplitude alteration ratios (amplification factors) of the first and second variable amplifiers 700a and 700b are set in accordance with the weightings W provided from the controller 30.

Each second amplitude control section 70B alters the amplitude of the quadrature signal whose phase has been rotated 90° from the corresponding transmission signal. The second amplitude control section 70B is provided with a third variable amplifier 700c and a fourth variable amplifier 700d. The second amplitude control section 70B distributes the corresponding quadrature signal along two paths, Supplying one distributed signal to the third variable amplifier 700c and supplying the other to the fourth variable amplifier 700d.

The third and fourth variable amplifiers 700c and 700d alter respective amplitudes of the corresponding quadrature signal in accordance with the transmission direction of the corresponding transmission signal. For example, the third and fourth variable amplifiers 700c and 700d corresponding to the transmission signal ST1 alter respective amplitudes of the quadrature signal ST1-Q, whose phase is rotated 90° from the transmission signal ST1, in accordance with the transmission direction of the transmission signal ST1. Amplitude alteration ratios (amplification factors) of the third and fourth variable amplifiers 700c and 700d are set in accordance with the weightings W provided from the controller 30.

Each of the plural first mixer sections 50A is provided with the first phase switching section 510a, the first mixer 500a, the second phase switching section 510b and the second mixer 500b. Each of the first and second phase switching sections 510a and 510b selectively switches a phase rotation amount of the first local signal LO-I in accordance with the transmission direction of the corresponding transmission signal, and the first and second phase switching sections 510a and 510b rotate the phase of the first local signal LO-I by the selected rotation amounts. A phase rotation amount at the first phase switching section 510a is set to 90° or 270° in accordance with the weighting W provided from the controller 30. A phase rotation amount at the second phase switching section 510b is set to 0° or 180° in accordance with the weighting W provided from the controller 30.

The first mixer 500a uses the first local signal LO-I whose phase has been rotated by the first phase switching section 510a to up-convert the frequency of the output signal from the first variable amplifier 700a. The second mixer 500b uses the first local signal LO-I whose phase has been rotated by the second phase switching section 510b to up-convert the frequency of the output signal from the second variable amplifier 700b. Thus, the transmission signals ST1 to ST4 in the baseband range or intermediate frequency band are up-converted to the RF band (or millimeter wave band) by the plural first mixer sections 50A.

Each of the plural second mixer sections 50B is provided with a third phase switching section 510c, the third mixer 500c, a fourth phase switching section 510d and the fourth mixer 500d. Each of the third and fourth phase switching sections 510c and 510d selectively switches a phase rotation amount of the second local signal LO-Q, whose phase is rotated 90° relative to the first local signal LO-I, in accordance with the transmission direction of the corresponding transmission signal, and the third and fourth phase switching sections 510c and 510d rotate the phase of the second local signal LO-Q by the selected rotation amounts. A phase rotation amount at the third phase switching section 510c is set to 90° or 270° in accordance with the weighting W provided from the controller 30. A phase rotation amount at the fourth phase switching section 510d is set to 0° or 180° in accordance with the weighting W provided froth the controller 30.

The third mixer 500c uses the second local signal LO-Q whose phase has been rotated by the third phase switching section 510c to up-convert the frequency of the output signal from the third variable amplifier 700c. The fourth mixer 500d uses the second local signal LO-Q whose phase has been rotated by the fourth phase switching section 510d to up-convert the frequency of the output signal from the fourth variable amplifier 700d. Thus, the transmission signals ST1 to ST4 in the baseband range or intermediate frequency band are up-converted to the RF band (or millimeter wave band) by the second mixer sections 50B.

The transmission signals ST1 to ST4 whose amplitudes have been controlled at the corresponding first and second variable amplifiers 700a and 700b and whose frequencies have been converted at the corresponding first and second mixer sections 50A and 50B are then combined at the combination portion 60. Thus, the output signals $S_{out1}$ to $S_{out8}$ are generated at the respective wireless signal processing circuits 20B. FIG. 10 shows the wireless signal processing circuit 20B that outputs the output signal $S_{out1}$ as an example. Each combination portion 60 is connected to the corresponding antenna element AN, and the output signals $S_{out1}$ to $S_{out8}$ are radiated from the corresponding antenna elements AN.

The phases of the transmission signals ST1 to ST4 can be switched in quadrants by settings of the phase rotation amounts at the first to fourth phase switching sections 510a to 510d. In accordance with settings of the amplitude alteration ratios (amplification factors) at the first to fourth variable amplifiers 700a to 700d, phase rotation amounts of the transmission signals may be controlled in ranges from 0° to 360°.

According to the wireless signal processing circuit 20B, similarly to the wireless signal processing circuit 20 according to the first exemplary embodiment of the disclosed technology, transmission beams may be formed towards respective terminals. In addition, distribution of the transmission signals ST1 to ST4 to the wireless signal processing circuit 20B is conducted at relatively low frequencies in the baseband range or intermediate frequency band. Therefore, signal losses may be smaller than in the wireless device 10X according to the first reference example (see FIG. 1).

The wireless signal processing circuit 20B has a structure in which the third and fourth phase switching sections 510c and 510d, the third and fourth variable amplifiers 700c and 700d, and the third and fourth mixers 500c and 500d are added to the wireless signal processing circuit 20Y according to the second reference example (see FIG. 5). Thus, image signals may be suppressed by processing that mixes the in-phase signals ST1-I to ST4-I and quadrature signals ST1-Q to ST4-Q with the two local signals LO-I and LO-Q that are orthogonal to one another and combines the up-converted signals.

Fourth Exemplary Embodiment

Figure 11:
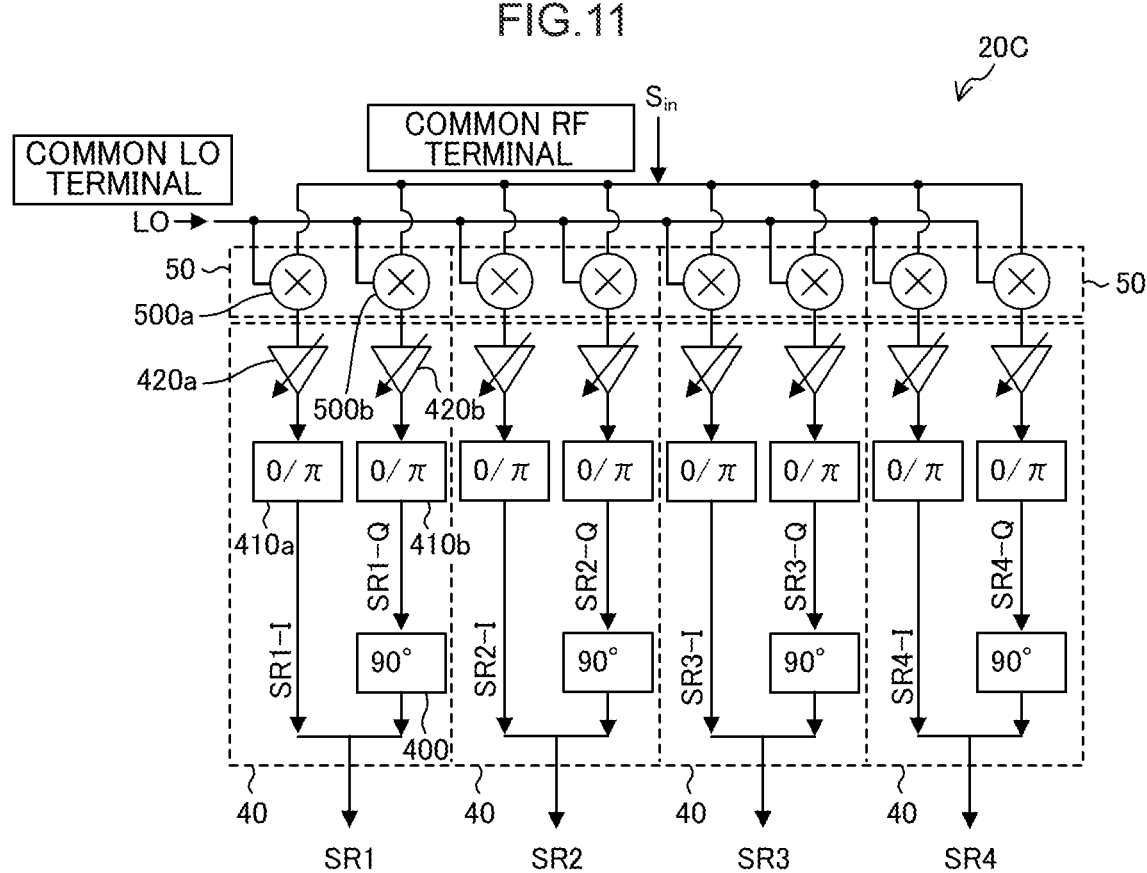
FIG. 11 is a diagram showing an example of structures of a wireless signal processing circuit according to a fourth exemplary embodiment of the disclosed technology.

FIG. 11 is a diagram Showing an example of structures of a wireless signal processing circuit 20C according to a fourth exemplary embodiment of the disclosed technology. The wireless signal processing circuits 20C are provided in respective correspondence with the plural antenna elements AN. The wireless signal processing circuits 20, 20A and 20B according to the first to third exemplary embodiments described above feature functions that form the transmission beams B1 to B4 towards the terminals 101 to 104 and transmit the transmission signals ST1 to ST4. In contrast, the wireless signal processing circuit 20C according to the present exemplary embodiment features functions for forming reception beams of respective signals transmitted from the terminals 101 to 104 (below referred to as reception signals SR1 to SR4) and receiving the reception beams.

The wireless signal processing circuit 20C has structures corresponding to the wireless signal processing circuit 20 according to the first exemplary embodiment (see FIG. 4). That is, the wireless signal processing circuit 20C is provided with a plural number of the phase control sections 40 and a plural number of the mixer sections 50. The plural phase control sections 40 and plural mixer sections 50 are provided in respective correspondence with the reception signals SR1 to SR4. Via the corresponding antenna element AN, the wireless signal processing circuit 20C receives an input signal $S_{in}$ combining the respective reception signals SR1 to SR4 transmitted from the terminals 101 to 104. The input signal $S_{in}$ is distributed to the plural mixer sections 50.

The plural mixer sections 50 are provided in respective correspondence with the reception signals SR1 to SR4 and down-convert a frequency of the input signal $S_{in}$ combining the respective reception signals SR1 to SR4. Each mixer section 50 is provided with the first mixer 500a and second mixer 500b. The first and second mixers 500a and 500b use a local signal LO to down-convert the frequency of the input signal $S_{in}$ in a respective RF band (or is wave band) to a baseband range or intermediate frequency band.

The plural phase control sections 40 are provided in respective correspondence with the plural mixer sections 50. Each phase control section 40 alters the phase of the signal whose frequency has been down-converted by the corresponding mixer section 50 in accordance with an arrival direction of the corresponding reception signal.

Each phase control section 40 is provided with the phase rotation section 400, the first phase switching section 410a, the second phase switching section 410b, the first variable amplifier 420a and the second variable amplifier 420b.

The first variable amplifier 420a alters the amplitude of an output signal from the first mixer 500a in accordance with the arrival direction of the corresponding reception signal. Similarly, the second variable amplifier 420b alters the amplitude of an output signal from the second mixer 500b in accordance with the arrival direction of the corresponding reception signal. Amplitude alteration ratios (amplification factors) of the first variable amplifier 420a and second variable amplifier 420b are set in accordance with the weightings W provided from the controller 30.

The first phase switching section 410a switches a phase rotation amount of an output signal from the first variable amplifier 420a selectively in accordance with the arrival direction of the corresponding reception signal. The first phase switching section 410a rotates the phase of the output signal from the first variable amplifier 420a by the selected rotation amount and outputs an in-phase signal of the corresponding reception signal (SR1-I to SR4-I).

The second phase switching section 410b switches a phase rotation amount of an output signal from the second variable amplifier 420b selectively in accordance with the arrival direction of the corresponding reception signal. The second phase switching section 410b rotates the phase of the output signal from the second variable amplifier 420b by the selected rotation amount and outputs a quadrature signal of the corresponding reception signal (SR1-Q to SR4-Q). The phase rotation amounts of the first phase switching section 410a and second phase switching section 410b are set to 0° or 180° in accordance with the weightings W provided from the controller 30.

The phase rotation section 400 generates an in-phase signal of the corresponding reception signal by rotating the phase of the quadrature signal (SR1-Q to SR4-Q) that is the output signal of the second phase switching section 410b by 90°. The output signal of the first phase switching section 410a is combined with the output signal of the phase rotation section 400. Thus, the reception signals SR1 to SR4 are separately extracted.

Thus, flows of signals in the wireless signal processing circuit 20C are the opposite of flows of signals in the wireless signal processing circuit 20 according to the first exemplary embodiment, and the sequence of processing is reversed. According to the wireless signal processing circuit 20C according to the present exemplary embodiment, similarly to the wireless signal processing circuit 20 according to the first exemplary embodiment, signal losses may be suppressed while an increase in circuit size (areas occupied by circuitry) is suppressed. Local terminals at which the local signal LO is fed into the first and second mixers 500a and 500b are common (connected together), and RF terminals at which the input signal $S_{in}$ that is an RF signal is fed in are common (connected together). Therefore, the mixer sections 50 may be constituted by, for example, multifinger transistors, and the mixer sections 50 may be structured very compactly.

In a modification of the example depicted in FIG. 11, the first and second variable amplifiers 420a and 420b may be disposed at the respective output sides of the first and second phase switching sections 410a and 410b.

Fifth Exemplary Embodiment

Figure 12:
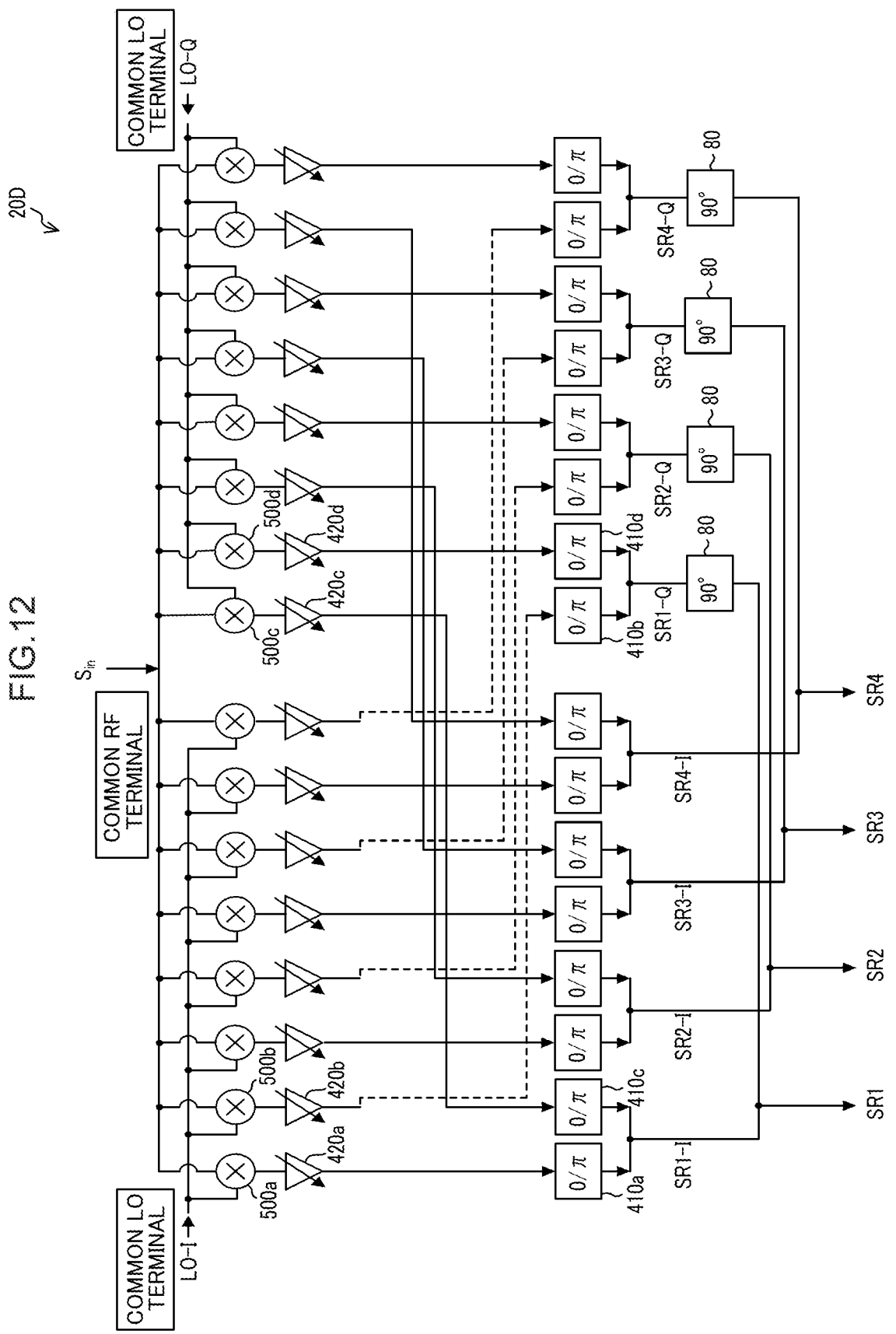
FIG. 12 is a diagram showing an example of structures of a wireless signal processing circuit according to a fifth exemplary embodiment of the disclosed technology.

FIG. 12 is a diagram showing an example of structures of a wireless signal processing circuit 20D according to a fifth exemplary embodiment of the disclosed technology. The wireless signal processing circuits 20D are provided in respective correspondence with the plural antenna elements AN. Each wireless signal processing circuit 20D features functions for forming reception beams of respective signals transmitted from the terminals 101 to 104 and receiving the reception beams.

The wireless signal processing circuit 20D has structures corresponding to the wireless signal processing circuit 20A according to the second exemplary embodiment (see FIG. 9). Flows of signals in the wireless signal processing circuit 20D are the opposite of flows of signals in the wireless signal processing circuit 20A according to the second exemplary embodiment, and the sequence of processing is reversed. The wireless signal processing circuit 20D receives the input signal $S_{in}$ combining the respective reception signals SR1 to SR4 transmitted from the terminals 101 to 104, and separately extracts the reception signals SR1 to SR4 included in the input signal Sin.

According to the wireless signal processing circuit 20D according to the present exemplary embodiment, similarly to the wireless signal processing circuit 20A according to the second exemplary embodiment, signal losses may be suppressed while an increase in circuit size (areas occupied by circuitry) is suppressed, in addition to which image signals may be suppressed. Moreover, local terminals at which the first local signal LO-I is inputted to the first and second mixers 500a and 500b are common (connected together) and local terminals at which the second local signal LO-Q is inputted to the third and fourth mixers 500c and 500d are common (connected together). RF terminals at which the input signal which is an RF signal, is inputted to the first to fourth mixers 500a to 500d are also common (connected together). Therefore, the mixer sections may be constituted by, for example, multifinger transistors, and the mixer sections may be structured very compactly.

In a modification of the example depicted in FIG. 12, the first to fourth variable amplifiers 420a to 420d may be disposed at the respective output sides of the first to fourth phase switching sections 410a to 410d.

Sixth Exemplary Embodiment

Figure 13:
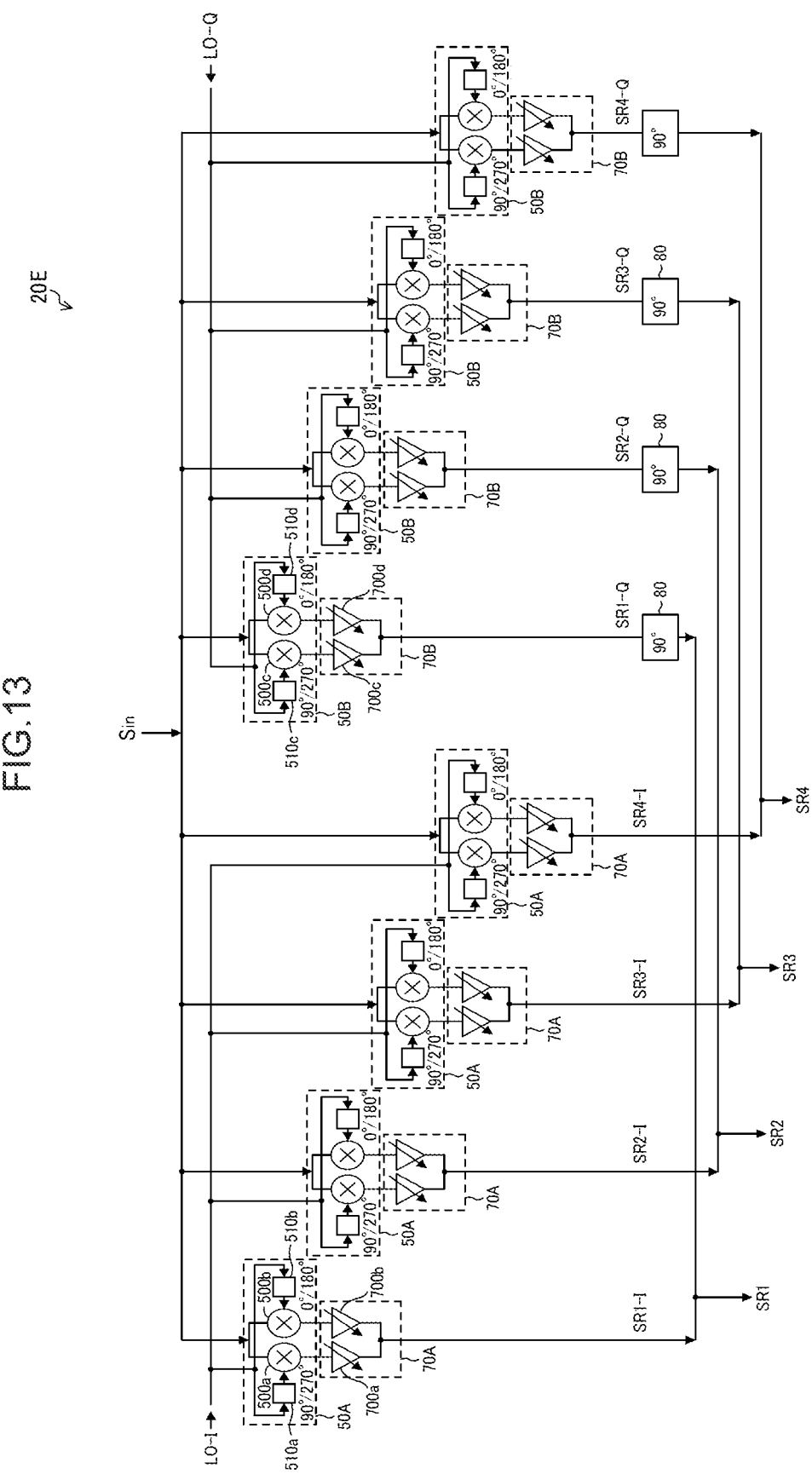
FIG. 13 is a diagram showing an example of structures of a wireless signal processing circuit according to a sixth exemplary embodiment of the disclosed technology.

FIG. 13 is a diagram showing an example of structures of a wireless signal processing circuit 20E according to a sixth exemplary embodiment of the disclosed technology. The wireless signal processing circuits 20E are provided in respective correspondence with the plural antenna elements AN. Each wireless signal processing circuit 20E features functions for forming reception beams of respective signals transmitted from the terminals 101 to 104 and receiving the reception beams.

The wireless signal processing circuit 20E has structures corresponding to the wireless signal processing circuit 20B according to the third exemplary embodiment (see FIG. 10). Flows of signals in the wireless signal processing circuit 20E are the opposite of flows of signals in the wireless signal processing circuit 20B according to the third exemplary embodiment, and the sequence of processing is reversed. The wireless signal processing circuit 20E receives the input signal $S_{in}$ combining the respective reception signals SR1 to SR4 transmitted from the terminals 101 to 104, and separately extracts the reception signals SR1 to SR4 included in the input signal Sin.

According to the wireless signal processing circuit 20E according to the present exemplary embodiment, similarly to the wireless signal processing circuit 20B according to the third exemplary embodiment, signal losses may be suppressed while an increase in circuit size (areas occupied by circuitry) is suppressed, in addition to which image signals may be suppressed.

Seventh Exemplary Embodiment

Figure 14:
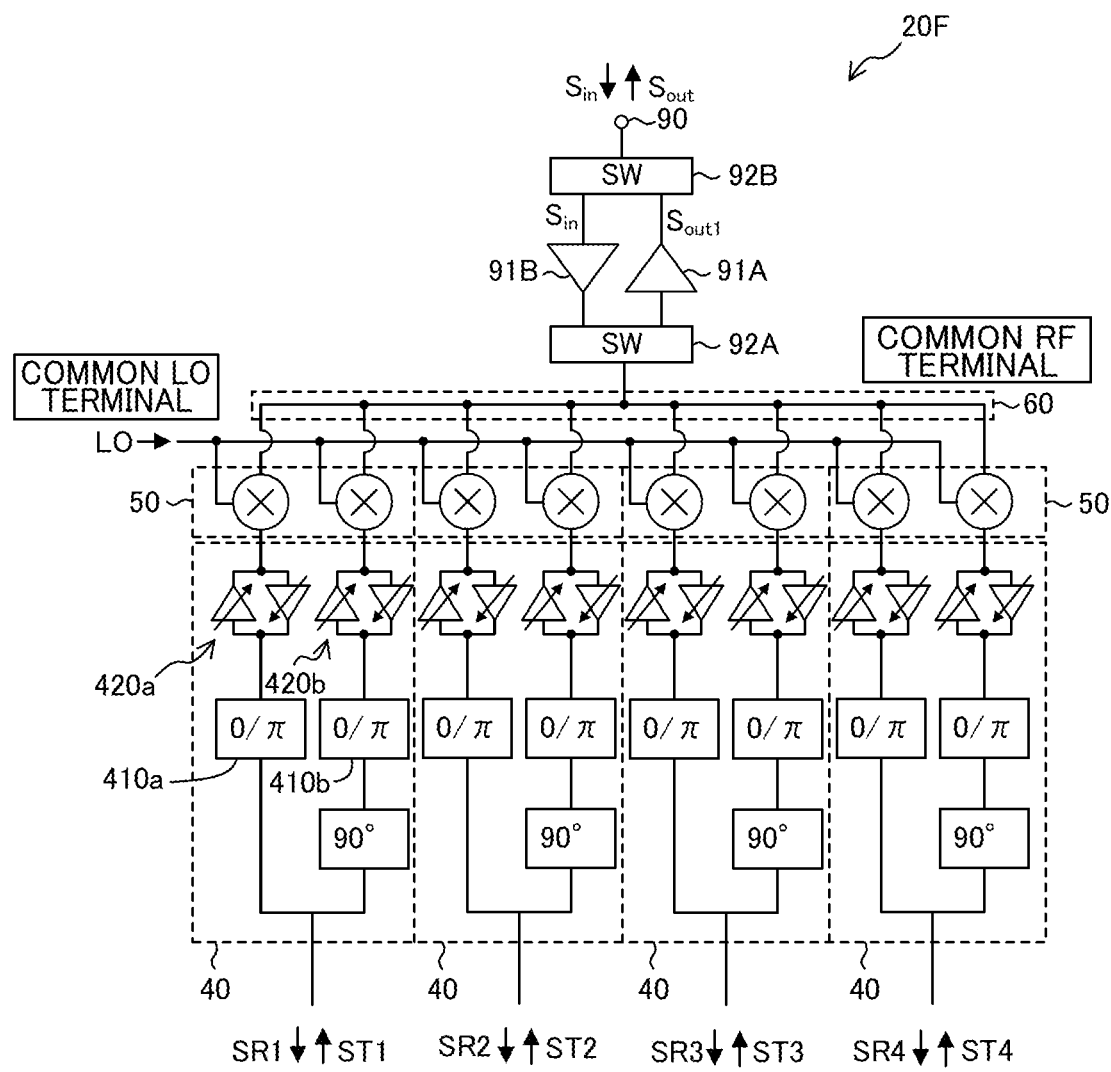
FIG. 14 is a diagram showing an example of structures of a wireless signal processing circuit according to a seventh exemplary embodiment of the disclosed technology.

FIG. 14 is a diagram showing an example of structures of a wireless signal processing circuit 20F according to a seventh exemplary embodiment of the disclosed technology. The wireless signal processing circuits 20F are provided in respective correspondence with the plural antenna elements AN. Each wireless signal processing circuit 20F features both functions for forming the transmission beams B1 to B4 towards the terminals 101 to 104 and transmitting the transmission signals, and functions for forming and receiving reception beams of respective signals transmitted from the terminals 101 to 104.

The wireless signal processing circuit 20F has structures corresponding to the wireless signal processing circuit 20 according to the first exemplary embodiment (see FIG. 4) and the wireless signal processing circuit 20C according to the fourth exemplary embodiment (FIG. 11). The wireless signal processing circuit 20F is equipped with a plural number of the phase control sections 40 and the plural number of the mixer sections 50. The plural phase control sections 40 and plural mixer sections 50 are provided in respective correspondence with the transmission signals ST1 to ST4 and with the reception signals SR1 to SR4.

When the wireless signal processing circuit 20F is transmitting signals, each phase control section 40 controls the phase of the corresponding transmission signal in accordance with the transmission direction of the transmission signal. Each mixer section 50 up-converts the frequency of the transmission signal whose phase has been controlled by the corresponding phase control section. The respective output signals of the plural mixer sections are combined at the combination portion 60 to generate an output signal $S_{out}$. The output signal $S_{out}$ is radiated via the corresponding antenna element AN.

When the wireless signal processing circuit 20F is receiving signals, the input signal $S_{in}$ combining the respective reception signals SR1 to SR4 transmitted from the terminals 101 to 104 is distributed to each of the mixer sections 50. Each mixer section 50 down-converts the frequency of the input signal $S_{in}$ combining the plural reception signals SR1 to SR4. Each phase control section 40 alters the phase of the signal whose frequency has been down-converted by the mixer section 50 in accordance with the arrival direction of the corresponding reception signal.

Between an input/output terminal 90 and the combination portion 60, the wireless signal processing circuit 20F includes a transmission amplifier 91A, a reception amplifier 91B, and switches 92A and 92B. The transmission amplifier 91A is deployed when signals are being transmitted and increases the amplitude of the output signal $S_{out}$ that is outputted from the input/output terminal 90. The reception amplifier 91B is deployed when signals are being received and increases the amplitude of the input signal $S_{in}$ that is inputted at the input/output terminal 90.

The switches 92A and 92B each have the form of a single-pole double-throw (SPDT) switch, switching between a path passing through the transmission amplifier 91A and a path passing through the reception amplifier 91B. Switching control of the switches 92A and 92B is conducted such that the path passing through the transmission amplifier 91A is selected when signals are being transmitted and the path passing through the reception amplifier 91B is selected when signals are being received.

In each phase control section 40, the first variable amplifier 420a and the second variable amplifier 420b are each provided with a variable amplifier for transmission and a variable amplifier for reception, which are connected in parallel. The variable amplifier for transmission is deployed when signals are being transmitted and the variable amplifier for reception is deployed when signals are being received.

According to the wireless signal processing circuit 20F according to the present exemplary embodiment, the mixer sections 50 and phase control sections 40 are used for both transmitting signals and receiving signals. Therefore, circuit size (areas occupied by circuitry) may be made smaller than in a structure in which the mixer sections 50 and phase control sections 40 are constituted separately for transmission and for reception. Local terminals at which the local signal LO is inputted into the mixers constituting the plural mixer sections are common (connected together), and RF terminals at which RF signals are inputted or outputted are common (connected together). Therefore, the mixer sections 50 may be constituted by, for example, multifinger transistors, and the mixer sections 50 may be structured very compactly. The first and second variable amplifiers 420a and 420b may be disposed at either of the respective input sides or output sides of the first and second phase switching sections 410a and 410b.

Eighth Exemplary Embodiment

Figure 15A:
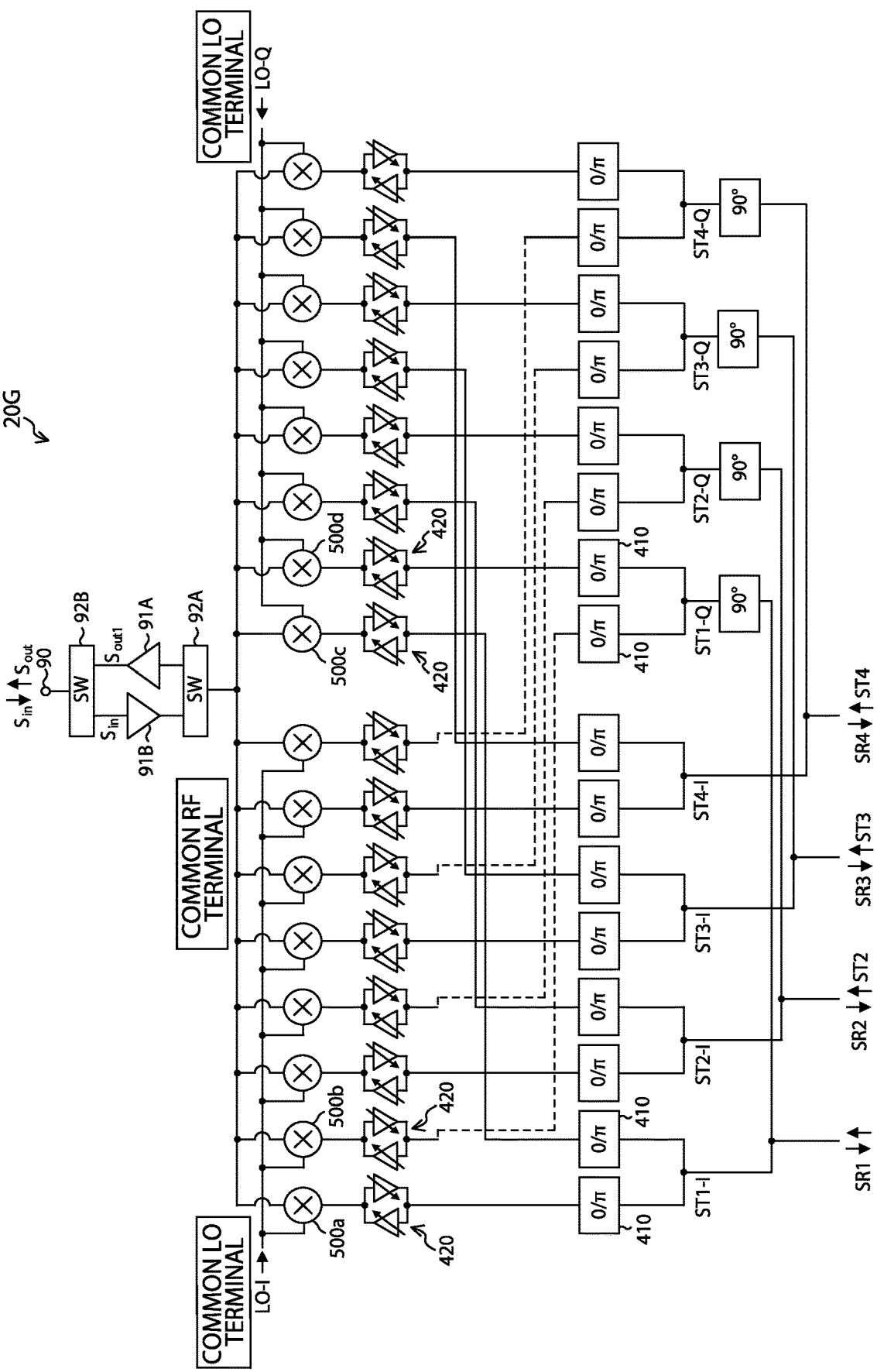
FIG. 15A is a diagram showing an example of structures of a wireless signal processing circuit according to an eighth exemplary embodiment of the disclosed technology.

FIG. 15A is a diagram showing an example of structures of a wireless signal processing circuit 20G according to an eighth exemplary embodiment of the disclosed technology. The wireless signal processing circuits 20G are provided in respective correspondence with the plural antenna elements AN. Each wireless signal processing circuit 20G features both functions for forming the transmission beams B1 to B4 towards the terminals 101 to 104 and transmitting the transmission signals, and functions for forming and receiving reception beams of respective signals transmitted from the terminals 101 to 104. The wireless signal processing circuit 20G has structures corresponding to the wireless signal processing circuit 20A according to the second exemplary embodiment (see FIG. 9) and the wireless signal processing circuit 20D according to the fifth exemplary embodiment (FIG. 12).

In the wireless signal processing circuit 20G, a plural number of phase switching sections 410 correspond with, for example, the transmission signal ST1. These phase switching sections 410 are provided on each of plural paths along which the in-phase signal ST1-I, which is in phase with the transmission signal ST1, is distributed and on each of plural paths along which the quadrature signal ST1-Q, whose phase is rotated by 90° from the transmission signal ST1, is distributed. In the wireless signal processing circuit 20G, the number of paths along which the in-please signal ST1-I is distributed is two and the number of paths along which the quadrature signal ST1-Q is distributed is two. That is, the number of the phase switching sections 410 corresponding with the transmission signal ST1 in the wireless signal processing circuit 20G is four. Each phase switching section 410 may input/output single-ended signals. Each phase switching section 410 corresponding with the transmission signal ST1. selectively switches a phase rotation amount of the in-phase signal ST1-I or quadrature signal ST1-Q that is distributed along the corresponding path in accordance with a transmission direction of the transmission signal ST1, and rotates the phase of that signal. Plural numbers of the phase switching sections corresponding with the transmission signals ST2 to ST4 are similar.

In the wireless signal processing circuit 20G, a plural number of variable amplifiers 420 correspond with, for example, the transmission signal ST1. These variable amplifiers 420 are provided in respective correspondence with the plural phase switching sections 410 corresponding with the transmission signal ST1, and alter the amplitudes of input signals or output signals of the corresponding phase switching sections in accordance with the transmission direction of the transmission sural ST1. The number of the variable amplifiers 420 corresponding with the transmission signal ST1 in the wireless signal processing circuit 20G is four for signal transmission and is four for signal reception. Each variable amplifier 420 may input/output single-ended signals. FIG. 15A shows as an example a structure in which the plural variable amplifiers 420 are provided between the corresponding phase switching sections 410 and mixers, but the arrangement of the variable amplifiers 420 and phase switching sections 410 may be the reverse. Plural numbers of the variable amplifiers corresponding with the transmission signals ST2 to ST4 are similar.

In the wireless signal processing circuit 20G, a plural number of the mixers correspond with, for example, the transmission signal ST1. These mixers are provided in respective correspondence with the plural phase switching sections 410 corresponding with the transmission signal ST1 and the plural variable amplifiers 420 corresponding with the transmission signal ST1. Each mixer up-converts the frequency of a signal that has been processed by the corresponding phase switching section 410 and variable amplifier 420. In the wireless signal processing circuit 20G, the phase switching sections 410, the variable amplifiers 420 and the mixers correspond 1:1:1. Therefore, the number of mixers corresponding to the transmission signal ST1 is four.

More specifically, the wireless signal processing circuit 20G is provided with the following mixers as the plural mixers corresponding with the transmission signal ST1. The wireless signal processing circuit 20G is provided with the mixer 500a that uses a first local signal LO-I to up-convert the frequency of the in-phase signal ST1-I that has been processed by the corresponding phase switching section 410 and variable amplifier 420. The wireless signal processing circuit 20G also includes the mixer 500b that uses the first local signal LO-I to up-convert the frequency of the quadrature signal ST1-Q that has been processed by the corresponding phase switching section 410 and variable amplifier 420. The wireless signal processing circuit 20G is further provided with the mixer 500c that uses a second local signal LO-Q, whose phase is rotated by 90° relative to the first local signal LO-I, to up-convert the frequency of the in-phase signal ST1-I that has been processed by the corresponding phase switching section 410 and variable amplifier 420. The wireless signal processing circuit 20G is also provided with the mixer 500d that uses the second local signal LO-Q to up-convert the frequency of the quadrature signal ST1-Q that has been processed by the corresponding phase switching section 410 and variable amplifier 420. Plural numbers of the mixers corresponding with the transmission signals ST2 to ST4 are similar. The signals that have been up-converted by the mixers 500a, 500b, 500c and 500d are combined with the output signals of the plural mixers corresponding with the transmission signals ST2 to ST4 and are outputted as the output signal $S_{out}$.

The wireless signal processing circuit 20G also features functions for receiving signals. When the wireless signal processing circuit 20G receives a signal, each of the plural mixers down-converts the frequency of the input signal $S_{in}$ combining the plural reception signals SR1 to SR4. Each of a plural number of the phase switching sections 410 corresponding with, for example, a reception signal SR1 selectively switches a phase rotation amount of the signal whose frequency has been down-converted by the corresponding mixer in accordance with the arrival direction of the reception signal SR1, and rotates the phase of that signal. Each of a plural number of the variable amplifiers 420 for signal reception corresponding with the reception signal SR1 alters the amplitude of an input signal or output signal of the corresponding phase switching section 410 in accordance with the arrival direction of the reception signal SR1.

According to the wireless signal processing circuit 20G according to the present exemplary embodiment, the mixer sections and phase control sections are used for both transmitting signals and receiving signals. Therefore, circuit size (areas occupied by circuitry) may be made smaller than in a structure in which the mixer sections and phase control sections are constituted separately for transmission and for reception. In addition, according to the wireless signal processing circuit 20G, image signals may be suppressed. Local terminals at which the first local signal LO-I is inputted to the first and second mixers 500a and 500b are common (connected together) and local terminals at which the second local signal LO-Q is inputted to the third and fourth mixers 500c and 500d are common (connected together). RF terminals at which an RF signals are inputted to the mixers 500a to 500d are also common (connected together).

FIG. 15B is a diagram illustrating a structure in which each mixer of the wireless signal processing circuit 20G depicted in FIG. 15A is constituted by a transistor. The mixer constituted by the transistor 500 is a mixer for both transmission and reception. Bias circuits, matching circuits and the like are not depicted in FIG. 15B. This kind of mixer is referred to as a resistive mixer (or a switching mixer). A local signal is inputted at the gate of the transistor 500. The drain (or source) of the transistor 500 is an RF terminal that outputs art RF signal. The source (or drain) of the transistor 500 is intermediate frequency (IF) terminal that inputs an output signal from the variable amplifier 420. The drain and source of the transistor 500 are specified to be at the same DC potential, which is the reason this mixer is referred to as a resistive mixer. The gates at which the fast local signal LO-I is inputted are common (connected together), and the gates at which the second local signal LO-Q is inputted are common (connected together). The drains at which the RF signals are outputted are common (connected together). The sources that are the IF terminals are separate. With regard to layout, in a single transistor layout with eight (or a multiple of eight) gate fingers, only the sources are structured to be separate. The eight gate fingers may be treated as a single circuit block and the layout may be made very compact.

Ninth Exemplary Embodiment

Figure 16:
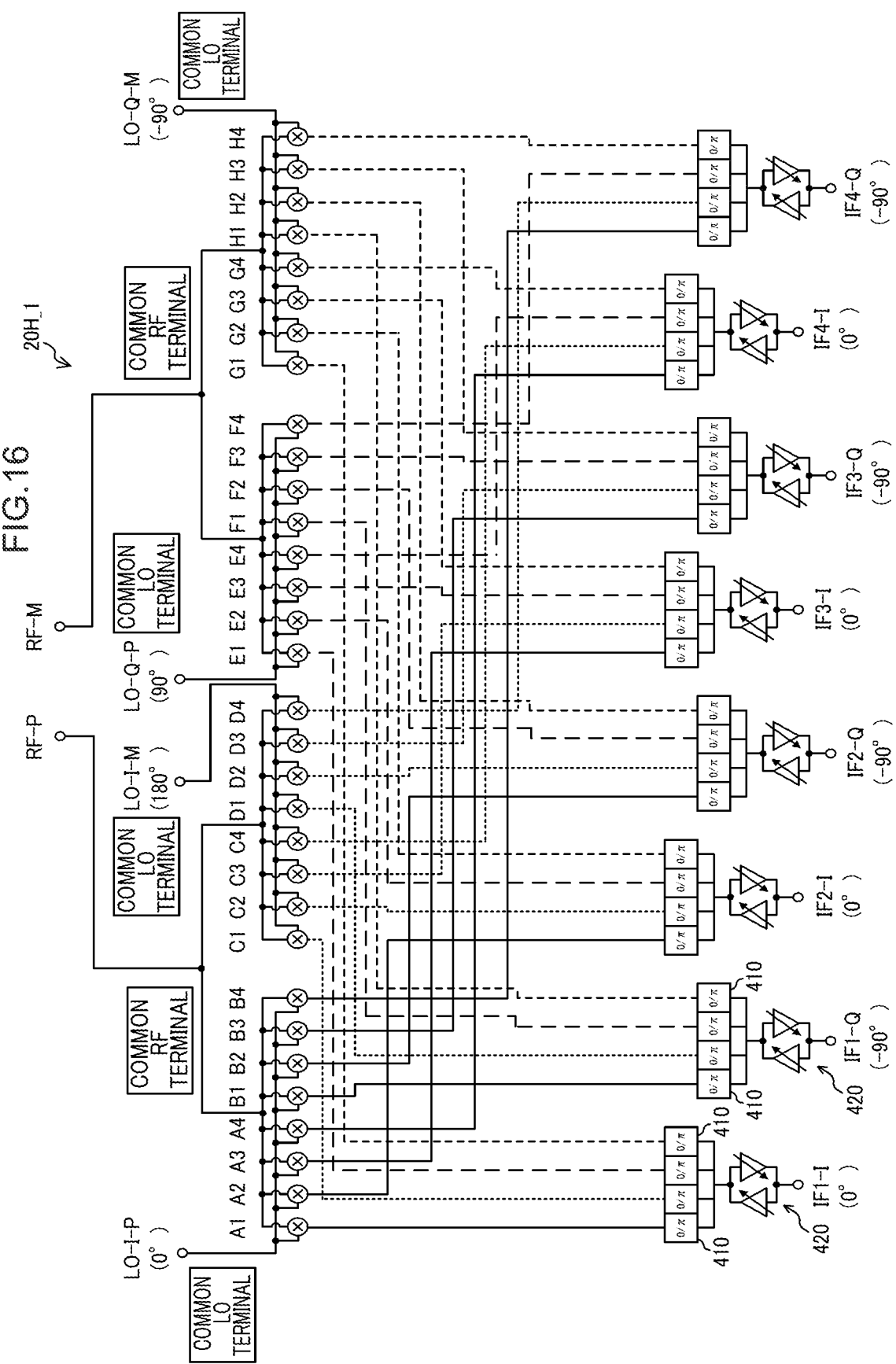
FIG. 16 is a diagram showing an example of structures of a wireless signal processing circuit according to a ninth exemplary embodiment of the disclosed technology.
Figure 17:
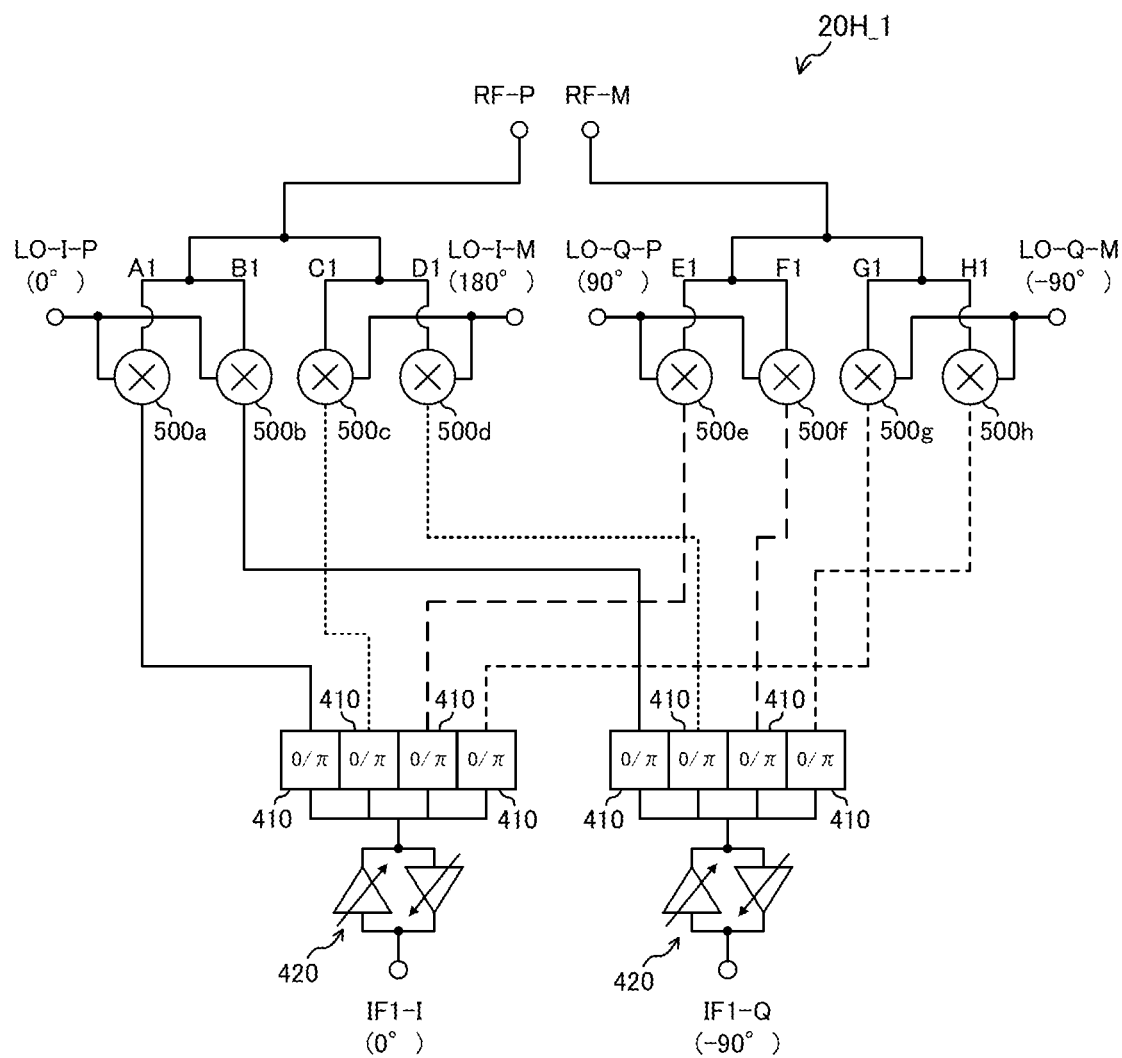
FIG. 17 is a diagram showing only portions of the wireless signal processing circuit according to the ninth exemplary embodiment of the disclosed technology that relate to one of a baseband range or an intermediate frequency band.
Figure 18:
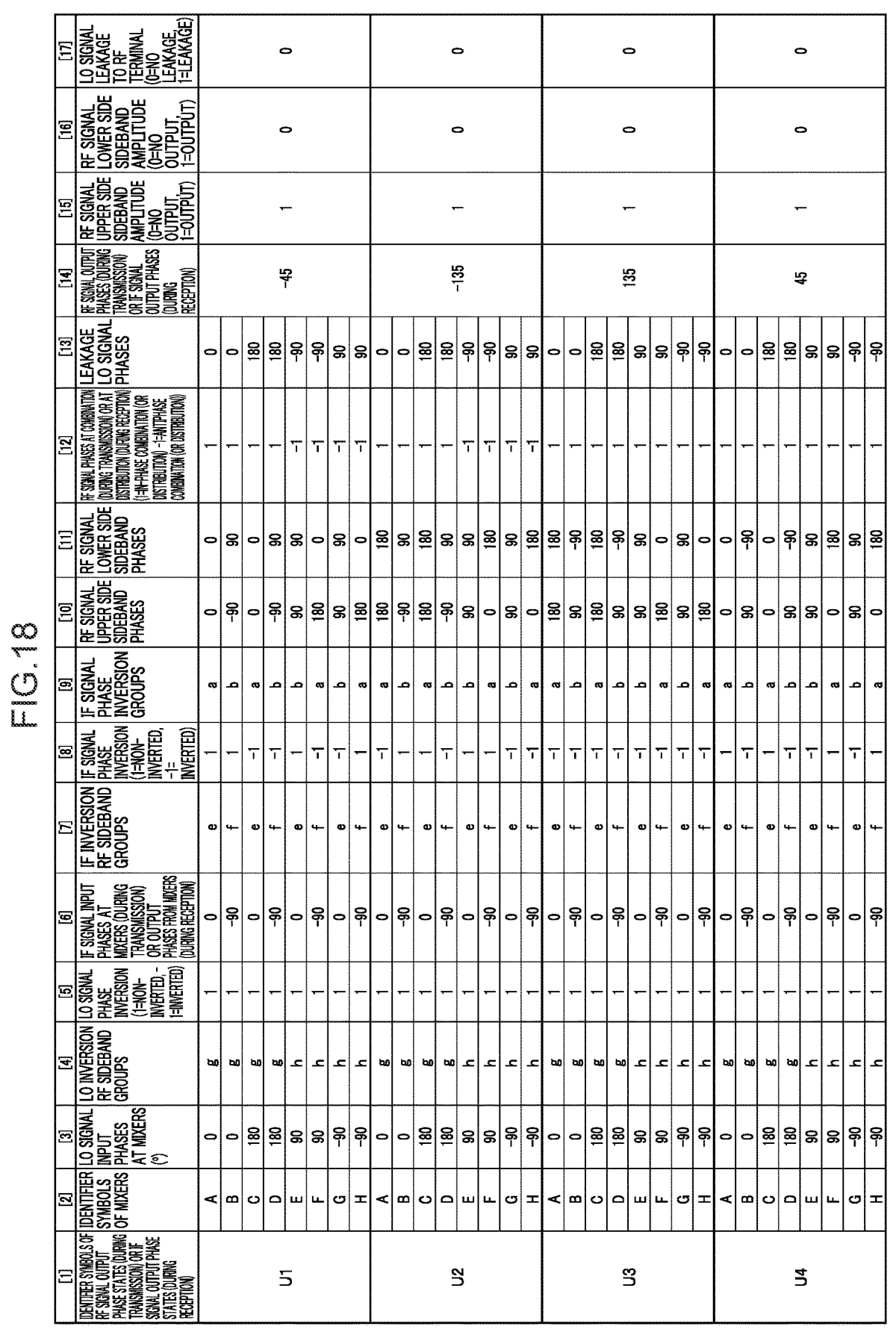

FIG. 16 is a diagram showing an example of structures of a wireless signal processing circuit 20H_1 according to a ninth exemplary embodiment of the disclosed technology. To facilitate understanding of the structures of the wireless signal processing circuit 20H_1, FIG. 17 is a diagram showing only structural portions of the wireless signal processing circuit 20H_1 that relate to one (IF1) of signals (IF1 to IF4) in a baseband range or intermediate frequency band that are processed in the wireless signal processing circuit 20H_1. FIG. 18 is a table showing examples of operations of the wireless signal processing circuit 20H_1. The signals RF-P, RF-I and RF in FIG. 16 to FIG. 18 correspond to the output signal $S_{out}$ or input signal $S_{in}$ mentioned above. The signals IF1-I to IF4-I, IF1-Q to IF4-Q and IF correspond to the transmission signals ST1 to ST4 and the reception signals SR1 to SR4 mentioned above.

The wireless signal processing circuits 20H_1 are provided in respective correspondence with the plural antenna elements AN. Each wireless signal processing circuit 20H_1 according to the present exemplary embodiment features both functions for forming the transmission beams B1 to B4 towards the terminals 101 to 104 and transmitting the transmission signals, and functions for forming and receiving reception beams of respective signals transmitted from the terminals 101 to 104.

The wireless signal processing circuit 20H_1 has a single balanced structure that inputs respective differentials between two local signals whose phases are orthogonal to one another, inputs/outputs differential signals in the RF band, and inputs/outputs single-ended signals in the baseband range or intermediate frequency band. The normal phase signal LO-I-P of the first local signal LO-I has a phase difference relative to the reference phase of 0°, and the antiphase signal LO-I-M of the first local signal LO-I has a phase difference relative to the reference phase of 180°. The normal phase signal LO-Q-P of the second local signal LO-Q has a phase difference relative to the reference phase of 90°, and the antiphase signal LO-Q-M of the second local signal LO-Q has a phase difference relative to the reference phase of −90°. A normal phase signal RF-P and antiphase signal RF-M in the RF band are outputted at times of transmission and inputted at times of reception. Normal phase signals IF1-I to IF4-I and quadrature signals IF1-Q to IF4-Q in the baseband range or intermediate frequency band are single-ended signals that are inputted at times of transmission and single-ended signals that are outputted at times of reception.

According to the wireless signal processing circuit 20H_1, signal losses may be suppressed while an increase in circuit size (areas occupied by circuitry) is suppressed, in addition to which image signals may be suppressed. Because the local signal inputted to each mixer section 50 is a differential input, resistance against external common mode (in-phase mode) noise is improved, and leakage of the local signals at the RF terminals may be suppressed. The first to fourth variable amplifiers 420a to 420d may be disposed at either of the input sides or output sides of the first to fourth phase switching sections 410a to 410d.

In the wireless signal processing circuit 20H_1, the local terminals of the mixers that input the local signal LO-I-P are common (connected together), and the local terminals of the mixers that input the local signal LO-I-M are common (connected together). The local terminals of the mixers that input the local signal LO-Q-P are common (connected together), and the local terminals of the mixers that input the local signal LO-Q-M are common (connected together). RF terminals of the mixers that input/output the RF signal RF-P are common (connected together), and RF terminals of the mixers that input/output the RF signal RF-M are common (connected together). Therefore, the mixer sections may be constituted by, for example, multifinger transistors, and the mixer sections may be structured very compactly.

The operation table depicted in FIG. 18 is a description focusing on one IF signal, describing examples (U1, U2, U3 and U4) of four phase states (one for each of four quadrants) and describing switching setting examples of the phase switching sections. A situation is illustrated in which the amplification factors of two variable amplifiers that amplify orthogonal signals are the same. The contents of the operation table of FIG. 18 are described below in a sequence represented by sequence numbers <1> to <17>.

<1> Corresponds to four (one for each quadrant: +45°, +135°, −45°, −135°) RF signal output phase states (during transmission); corresponds to IF signal output phase states during reception <2> Identifier symbols of unit (individual) mixers <3> Input phases of local signal (LO signal) at unit mixers <5> Phase inversion states of LO (1=non-inverted, −1=inverted); because this exemplary embodiment is an example in which the LO signal is not switched in quadrants, non-inverted only <6> Input phases of IF signals at unit mixers (during transmission) or output phases of IF signals at unit mixers (during reception)

<8> Phase inversion states of IF signals (0/π switching at phase switching sections: 1=non-inverted, −1=inverted)

<9> Phase inversion switching groups of IF signals (grouping at a time of quadrant switching (two groups); collective phase switching of each group)

<10> Phases of upper side sidebands of RF signals (positions at RF terminals of unit mixers)

<11> Phases of lower side sidebands of RF signals (positions at RF terminals of unit mixers)

<12> Phases of RF signals at combination (during transmission) or at distribution (during reception) (1=in-phase combination (or distribution), −1=antiphase combination (or distribution))

<13> Phases of leakage LO signals (positions at RF terminals of unit mixers)

<14> RF output phases (during transmission), IF signal output phases (during reception)

<15> Amplitude of RF upper side sideband (during transmission: 1=signal output, 0=no signal output (image rejection); during reception: 1=signal received, 0=no signal received (image rejection))

<16> Amplitude of RF lower side sideband (during transmission: 1=signal output, 0=no signal output (image rejection); during reception: 1=signal received, 0=no signal received (image rejection)); image rejection of the lower side sideband is specified in the example described in the operation table of this exemplary embodiment <17> LO signal leakage at RF terminal (0=LO signals through RF combination (distribution) are cancelled, 1=LO signals are not cancelled); a configuration in which LO signals are cancelled is formed in this exemplary embodiment A method of selecting the upper side sideband and lower side sideband for image rejection is implemented with reference to the grouping of sequence <4> or sequence <7>.
<4> RF sideband groups from LO signal inversion (divided into group g and group h)
<7> RF sideband groups from a signal inversion (divided into group e and group f)

The LO signal phase is inverted for group h (or group g), or the IF signal phase is inverted (again) for group f (or group e). For example, with IF signal phase inversion, a different sideband is rejected when the IF signals of all of group f are inverted in addition to phase inversion (or non-inversion) of the IF signals at the unit mixers of group e.

Figure 19:
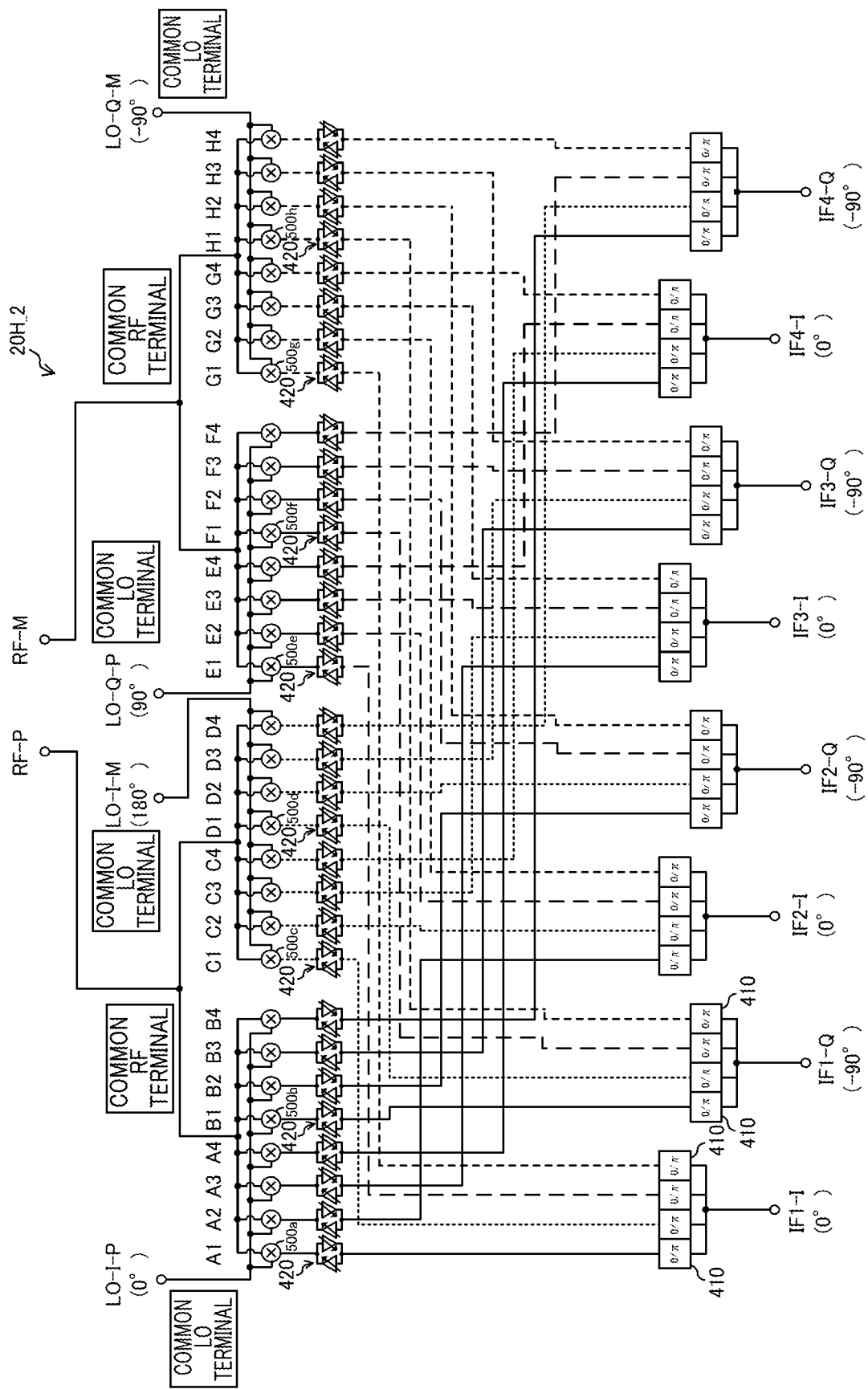
FIG. 19 is a diagram showing an example of structures of a wireless signal processing circuit according to a variant example of the ninth exemplary embodiment of the disclosed technology.
Figure 20:
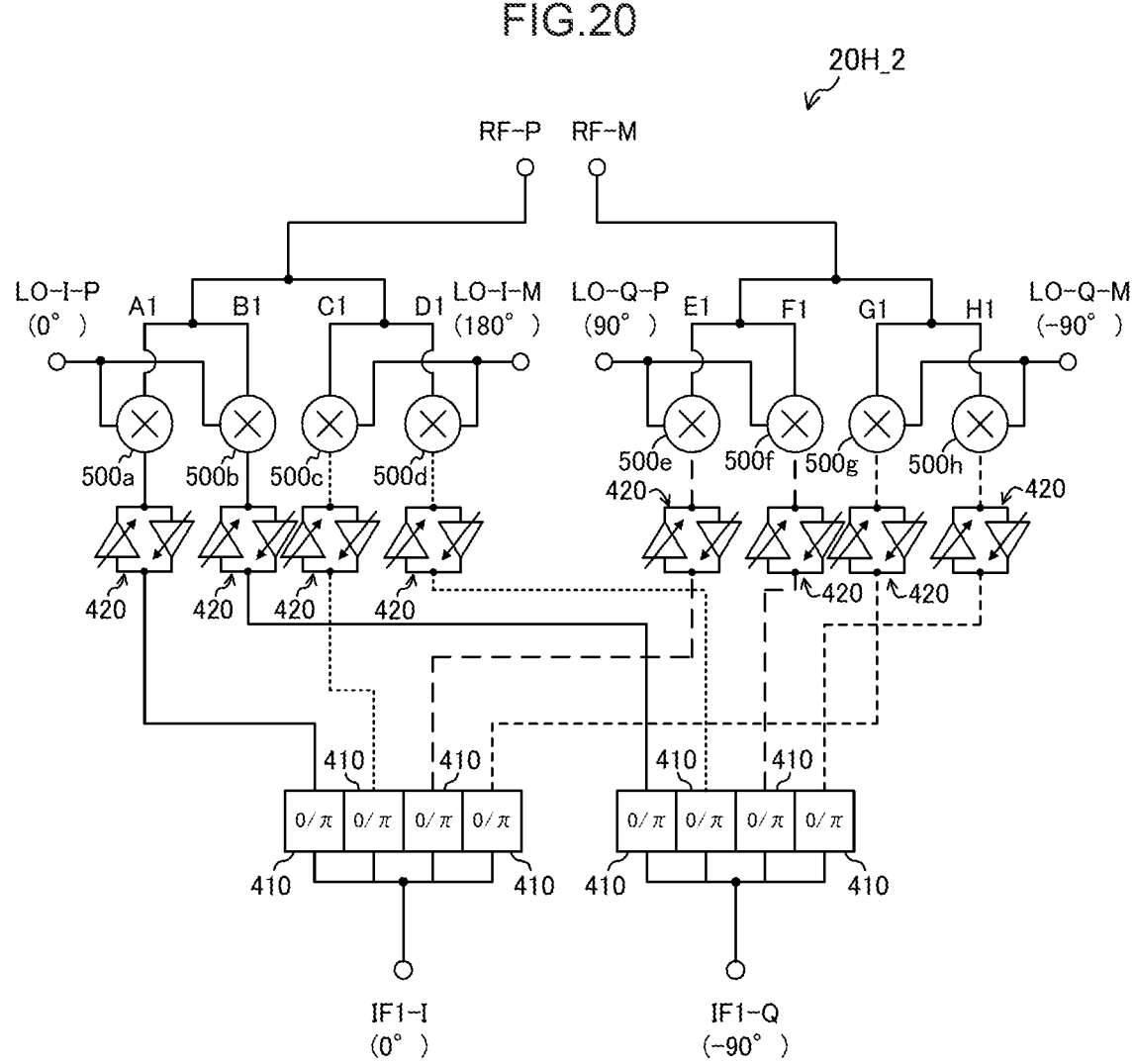
FIG. 20 is a diagram showing only portions of the wireless signal processing circuit according to the variant example of the ninth exemplary embodiment of the disclosed technology that relate to one of a baseband range or intermediate frequency band.

FIG. 19 is a diagram showing an example of structures of a wireless signal processing circuit 20H_2 that is a modification of the wireless signal processing circuit 20H_1 depicted in FIG. 16. To facilitate understanding of the structures of the wireless signal processing circuit 20H_2, FIG. 20 is a diagram showing only structural portions of the wireless signal processing circuit 20H_2 that relate to one (IF1) of the signals (IF1 to IF4) the baseband range or intermediate frequency band that are processed in the wireless signal processing circuit 20H_2. In FIG. 19 and FIG. 20, the signals RF-P and RF-I correspond to the output signal $S_{out}$ or input signal $S_{in}$ mentioned above. The signals IF1-I to IF4-I and IF1-Q to IF4-Q correspond to the transmission signals ST1 to ST4 or reception signals SR1 to SR4 mentioned above. In the wireless signal processing circuit 20H_2, arrangements of the variable amplifiers 420 differ from the wireless signal processing circuit 20H_1.

In the wireless signal processing circuit 20H_2, a plural number of the phase switching sections 410 correspond with, for example, the signal IF1. These phase switching sections 410 are provided on each of plural paths along which the in-phase signal IF1-I, which is in phase with the signal IF1, is distributed and on each of plural paths along which the quadrature signal IF1-Q, whose phase is rotated by 90° relative to the signal IF1, is distributed. In the wireless signal processing circuit 20H_2, the number of paths along which the in-phase signal IF1-I is distributed is four and the number of paths along which the quadrature signal IF1-Q is distributed is four. That is, the number of the phase switching sections 410 corresponding with the signal IF1 in the wireless signal processing circuit 20H_2 is eight. Each phase switching section 410 may input/output single-ended signals. Each phase switching section 410 corresponding with the signal IF1 selectively switches a phase rotation amount of the in-phase signal IF1-I or quadrature signal IF1-Q that is distributed along the corresponding path in accordance with a transmission direction of the signal IF1, and rotates the phase of that signal. Plural numbers of the phase switching sections corresponding with the transmission signals IF2 to IF4 are similar.

In the wireless signal processing circuit 20H_2, a plural number of the variable amplifiers 420 correspond with, for example, the signal IF1. These variable amplifiers 420 are provided in respective correspondence with the plural phase switching sections 410 corresponding with the signal IF1, and alter the amplitudes of input signals or output signals of the corresponding phase switching sections in accordance with the transmission direction of the signal IF1. The number of the variable amplifiers 420 corresponding with the signal IF1 in the wireless signal processing circuit 20H_2 is eight for signal transmission and is eight for signal reception. Each variable amplifier 420 may input/output single-ended signals. FIG. 19 and FIG. 20 show as an example a structure in which the plural variable amplifiers 420 are provided between the corresponding phase switching sections 410 and the mixers, but the arrangement of the variable amplifiers 420 and phase switching sections 410 may be the reverse. Plural numbers of the variable amplifiers corresponding with the transmission signals IF2 to IF4 are similar.

In the wireless signal processing circuit 20H_2, a plural number of the mixers correspond with, for example, the signal IF1. These mixers are provided in respective correspondence with the plural phase switching sections 410 corresponding with the signal IF1 and the plural variable amplifiers 420 corresponding with the signal IF1. Each mixer up-converts the frequency of the signal that has been processed by the corresponding phase switching section 410 and variable amplifier 420. In the wireless signal processing circuit 20H_2, the phase switching sections 410, the variable amplifiers 420 and the mixers correspond 1:1:1. Therefore, the number of mixers corresponding with the signal IF1 is eight.

More specifically, the wireless signal processing circuit 20H_2 is provided with the following mixers as the plural mixers corresponding with the signal IF1. The wireless signal processing circuit 20H_2 is provided with the mixer 500a that uses the normal phase signal LO-I-P of the first local signal, which is a differential signal, to up-convert the frequency of the in-phase signal IF1-I processed by the corresponding phase switching section 410 and variable amplifier 420, and is provided with the mixer 500c that uses the antiphase signal LO-I-M of the first local signal to up-convert the in-phase signal IF1-I processed by the corresponding phase switching section 410 and variable amplifier 420. The wireless signal processing circuit 20H_2 is further provided with the mixer 500b that uses the normal phase signal LO-I-P of the first local signal to up-convert the frequency of the quadrature signal IF1-Q processed by the corresponding phase switching section 410 and variable amplifier 420, and is provided with the mixer 500d that uses the antiphase signal LO-I-M of the first local signal to up-convert the quadrature signal IF1-Q processed by the corresponding phase switching section 410 and variable amplifier 420. The wireless signal processing circuit 20H_2 is provided with a mixer 500e that uses the normal phase signal LO-Q-P of the second local signal, which is a differential signal whose phase is rotated 90° relative to the first local signal, to up-convert the frequency of the in-phase signal IF1-I processed by the corresponding phase switching section 410 and variable amplifier 420, and is provided with a mixer 500g that uses the antiphase signal LO-Q-M of the second local signal to up-convert the in-phase signal IF1-I processed by the corresponding phase switching section 410 and variable amplifier 420. The wireless signal processing circuit 20H_2 is provided with a mixer 500f that uses the normal phase signal LO-Q-P of the second local signal to up-convert the frequency of the quadrature signal IF1-Q processed by the corresponding phase switching section 410 and variable amplifier 420, and is provided with a mixer 500h that uses the antiphase signal LO-Q-M of the second local signal to up-convert the quadrature signal IF1-Q processed by the corresponding phase switching section 410 and variable amplifier 420. Plural numbers of the mixers corresponding with the signals IF2 to IF4 are similar. The signals that have been up-converted by the mixers 500a, 500b, 500c and 500d are combined with the output signals of plural mixers corresponding with the signals IF2 to IF4 and are outputted as the normal phase signal RF-P of the RF signal, which is a differential signal. The signals that have been up-converted by the mixers 500e, 500f, 500g and 500h are combined with the output signals of plural mixers corresponding with the signals IF2 to IF4 and are outputted as an antiphase signal RF-M of the RF signal that is the differential signal.

The wireless signal processing circuit 20H_2 also features functions for receiving signals. When the wireless signal processing circuit 20H_2 receives a signal, each of the plural mixers down-converts the frequency of the input signal combining plural reception signals. Each of a plural number of the phase switching sections 410 corresponding with, for example, the signal IF1 selectively switches a phase rotation amount of the signal whose frequency has been down-converted by the corresponding mixer in accordance with the arrival direction of the corresponding reception signal, and rotates the phase of that signal. Each of a plural number of the variable amplifiers 420 fur signal reception corresponding with the signal IF1 alters the amplitude of an input signal or output signal of the corresponding phase switching section 410 in accordance with the arrival direction of the corresponding reception signal.

Tenth Exemplary Embodiment

Figure 21:
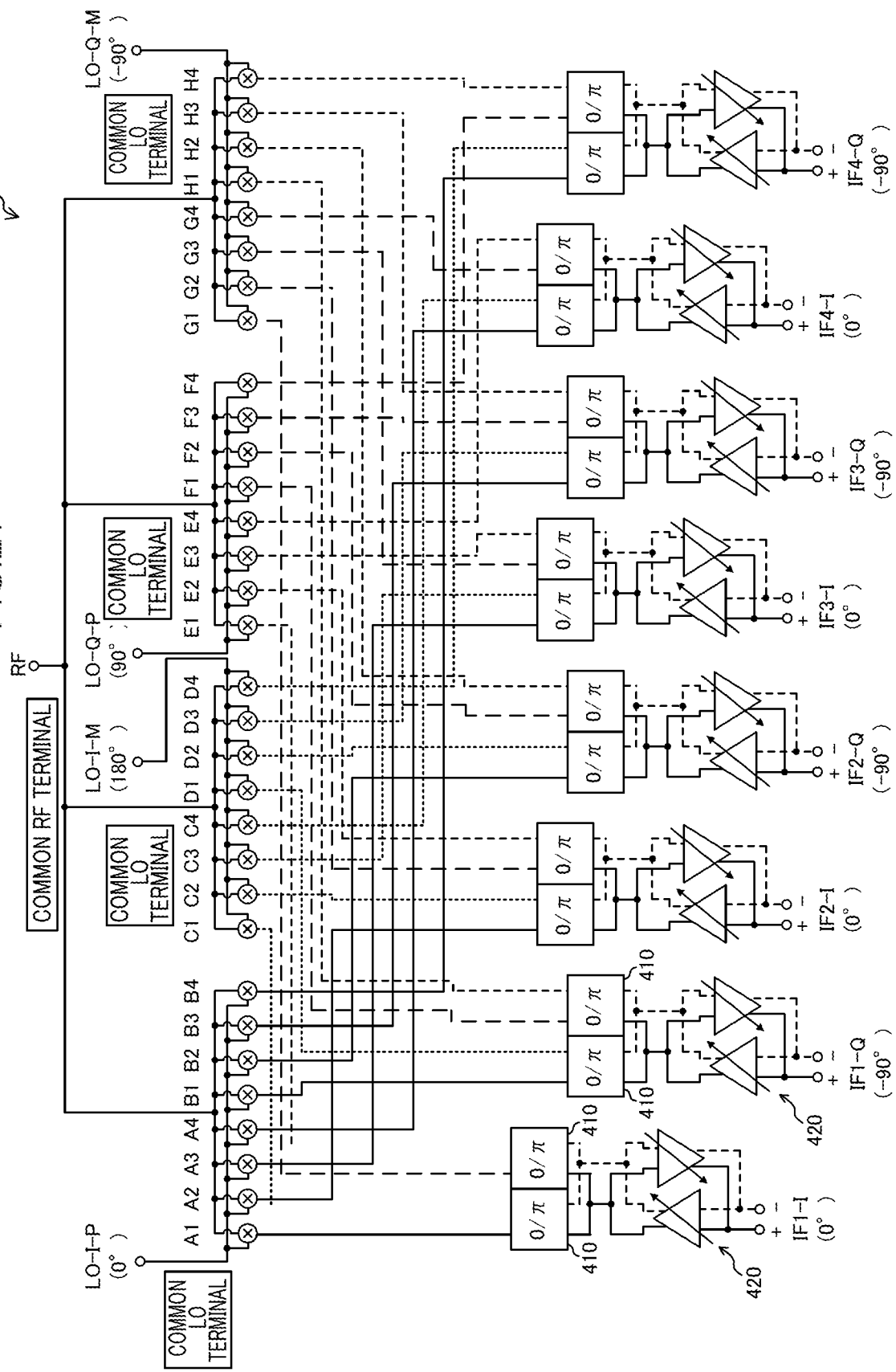
FIG. 21 is a diagram showing an example of structures of a wireless signal processing circuit according to a tenth exemplary embodiment of the disclosed technology.
Figure 22:
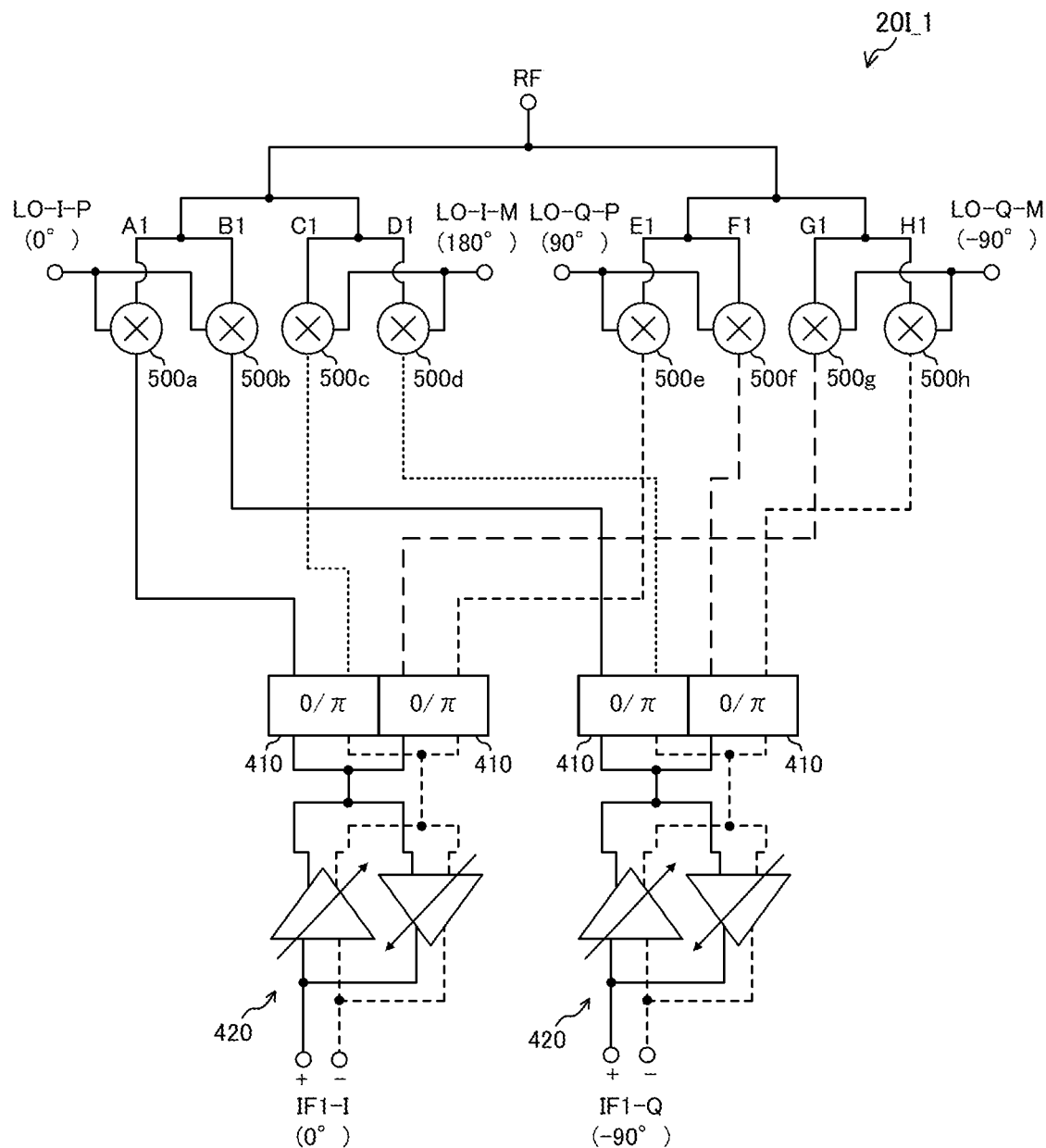
FIG. 22 is a diagram showing only portions of the wireless signal processing circuit according to the tenth exemplary embodiment of the disclosed technology that relate to one of a baseband range or intermediate frequency band.

FIG. 21 is a diagram showing an example of structures of a wireless signal processing circuit 20I_1 according to a tenth exemplary embodiment of the disclosed technology. To facilitate understanding of the structures of the wireless signal processing circuit 20I_1, FIG. 22 is a diagram showing only structural portions of the wireless signal processing circuit 20I_1 that relate to one (IF1) of the signals (IF1 to IF4) in the baseband range or intermediate frequency band that are processed in the wireless signal processing circuit 20I_1. FIG. 23 is a table showing examples of operations of the wireless signal processing circuit 20I_1. An RF signal RF in FIG. 21 to FIG. 23 corresponds to the output signal $S_{out}$ or input signal $S_{in}$ mentioned above. The signals IF1-I to IF4-I, IF1-Q to IF4-Q and IF correspond to the transmission signals ST1 to ST4 and the reception signals SR1 to SR4 mentioned above.

The wireless signal processing circuits 20I_1 are provided in respective correspondence with the plural antenna elements AN. Each wireless signal processing circuit 20I_1 according to the present exemplary embodiment features both functions for forming the transmission beams B1 to B4 towards the terminals 101 to 104 and transmitting the transmission signals, and functions for forming and receiving reception beams of respective signals transmitted from the terminals 101 to 104.

The wireless signal processing circuit 20I_1 has a single balanced structure that inputs respective differentials between two local signals whose phases are orthogonal to one another, inputs/outputs single-ended signals in the RF band, and inputs/outputs differential signals in the baseband range or intermediate frequency band. The normal phase signal LO-I-P of the first local signal LO-I has a phase difference relative to a reference phase of 0°, and the antiphase signal LO-I-M of the first local signal LO-I has a phase difference relative to the reference phase of 180°. The normal phase signal LO-Q-P of the second local signal LO-Q has a phase difference relative to the reference phase of 90°, and an antiphase signal LO-Q-M of the second local signal LO-Q has a phase difference relative to the reference phase of −90°. The signal RF in the RF band is outputted as a single-ended signal at times of transmission and inputted as a single-ended signal at times of reception. The normal phase signals IF1-I to IF4-I and quadrature signals IF1-Q to IF4-Q in the baseband range or intermediate frequency band are inputted as differential signals at times of transmission and outputted as differential signals at times of reception.

According to the wireless signal processing circuit 20I_1, signal losses may be suppressed while an increase in circuit size (areas occupied by circuitry) is suppressed, in addition to which image signals may be suppressed. Because the local signal inputted to each mixer section 50 is a differential input, resistance against external common mode (in-phase mode) noise is improved, and leakage of the local signals at the RF terminals may be suppressed.

In the wireless signal processing circuit 20I_1, the local terminals of the mixers that input the local signal LO-I-P are common (connected together), and the local terminals of the mixers that input the local signal LO-I-M are common (connected together). The local terminals of the mixers that input the local signal, LO-Q-P are common (connected together), and the local terminals of the mixers that input the local sural LO-Q-M are common (connected together). RF terminals of the mixers that input/output the RF signal are common (connected together). Therefore, the mixer sections may be constituted by, for example, multifinger transistors, and the mixer sections may be structured very compactly.

Figure 24:
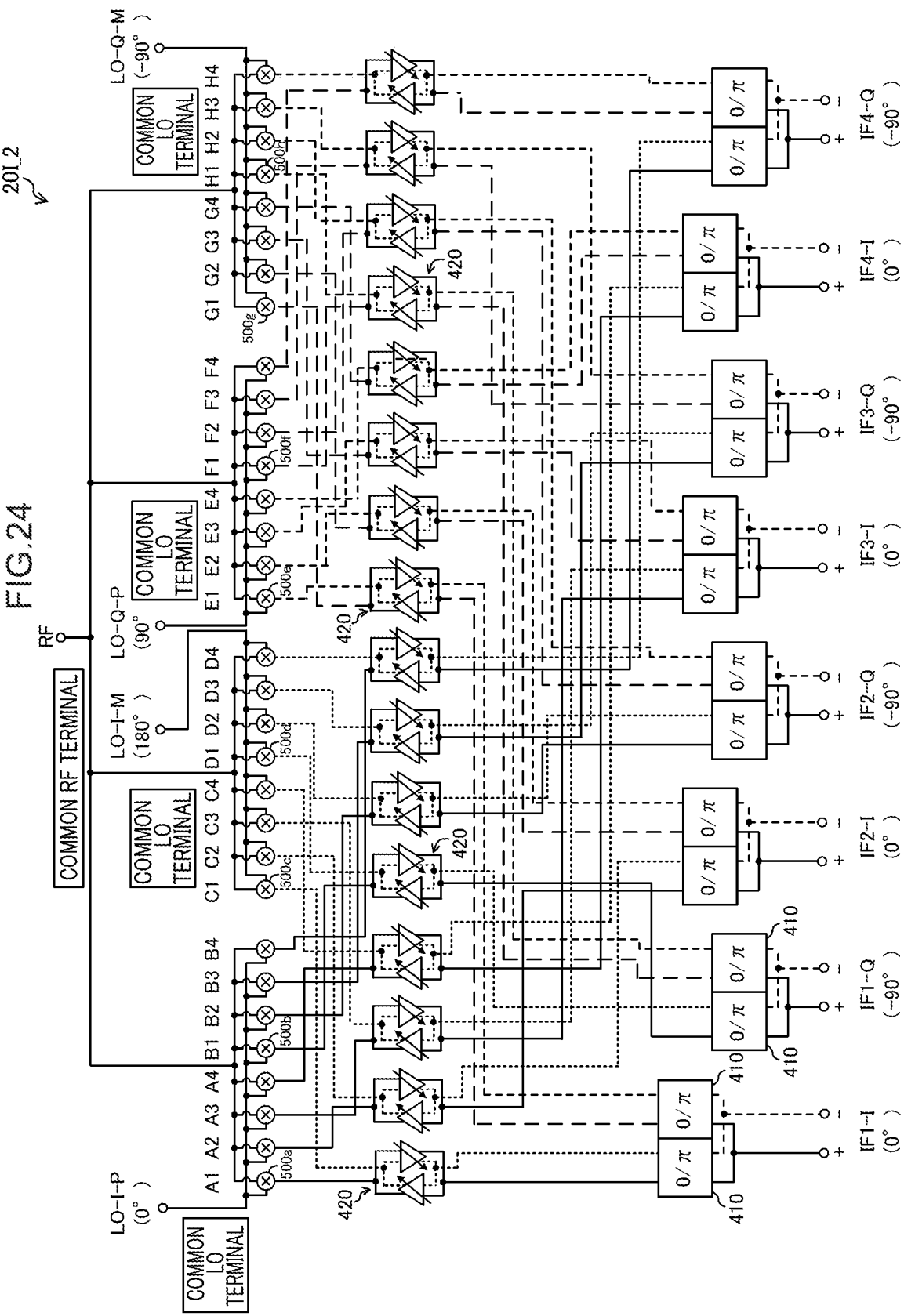
FIG. 24 is a diagram showing an example of structures of a wireless signal processing circuit according to a variant example of the tenth exemplary embodiment of the disclosed technology.
Figure 25:
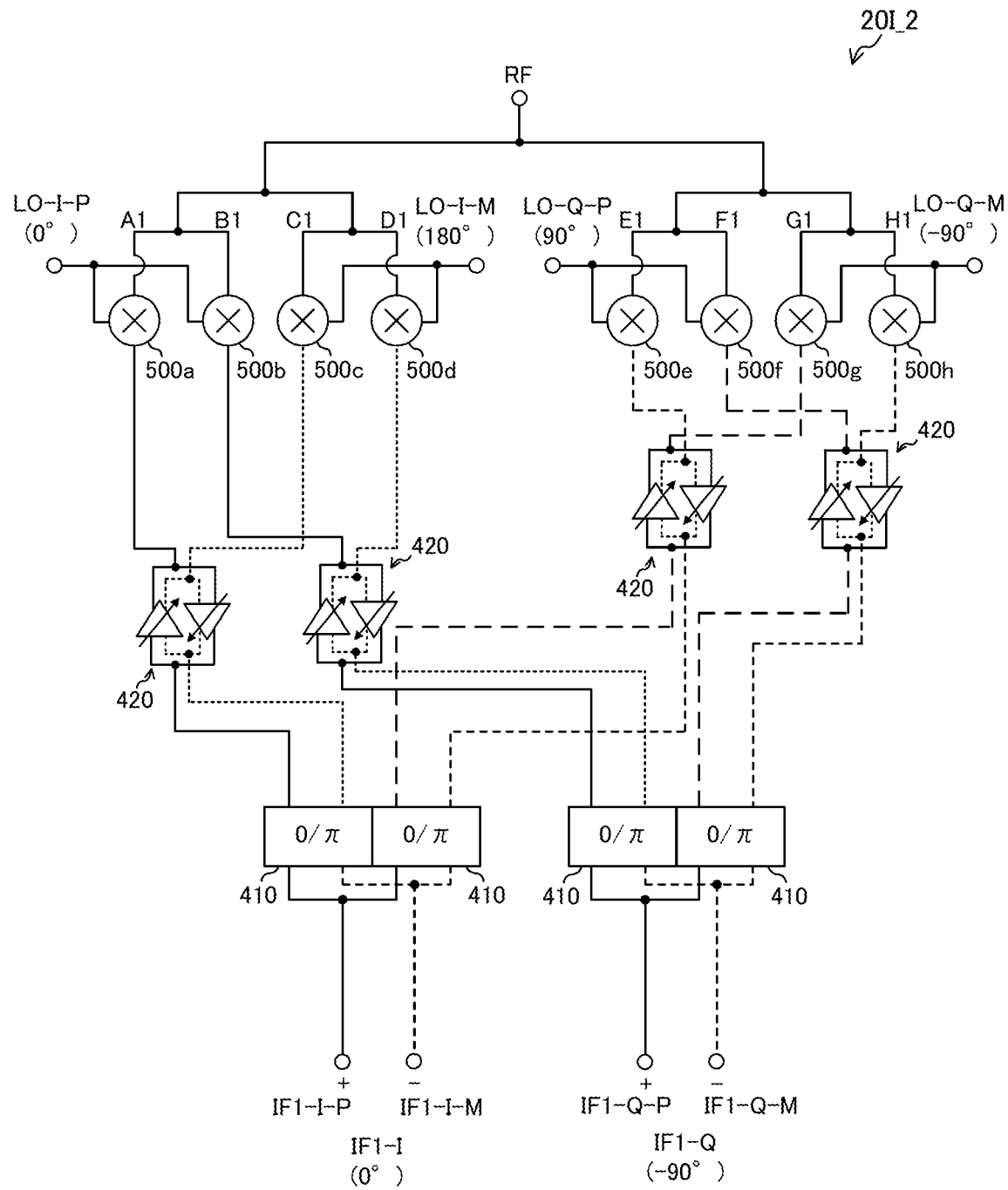
FIG. 25 is a diagram showing only portions of the wireless signal processing circuit according to the variant example of the tenth exemplary embodiment of the disclosed technology that relate to one of a baseband range or intermediate frequency band.

FIG. 24 is a diagram showing an example of structures of a wireless signal processing circuit 20I_2 that is a modification of the wireless signal processing circuit 20I_1 depicted in FIG. 21. To facilitate understanding of the structures of the wireless signal processing circuit 20I_2, FIG. 25 is a diagram showing only structural portions of the wireless signal processing circuit 20I_2 that relate to one (IF1) of the signals (IF1 to IF4) in the baseband range or intermediate frequency band that are processed in the wireless signal processing circuit 20I_2. In FIG. 24 and FIG. 25, the signals RF-P and RF-I correspond to the output signal $S_{out}$ or input signal $S_{in}$ mentioned above. I The signals IF1-I to IF4-1 and IF1-Q IF4-Q correspond to the transmission signals ST1 to ST4 or reception signals SR1 to SR4 mentioned above. In the wireless signal processing circuit 20I_2, arrangements of the variable amplifiers 420 differ from the wireless signal processing circuit 20I_1.

In the wireless signal processing circuit 20I_2, a plural number of the phase switching sections 410 correspond with, for example, the signal IF1. These phase switching sections 410 are provided on each of plural paths along which the in-phase signal IF1-I that is in phase with the signal IF1 is distributed and on each of plural paths along which the quadrature signal IF1-Q whose phase is rotated 90° relative to the signal IF1 is distributed. In the wireless signal processing circuit 20I_2, the number of paths along which the in-phase signal IF1-I is distributed is two, and the number of paths along which the quadrature signal IF1-Q is distributed is two. That is, the number of the phase switching sections 410 corresponding with the signal IF1 in the wireless signal processing circuit 20I_2 is four. Each phase switching section 410 may input/output differential signals. Each phase switching section 410 corresponding with the signal IF1 selectively switches a phase rotation amount of the in-phase signal IF1-I or quadrature signal IF1-Q that is distributed along the corresponding path in accordance with a transmission direction of the signal IF1, and rotates the phase of that signal. Plural numbers of the phase switching sections corresponding with the transmission signals IF2 to IF4 are similar.

In the wireless signal processing circuit 20I_2, a plural number of the variable amplifiers 420 correspond with, for example, the signal IF1. These variable amplifiers 420 are provided in respective correspondence with the plural phase switching sections 410 corresponding with the signal IF1, and alter the amplitudes of input signals or output signals of the corresponding phase switching sections 410 in accordance with the transmission direction of the signal IF1. The number of the variable amplifiers 420 corresponding with the signal IF1 in the wireless signal processing circuit 20I_2 is four for signal transmission and is four for signal reception. Each variable amplifier 420 may input/output differential signals. FIG. 24 and. FIG. 25 show as an example a structure in which the plural variable amplifiers 420 are provided between the corresponding phase switching sections 410 and the mixers, but the arrangement of the variable amplifiers 420 and phase switching sections 410 may be the reverse. Plural numbers of the variable amplifiers corresponding with the transmission signals IF2 to IF4 are similar.

In the wireless signal processing circuit 20I_2, a plural number of the mixers correspond with, for example, the signal IF1. These mixers are provided in respective correspondence with the plural phase switching sections 410 corresponding with the signal IF1 and the plural variable amplifiers 420 corresponding with the signal IF1. Each mixer up-converts the frequency of the signal that has been processed by the corresponding phase switching section 410 and variable amplifier 420. In the wireless signal processing circuit 20I_2, the phase switching sections 410, the variable amplifiers 420 and the mixers correspond 1:1:2. Therefore, the number of mixers corresponding with the signal IF1 is eight.

More specifically, the wireless signal processing circuit 20I_2 is provided with the following mixers as the plural mixers corresponding with the signal IF1. The wireless signal processing circuit 20I_2 is provided with the mixer 500a that uses the normal phase signal LO-I-P of the first local signal, which is a differential signal, to up-convert the frequency of a normal phase signal IF1-I-P of the in-phase signal, which is a :differential signal processed by the corresponding phase switching section 410 and variable amplifier 420, and is provided with the mixer 500g that uses the antiphase signal LO-Q-M of the second local signal, which is a differential signal whose phase is rotated 90° relative to the first local signal, to up-convert the normal phase signal IF1-I-P. The wireless signal processing circuit 20I_2 is further provided with the mixer 500c that uses the antiphase signal LO-I-M of the first local signal to up-convert the frequency of an antiphase signal IF1-I-M of the in-phase signal processed by the corresponding phase switching section 410 and variable amplifier 420, and is provided with the mixer 500e that uses the normal phase signal LO-Q-P of the second local signal to up-convert the antiphase signal IF1-I-M. The wireless signal processing circuit 20I_2 is provided with the mixer 500b that uses the normal phase signal LO-I-P of the first local signal to up-convert the frequency of a normal phase signal IF1-Q-P of the quadrature signal, which is a differential signal processed by the corresponding phase switching section 410 and variable amplifier 420, and is provided with the mixer 500f that uses the normal phase signal LO-Q-P of the second local signal to up-convert the normal phase signal IF1-Q-P. The wireless signal processing circuit 20I_2 is provided with the mixer 500d that uses the antiphase signal LO-I-M of the first local signal to up-convert the frequency of an antiphase signal IF1-Q-M of the quadrature signal processed by the corresponding phase switching section 410 and variable amplifier 420, and is provided with the mixer 500h that uses the antiphase signal LO-Q-M of the second local signal to up-convert the antiphase signal IF1-Q-M. Plural numbers of the mixers corresponding with the signals IF2 to IF4 are similar. The signals that have been up-converted by the mixers 500a to 500h are combined with the output signals of the plural mixers corresponding with the signals IF2 to IF4 and are outputted as the RF signal.

The wireless signal processing circuit 20I_2 also features functions for receiving signals. When the wireless signal processing circuit 20I_2 receives a signal, each of the plural mixers down-converts the frequency of the input signal combining plural reception signals. Each of a plural number of the phase switching sections 410 corresponding with, for example, the signal IF1 selectively switches a phase rotation amount of the signal whose frequency has been down-converted by the corresponding mixer in accordance with the arrival direction of the corresponding reception signal, and rotates the phase of that signal. Each of a plural number of the variable amplifiers 420 for signal reception corresponding with the signal IF1 alters the amplitude of an input signal or output signal of the corresponding phase switching section 410 in accordance with the arrival direction of the corresponding reception signal.

Eleventh Exemplary Embodiment

Figure 26:
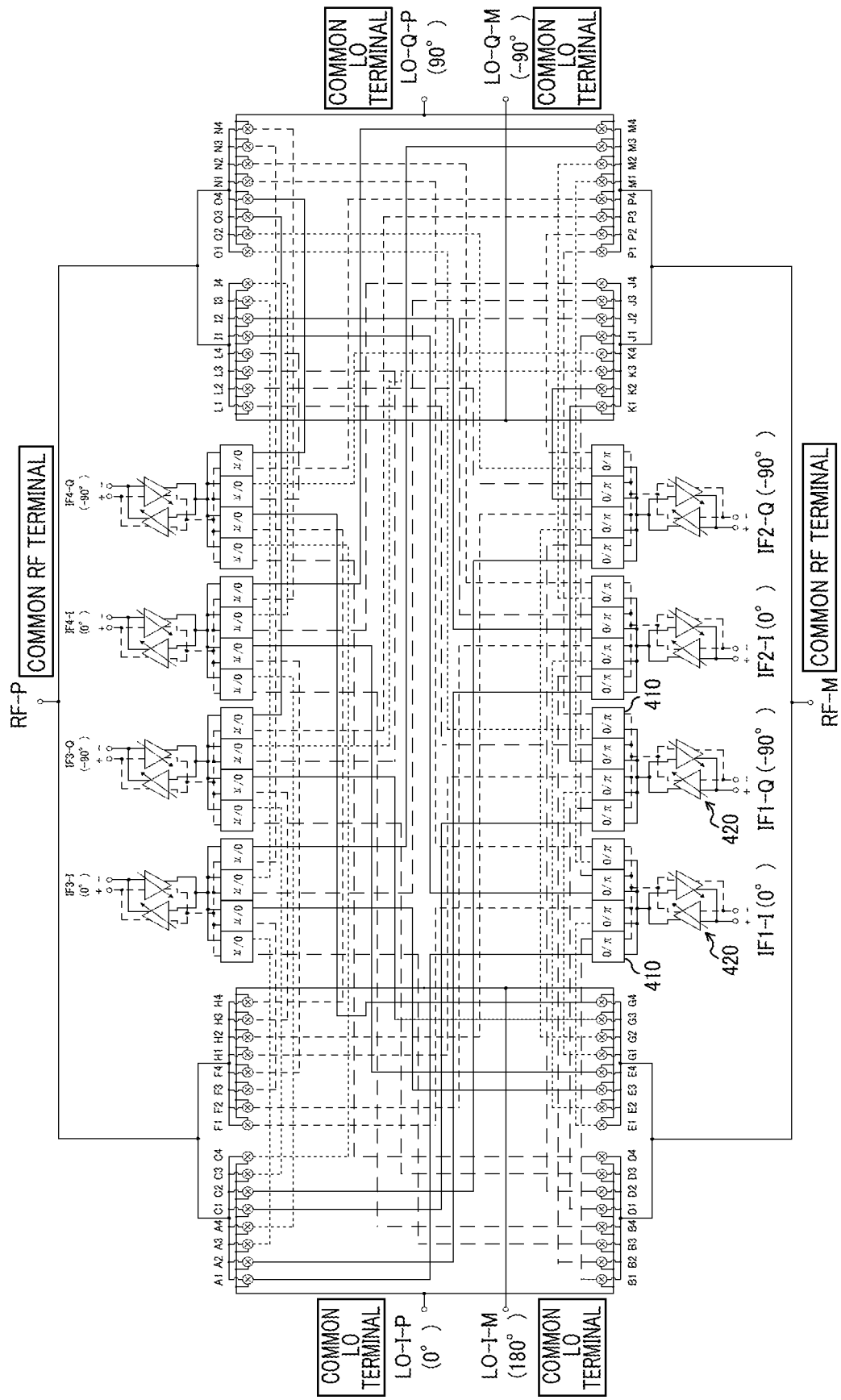
FIG. 26 is a diagram showing an example of structures of a wireless signal processing circuit according to an eleventh exemplary embodiment of the disclosed technology.
Figure 27:
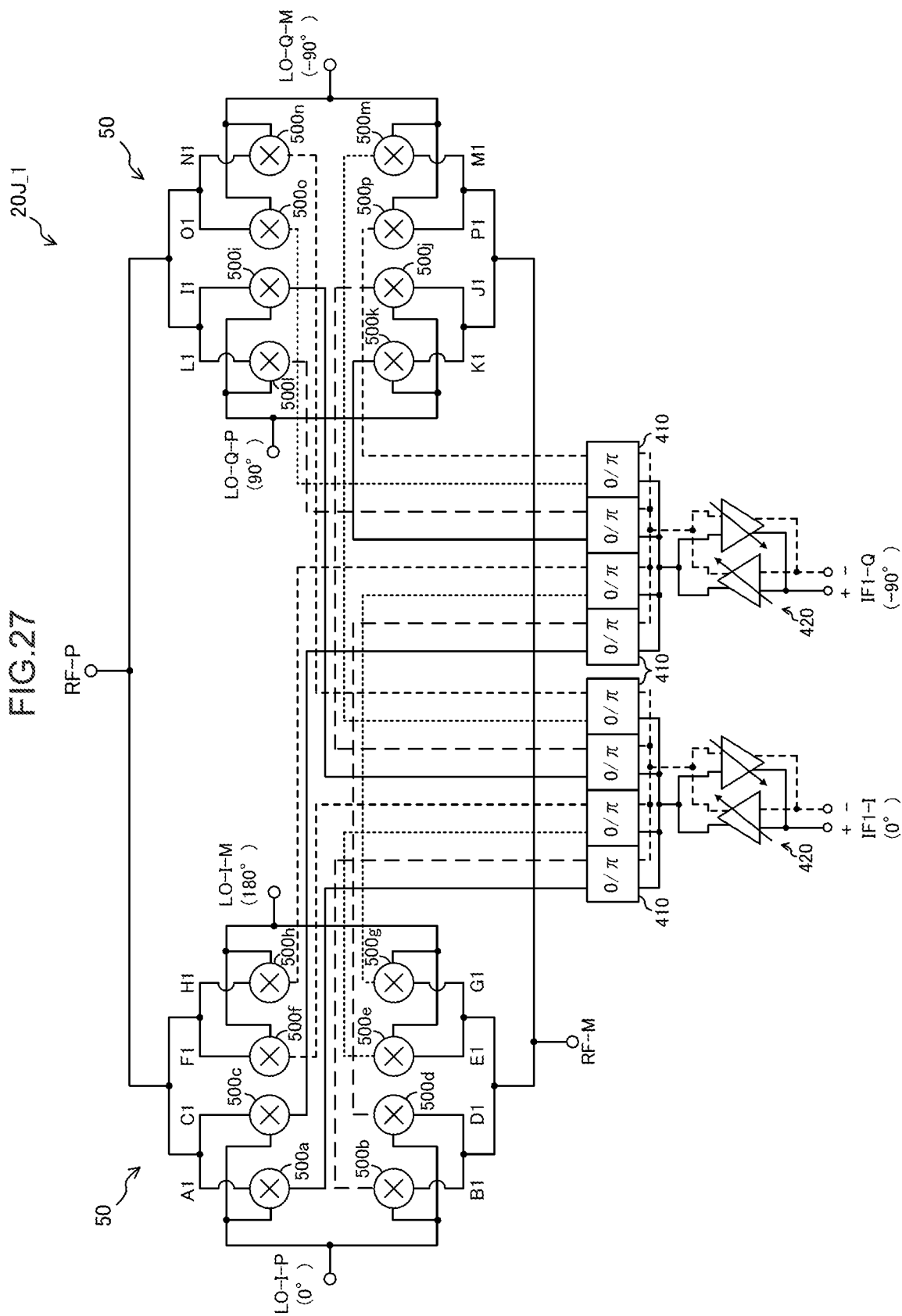
FIG. 27 is a diagram showing only portions of the wireless signal processing circuit according to the eleventh exemplary embodiment of the disclosed technology that relate to one of a baseband range or intermediate frequency band.

FIG. 26 is a diagram showing an example of structures of a wireless signal processing circuit 20J_1 according to an eleventh exemplary embodiment of the disclosed technology. To facilitate understanding of the structures of the wireless signal processing circuit 20J_1, FIG. 27 is a diagram showing only structural portions of the wireless signal processing circuit 20J_1 that relate to one (IF1) of the signals (IF1 to IF4) in the baseband range or intermediate frequency band that are processed in the wireless signal processing circuit 20J_1. FIG. 28 is a table showing examples of operations of the wireless signal processing circuit 20J_1. RF signals RF in FIG. 26 to FIG. 28 correspond to the output signal $S_{out}$ or input signal $S_{in}$ mentioned above. The signals IF1-I to IF4-I, IF1-Q to IF4-Q and IF correspond to the transmission signals ST1 to ST4 and the reception signals SR1 to SR4 mentioned above.

The wireless signal processing circuits 20J_1 are provided in respective correspondence with the plural antenna elements AN. Each wireless signal processing circuit 20J_1 features both functions for forming the transmission beams B1 to B4 towards the terminals 101 to 104 and transmitting the transmission signals, and functions for forming and receiving reception beams of respective signals transmitted from the terminals 101 to 104.

The wireless signal processing circuit 20J_1 has a single balanced structure that inputs respective differentials between two local signals whose phases are orthogonal to one another, inputs/outputs differential signals in the RF band, and inputs/outputs differential signals in the baseband range or intermediate frequency band. The normal phase signal LO-I-P of the first local signal LO-I has a phase difference relative to the reference phase of 0°, and the antiphase signal LO-I-M of the first local signal LO-I has a phase difference relative to the reference phase of 180°. The normal phase signal LO-Q-P of the second local signal LO-Q has a phase difference relative to the reference phase of 90°, and the antiphase signal LO-Q-M of the second local signal LO-Q has a phase difference relative to the reference phase of −90°. A normal phase signal RF-P and antiphase signal RF-M in the RF band are outputted at times of transmission and inputted at times of reception. The normal phase signals IF1-I to IF4-I and quadrature signals IF1-Q to IF4-Q in the baseband range or intermediate frequency band are inputted as differential signals at times of transmission and outputted as differential signals at times of reception.

According to the wireless signal processing circuit 20J_1, signal losses may be suppressed while an increase in circuit size (areas occupied by circuitry) is suppressed, in addition to which image signals may be suppressed. Because the local signal inputted to each mixer section 50 is a differential input, resistance against external common mode (in-phase mode) noise is improved, and leakage of the local signals at the RF terminals may be suppressed.

In the wireless signal processing circuit 20J_1, the local terminals of the mixers that input the local signal LO-I-P are common (connected together), and the local terminals of the mixers that input the local signal LO-I-M are common (connected together). The local terminals of the mixers that input the local signal LO-Q-P are common (connected together), and the local terminals of the mixers that input the local signal LO-Q-M are common (connected together). RF terminals of the mixers that input/output the RF signal RF-P are common (connected together), and RF terminals of the mixers that input/output the RF signal RF-M are common (connected together). Therefore, the mixer sections may be constituted by, for example, multifinger transistors, and the mixer sections may be structured very compactly.

Figure 29:
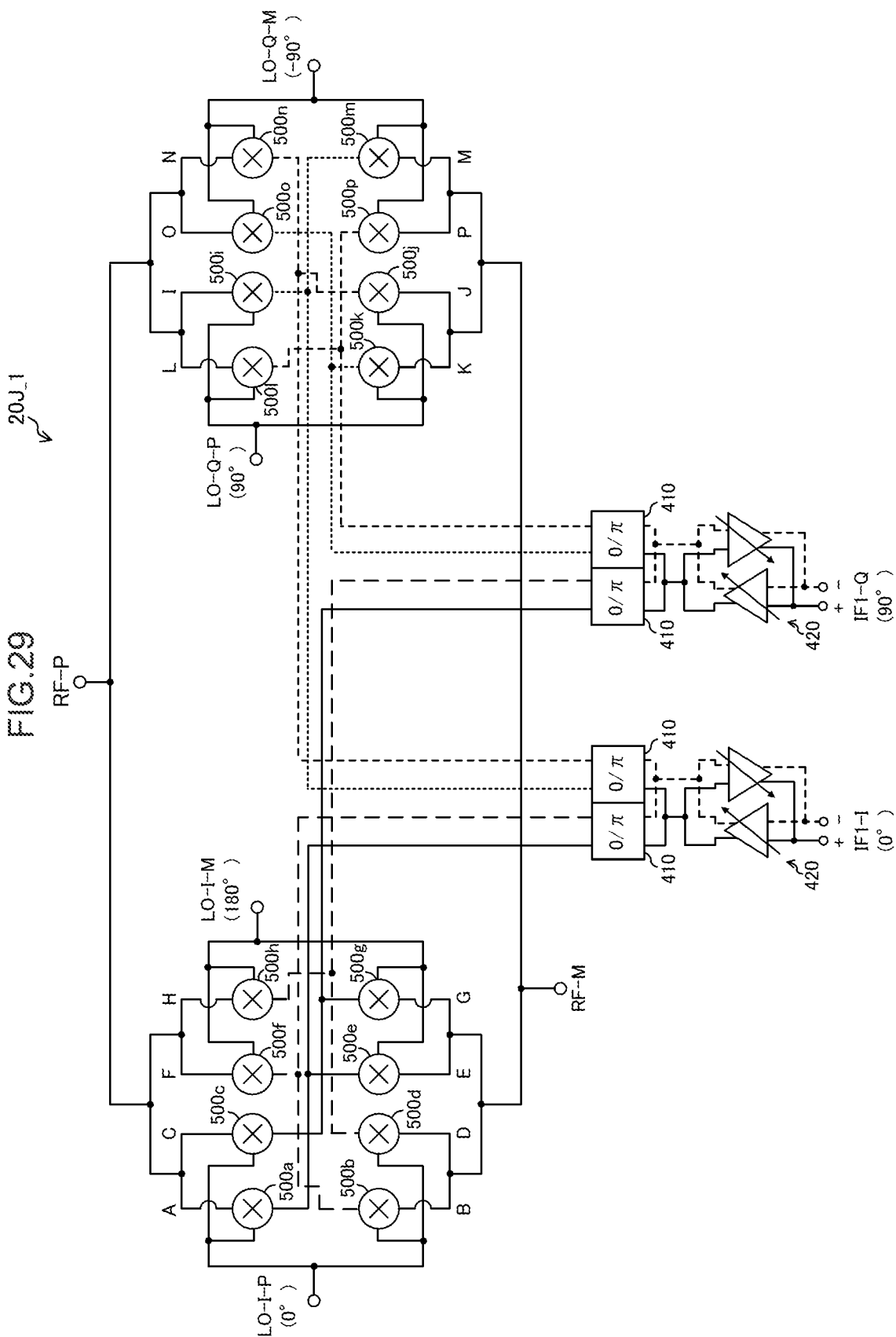
FIG. 29 is a diagram showing a variant example of the wireless signal processing circuit according to the eleventh exemplary embodiment of the disclosed technology.

As depicted in FIG. 29, the wireless signal processing circuit 20J_1 may be formed with a structure in which two mixers share each phase switching section. As a result, the effect of suppressing an increase in circuit size (areas occupied by circuitry) is strengthened.

Figure 30:
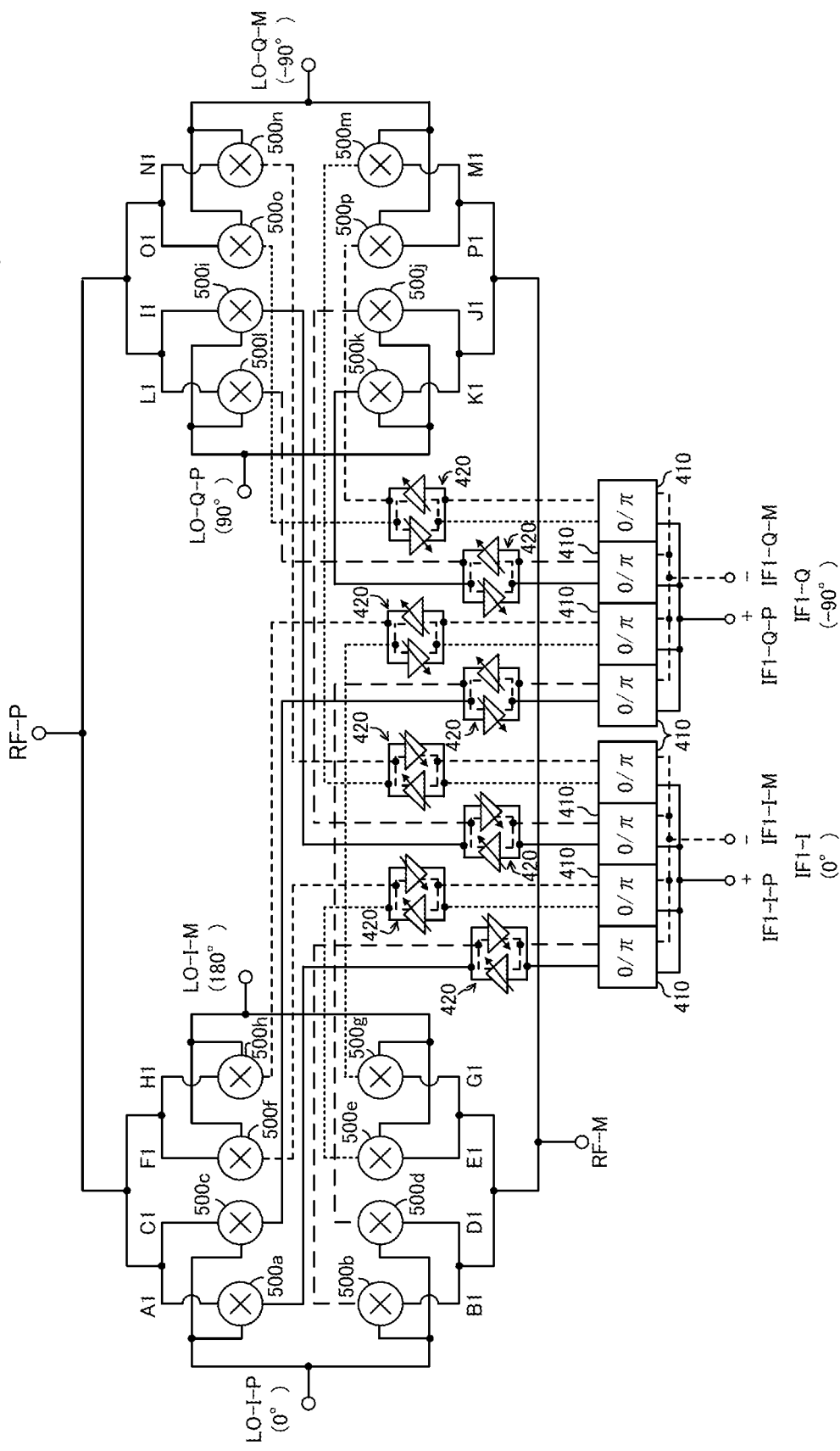
FIG. 30 is a diagram showing only portions of the variant example of the wireless signal processing circuit according to the eleventh exemplary embodiment of the disclosed technology that relate to one of a baseband range or intermediate frequency band.

FIG. 30 is a diagram showing an example of structures of a wireless signal processing circuit 20J_2 that is a modification of the wireless signal processing circuit 20J_1 depicted in FIG. 26 and FIG. 27. To facilitate understanding of the structures, FIG. 30 is a diagram showing only structural portions of the wireless signal processing circuit 20J_2 that relate to one (IF1) of the signals (IF1 to IF4) in the baseband range or intermediate frequency band that are processed in the wireless signal processing circuit 20J_2. In FIG. 30, the signals RF-P and RF-I correspond to the output signal $S_{out}$ or input signal $S_{in}$ mentioned above. The signals IF1-I to IF4-I and IF1-Q to IF4-Q correspond to the transmission signals ST1 to ST4 or reception signals SR1 to SR4 mentioned above. In the wireless signal processing circuit 20J_2, arrangements of the variable amplifiers 420 differ from the wireless signal processing circuit 20J_1.

In the wireless signal processing circuit 20J_2, a plural number of the phase switching sections 410 correspond with, for example, the signal IF1. These phase switching sections 410 are provided on each of plural paths along which the in-phase signal IF1-I that is in phase with the signal IF1 is distributed and on each of plural paths along which the quadrature signal IF1-Q whose phase is rotated 90° relative to the signal IF1 is distributed. In the wireless signal processing circuit 20J_2, the number of paths along which the in-phase signal IF1-I is distributed is four and the number of paths along which the quadrature signal IF1-Q is distributed is four. That is, the number of the phase switching sections 410 corresponding with the signal IF1 in the wireless signal processing circuit 20J_2 is eight. Each phase switching section 410 may input/output differential signals. Each phase switching section 410 corresponding with the signal IF1 selectively switches a phase rotation amount of the in-phase signal or quadrature signal IF1-Q that is distributed along the corresponding path in accordance with a transmission direction of the signal IF1, and rotates the phase of that signal. Plural numbers of the phase switching sections corresponding with the transmission signals IF2 to IF4 are similar.

In the wireless signal processing circuit 20J_2, a plural number of the variable amplifiers 420 correspond with, for example, the signal IF1. These variable amplifiers 420 are provided in respective correspondence with the plural phase switching sections 410 corresponding with the signal IF1, and alter the amplitudes of input signals or output signals of the corresponding phase switching sections in accordance with the transmission direction of the signal IF1. The number of the variable amplifiers 420 corresponding with the signal IF1 in the wireless signal processing circuit 20J_2 is eight for signal transmission and is eight for signal reception. Each variable amplifier 420 may input/output differential signals. FIG. 30 shows as an example a structure in which the plural variable amplifiers 420 are provided between the corresponding phase switching sections 410 and mixers, but the arrangement of the variable amplifiers 420 and phase switching sections 410 may be the reverse. Plural numbers of the variable amplifiers 420 corresponding with the transmission signals IF2 to IF4 are similar.

In the wireless signal processing circuit 20J_2, a plural number of the mixers correspond with, for example, the signal IF1. These mixers are provided in respective correspondence with the plural phase switching sections 410 corresponding with the signal IF1 and the plural variable amplifiers 420 corresponding with the signal IF1. Each mixer up-converts the frequency of the signal that has been processed by the corresponding phase switching section 410 and variable amplifier 420. In the wireless signal processing circuit 20J_2, the phase switching sections 410, the variable amplifiers 420 and the mixers correspond 1:1:2. Therefore, the number of mixers corresponding with the signal IF1 is 16.

More specifically, the wireless Signal processing circuit 20J_2 is provided With the following mixers as the plural mixers corresponding with the signal IF1. The wireless signal processing circuit 20J_2 is provided with the mixer 500*a* that uses the normal phase signal LO-I-P of the first local signal, which is a differential signal, to up-convert the frequency of the normal phase signal IF1-I-P of the in-phase signal, which is a differential signal processed by the corresponding phase switching section 410 and variable amplifier 420, is provided with the mixer 500*e* that uses the antiphase signal LO-I-M of the first local signal to up-convert the normal phase signal IF1-I-P, is provided with a mixer 500*i* that uses the normal phase signal LO-Q-P of the second local signal, which is a differential signal whose phase is rotated 90° relative to the first local signal, to up-convert the normal phase signal IF1-I-P, and is provided with a mixer 500*m* that uses the antiphase signal LO-Q-M of the second local signal to up-convert the normal phase signal IF1-I-P. The wireless signal processing circuit 20J_2 is further provided with the mixer 500*b* that uses the normal phase signal LO-I-P of the first local signal to up-convert the frequency of the antiphase signal IF1-I-M of the in-phase signal processed by the corresponding phase switching section 410 and variable amplifier 420, is provided with the mixer 500*f* that uses the antiphase signal LO-I-M of the first local signal to up-convert the antiphase signal IF1-I-M, is provided with a mixer 500*j* that uses the normal phase signal LO-Q-P of the second local signal to up-convert the antiphase signal IF1-I-M, and is provided with a mixer 500*n* that uses the antiphase signal LO-Q-M of the second local signal to up-convert the antiphase signal IF1-I-M. The wireless signal processing circuit 20J_2 is provided with the mixer 500c that uses the normal phase signal LO-I-P of the first local signal to up-convert the frequency of the normal phase signal IF1-Q-P of the quadrature signal, which is a differential signal processed by the corresponding phase switching section 410 and variable amplifier 420, is provided with the mixer 500g that uses the antiphase signal LO-I-M of the first local signal to up-convert the normal phase signal IF1-Q-P, is provided with a mixer 500k that uses the normal phase signal LO-Q-P of the second local signal to up-convert the normal phase signal IF1-Q-P, and is provided with a mixer 500o that uses the antiphase signal LO-Q-M of the second local signal to up-convert the normal phase signal IF1-Q-P. The wireless signal processing circuit 20J_2 is provided with the mixer 500d that uses the normal phase signal LO-I-P of the first local signal to up-convert the frequency of the antiphase signal IF1-Q-M of the quadrature signal processed by the corresponding phase switching section 410 and variable amplifier 420, is provided with the mixer 500h that uses the antiphase signal LO-I-M of the first local signal to up-convert the antiphase signal IF1-Q-M, is provided with a mixer 500l that uses the normal phase signal LO-Q-P of the second local signal to up-convert the antiphase signal IF1-Q-M, and is provided with a mixer 500p that uses the antiphase signal LO-Q-M of the second local signal to up-convert the antiphase signal IF1-Q-M. Plural numbers of the mixers corresponding with the signals IF2 to IF4 are similar. The signals that have been up-converted by the mixers 500a, 500c, 500f, 500h, 500l, 500i, 500o and 500n are combined with the output signals of plural mixers corresponding with the signals IF2 to IF4 and are outputted as the normal phase signal RF-P of the RF signal, which is a differential signal. The signals that have been up-converted by the mixers 500b, 500d, 500e, 500g, 500k, 500j, 500p and 500m are combined with the output signals of plural mixers corresponding with the signals IF2 to IF4 and are outputted as the antiphase signal RF-M of the RF signal, which is a differential signal.

The wireless signal processing circuit 20J_2 also features functions for receiving signals. When the wireless signal processing circuit 20J_2 receives a signal, each of the plural mixers down-converts the frequency of the input signal combining plural reception signals. Each of a plural number of the phase switching sections 410 corresponding with, for example, the signal IF1 selectively switches a phase rotation amount of the signal whose frequency has been down-converted by the corresponding mixer in accordance with the arrival direction of the corresponding reception signal, and rotates the phase of that signal. Each of a plural number of the variable amplifiers 420 for signal reception corresponding with the signal IF1 alters the amplitude of an input signal or output signal of the corresponding phase switching section 410 in accordance with the arrival direction of the corresponding reception signal.

Figure 31:
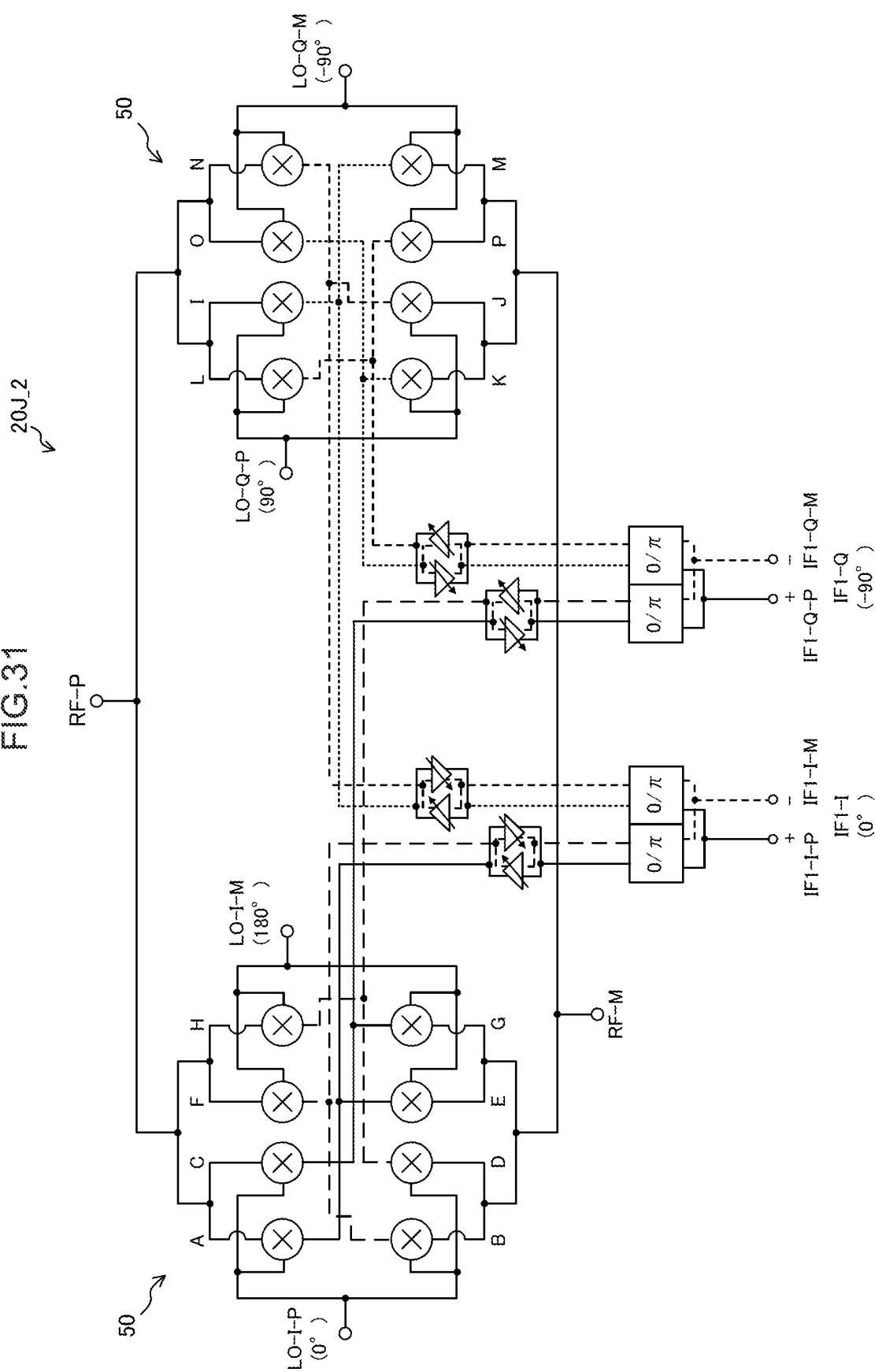
FIG. 31 is a diagram showing only portions of the wireless signal processing circuit according to the variant example of the eleventh exemplary embodiment of the disclosed technology that relate to one of a baseband range or intermediate frequency band.

As depicted in FIG. 31, the wireless signal processing circuit 20J_2 may be formed with a structure in which two mixers share each phase switching section. As a result, the effect of suppressing an increase in circuit size (areas occupied by circuitry) is strengthened.

According to the disclosed technology, while an increase in circuit size (areas occupied by circuitry) may be suppressed, signal losses may be suppressed in a wireless device that conducts beamforming.

All cited documents, patent applications, and technical standards mentioned in the present specification are incorporated by reference in the present specification to the same extent as if each individual cited document, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless signal processing circuit comprising:
   a plurality of phase switchers provided on each of a plurality of paths along which an in-phase signal is distributed and each of a plurality of paths along which a quadrature signal is distributed, the in-phase signal being in phase with a transmission signal and the quadrature signal being rotated 90° in phase from the transmission signal, each phase switcher switching a phase rotation amount of the one of the in-phase signal and the quadrature signal that is distributed along the corresponding path selectively in accordance with a transmission direction of the transmission signal, and the phase switcher rotating the phase of the signal;
   a plurality of variable amplifiers provided in respective correspondence with the plurality of phase switchers, each variable amplifier altering an amplitude of one of an input signal or an output signal of the corresponding phase switcher in accordance with the transmission direction of the transmission signal;
   a plurality of mixers provided in respective correspondence with the plurality of phase switchers and the plurality of variable amplifiers, each mixer up-converting a frequency of the signal processed by the corresponding phase switcher and variable amplifier; and
   a combination section that combines outputs from the plurality of mixers corresponding to different ones of the plurality phase switchers and outputs a common signal corresponding to one antenna element of a plurality of antenna elements.

2. The wireless signal processing circuit according to claim 1, wherein the plurality of mixers comprise:
   a mixer that uses a first local signal to up-convert the frequency of the in-phase signal processed by the corresponding phase switcher and variable amplifier;
   a mixer that uses the first local signal to up-convert the frequency of the quadrature signal processed by the corresponding phase switcher and variable amplifier;
   a mixer that uses a second local signal to up-convert the frequency of the in-phase signal processed by the corresponding phase switcher and variable amplifier, the second local signal being rotated 90° in phase relative to the first local signal; and
   a mixer that uses the second local signal to up-convert the frequency of the quadrature signal processed by the corresponding phase switcher and variable amplifier.

3. The wireless signal processing circuit according to claim 1, wherein the plurality of mixers include:
   a mixer that uses a normal phase signal of a first local signal to up-convert the frequency of the in-phase signal processed by the corresponding phase switcher and variable amplifier, the first local signal being a differential signal, and a mixer that uses an antiphase signal of the first local signal to up-convert the frequency of the in-phase signal processed by the corresponding phase switcher and variable amplifier;
a mixer that uses the normal phase signal of the first local signal to up-convert the frequency of the quadrature signal processed by the corresponding phase switcher and variable amplifier, and a mixer that uses the antiphase signal of the first local signal to up-convert the frequency of the quadrature signal processed by the corresponding phase switcher and variable amplifier;
a mixer that uses a normal phase signal of a second local signal to up-convert the frequency of the in-phase signal processed by the corresponding phase switcher and variable amplifier, the second local signal being a differential signal that is rotated 90° in phase relative to the first local signal, and a mixer that uses an antiphase signal of the second local signal to up-convert the frequency of the in-phase signal processed by the corresponding phase switcher and variable amplifier; and
a mixer that uses the normal phase signal of the second local signal to up-convert the frequency of the quadrature signal processed by the corresponding phase switcher and variable amplifier, and a mixer that uses the antiphase signal of the second local signal to up-convert the frequency of the quadrature signal processed by the corresponding phase switcher and variable amplifier.

4. The wireless signal processing circuit according to claim 1, wherein the plurality of mixers include:
a mixer that uses a normal phase signal of a first local signal to up-convert the frequency of a normal phase signal of the in-phase signal processed by the corresponding phase switcher and variable amplifier, the in-phase signal being a differential signal and the first local signal being a differential signal, and a mixer that uses an antiphase signal of a second local signal to up-convert the frequency of the normal phase signal of the in-phase signal processed by the corresponding phase switcher and variable amplifier, the second local signal being a differential signal that is rotated 90° in phase relative to the first local signal;
a mixer that uses an antiphase signal of the first local signal to up-convert the frequency of an antiphase signal of the in-phase signal processed by the corresponding phase switcher and variable amplifier, and a mixer that uses a normal phase signal of the second local signal to up-convert the frequency of the antiphase signal of the in-phase signal processed by the corresponding phase switcher and variable amplifier;
a mixer that uses the normal phase signal of the first local signal to up-convert the frequency of a normal phase signal of the quadrature signal processed by the corresponding phase switcher and variable amplifier, the quadrature signal being a differential signal, and a mixer that uses the normal phase signal of the second local signal to up-convert the frequency of the normal phase signal of the quadrature signal processed by the corresponding phase switcher and variable amplifier; and
a mixer that uses the antiphase signal of the first local signal to up-convert the frequency of an antiphase signal of the quadrature signal processed by the corresponding phase switcher and variable amplifier, and a mixer that uses the antiphase signal of the second local signal to up-convert the frequency of the antiphase signal of the quadrature signal processed by the corresponding phase switcher and variable amplifier.

5. The wireless signal processing circuit according to claim 1, wherein the plurality of mixers include:
a mixer that uses a normal phase signal of a first local signal to up-convert the frequency of a normal phase signal of the in-phase signal processed by the corresponding phase switcher and variable amplifier, the in-phase signal being a differential signal and the first local signal being a differential signal, a mixer that uses an antiphase signal of the first local signal to up-convert the frequency of the normal phase signal of the in-phase signal processed by the corresponding phase switcher and variable amplifier, a mixer that uses a normal phase signal of a second local signal to up-convert the frequency of the normal phase signal of the in-phase signal processed by the corresponding phase switcher and variable amplifier, the second local signal being a differential signal that is rotated 90° in phase relative to the first local signal, and a mixer that uses an antiphase signal of the second local signal to up-convert the frequency of the normal phase signal of the in-phase signal processed by the corresponding phase switcher and variable amplifier;
a mixer that uses the normal phase signal of the first local signal to up-convert the frequency of an antiphase signal of the in-phase signal processed by the corresponding phase switcher and variable amplifier, a mixer that uses the antiphase signal of the first local signal to up-convert the frequency of the antiphase signal of the in-phase signal processed by the corresponding phase switcher and variable amplifier, a mixer that uses the normal phase signal of the second local signal to up-convert the frequency of the antiphase signal of the in-phase signal processed by the corresponding phase switcher and variable amplifier, and a mixer that uses the antiphase signal of the second local signal to up-convert the frequency of the antiphase signal of the in-phase signal processed by the corresponding phase switcher and variable amplifier;
a mixer that uses the normal phase signal of the first local signal to up-convert the a mixer that uses the normal phase signal of the first local signal to up-convert the frequency of a normal phase signal of the quadrature signal processed by the corresponding phase switcher and variable amplifier, the quadrature signal being a differential signal, a mixer that uses the antiphase signal of the first local signal to up-convert the frequency of the normal phase signal of the quadrature signal processed by the corresponding phase switcher and variable amplifier, a mixer that uses the normal phase signal of the second local signal to up-convert the frequency of the normal phase signal of the quadrature signal processed by the corresponding phase switcher and variable amplifier, and a mixer that uses the antiphase signal of the second local signal to up-convert the frequency of the normal phase signal of the quadrature signal processed by the corresponding phase switcher and variable amplifier; and
a mixer that uses the normal phase signal of the first local signal to up-convert the frequency of an antiphase signal of the quadrature signal processed by the corresponding phase switcher and variable amplifier, a mixer that uses the antiphase signal of the first local signal to up-convert the frequency of the antiphase signal of the quadrature signal processed by the corresponding phase switcher and variable amplifier, a mixer that uses the normal phase signal of the second local signal to up-convert the frequency of the antiphase signal of the quadrature signal processed by the corresponding phase switcher and variable amplifier, and a mixer that uses the antiphase signal of the second local signal to up-convert the frequency of the antiphase signal of the quadrature signal processed by the corresponding phase switcher and variable amplifier.

6. The wireless signal processing circuit according to claim 1, wherein the processing is applied to plurality of transmission signals with mutually different transmission destinations, and the plurality of phase switchers, the plurality of variable amplifiers and the plurality of mixers are respectively provided for each of the transmission signals.

7. The wireless signal processing circuit according to claim 6, wherein the respective transmission signals processed by the plurality of phase switchers, plurality of variable amplifiers and plurality of mixers are combined by the combination section and outputted as the common signal corresponding to the one antenna element of the plurality of antenna elements.

8. The wireless signal processing circuit according to claim 1, wherein the wireless signal processing circuit is configured to receive signals, and when signals are received:

each of the plurality of mixers down-converts a frequency of an input signal combining plurality of reception signals;

each of the plurality of phase switchers switches a phase rotation amount of the signal whose frequency has been down-converted by the corresponding mixer selectively in accordance with an arrival direction of the reception signal, and rotates the phase of the signal; and each of the plurality of variable amplifiers provided in respective correspondence with the plurality of phase switchers alters an amplitude of one of an input signal or an output signal of the corresponding phase switcher in accordance with the arrival direction of the reception signal.

9. A wireless device comprising a plurality of antenna elements and plurality of wireless signal processing circuits provided in respective correspondence with the plurality of antenna elements, each of the plurality of wireless signal processing circuits comprising:

a plurality of phase switchers provided on each of plurality of paths along which an in-phase signal is distributed and each of plurality of paths along which a quadrature signal is distributed, the in-phase signal being in phase with a transmission signal and the quadrature signal being rotated 90° in phase from the transmission signal, each phase switcher switching a phase rotation amount of the one of the in-phase signal and the quadrature signal that is distributed along the corresponding path selectively in accordance with a transmission direction of the transmission signal, and the phase switcher rotating the phase of the signal;

a plurality of variable amplifiers provided in respective correspondence with the plurality of phase switchers, each variable amplifier altering an amplitude of one of an input signal or an output signal of the corresponding phase switcher in accordance with the transmission direction of the transmission signal;

a plurality of mixers provided in respective correspondence with the plurality of phase switchers and the plurality of variable amplifiers, each mixer up-converting a frequency of the signal processed by the corresponding phase switcher and variable amplifier; and a combination section that combines outputs from the plurality of mixers corresponding to different ones of the plurality phase switchers and outputs a common signal corresponding to one antenna element of a plurality of antenna elements.

10. The wireless device according to claim 9, wherein the plurality of mixers comprise:

a mixer that uses a first local signal to up-convert the frequency of the in-phase signal processed by the corresponding phase switcher and variable amplifier;

a mixer that uses the first local signal to up-convert the frequency of the quadrature signal processed by the corresponding phase switcher and variable amplifier;

a mixer that uses a second local signal to up-convert the frequency of the in-phase signal processed by the corresponding phase switcher and variable amplifier, the second local signal being rotated 90° in phase relative to the first local signal; and a mixer that uses the second local signal to up-convert the frequency of the quadrature signal processed by the corresponding phase switcher and variable amplifier.

11. The wireless device according to claim 9, wherein the plurality of mixers comprise:

a mixer that uses a normal phase signal of a first local signal to up-convert the frequency of the in-phase signal processed by the corresponding phase switcher and variable amplifier, the first local signal being a differential signal, and a mixer that uses an antiphase signal of the first local signal to up-convert the frequency of the in-phase signal processed by the corresponding phase switcher and variable amplifier;

a mixer that uses the normal phase signal of the first local signal to up-convert the frequency of the quadrature signal processed by the corresponding phase switcher and variable amplifier, and a mixer that uses the antiphase signal of the first local signal to up-convert the frequency of the quadrature signal processed by the corresponding phase switcher and variable amplifier;

a mixer that uses a normal phase signal of a second local signal to up-convert the frequency of the in-phase signal processed by the corresponding phase switcher and variable amplifier, the second local signal being a differential signal that is rotated 90° in phase relative to the first local signal, and a mixer that uses an antiphase signal of the second local signal to up-convert the frequency of the in-phase signal processed by the corresponding phase switcher and variable amplifier; and a mixer that uses the normal phase signal of the second local signal to up-convert the frequency of the quadrature signal processed by the corresponding phase switcher and variable amplifier, and a mixer that uses the antiphase signal of the second local signal to up-convert the frequency of the quadrature signal processed by the corresponding phase switcher and variable amplifier.

12. The wireless device according to claim 9, wherein the plurality of mixers comprise:

a mixer that uses a normal phase signal of a first local signal to up-convert the frequency of a normal phase signal of the in-phase signal processed by the corresponding phase switcher and variable amplifier, the in-phase signal being a differential signal and the first local signal being a differential signal, and a mixer that uses an antiphase signal of a second local signal to up-convert the frequency of the normal phase signal of the in-phase signal processed by the corresponding phase switcher and variable amplifier, the second local signal being a differential signal that is rotated 90° in phase relative to the first local signal;

a mixer that uses an antiphase signal of the first local signal to up-convert the frequency of an antiphase signal of the in-phase signal processed by the corresponding phase switcher and variable amplifier, and a mixer that uses a normal phase signal of the second local signal to up-convert the frequency of the antiphase signal of the in-phase signal processed by the corresponding phase switcher and variable amplifier;

a mixer that uses the normal phase signal of the first local signal to up-convert the frequency of a normal phase signal of the quadrature signal processed by the corresponding phase switcher and variable amplifier, the quadrature signal being a differential signal, and a mixer that uses the normal phase signal of the second local signal to up-convert the frequency of the normal phase signal of the quadrature signal processed by the corresponding phase switcher and variable amplifier; and a mixer that uses the antiphase signal of the first local signal to up-convert the frequency of an antiphase signal of the quadrature signal processed by the corresponding phase switcher and variable amplifier, and a mixer that uses the antiphase signal of the second local signal to up-convert the frequency of the antiphase signal of the quadrature signal processed by the corresponding phase switcher and variable amplifier.

13. The wireless device according to claim 9, the plurality of mixers comprise:

a mixer that uses a normal phase signal of a first local signal to up-convert the frequency of a normal phase signal of the in-phase signal processed by the corresponding phase switcher and variable amplifier, the in-phase signal being a differential signal and the first local signal being a differential signal, a mixer that uses an antiphase signal of the first local signal to up-convert the frequency of the normal phase signal of the in-phase signal processed by the corresponding phase switcher and variable amplifier, a mixer that uses a normal phase signal of a second local signal to up-convert the frequency of the normal phase signal of the in-phase signal processed by the corresponding phase switcher and variable amplifier, the second local signal being a differential signal that is rotated 90° in phase relative to the first local signal, and a mixer that uses an antiphase signal of the second local signal to up-convert the frequency of the normal phase signal of the in-phase signal processed by the corresponding phase switcher and variable amplifier;

a mixer that uses the normal phase signal of the first local signal to up-convert the frequency of an antiphase signal of the in-phase signal processed by the corresponding phase switcher and variable amplifier, a mixer that uses the antiphase signal of the first local signal to up-convert the frequency of the antiphase signal of the in-phase signal processed by the corresponding phase switcher and variable amplifier, a mixer that uses the normal phase signal of the second local signal to up-convert the frequency of the antiphase signal of the in-phase signal processed by the corresponding phase switcher and variable amplifier, and a mixer that uses the antiphase signal of the second local signal to up-convert the frequency of the antiphase signal of the in-phase signal processed by the corresponding phase switcher and variable amplifier;

a mixer that uses the normal phase signal of the first local signal to up-convert the a mixer that uses the normal phase signal of the first local signal to up-convert the frequency of a normal phase signal of the quadrature signal processed by the corresponding phase switcher and variable amplifier, the quadrature signal being a differential signal, a mixer that uses the antiphase signal of the first local signal to up-convert the frequency of the normal phase signal of the quadrature signal processed by the corresponding phase switcher and variable amplifier, a mixer that uses the normal phase signal of the second local signal to up-convert the frequency of the normal phase signal of the quadrature signal processed by the corresponding phase switcher and variable amplifier, and a mixer that uses the antiphase signal of the second local signal to up-convert the frequency of the normal phase signal of the quadrature signal processed by the corresponding phase switcher and variable amplifier; and a mixer that uses the normal phase signal of the first local signal to up-convert the frequency of an antiphase signal of the quadrature signal processed by the corresponding phase switcher and variable amplifier, a mixer that uses the antiphase signal of the first local signal to up-convert the frequency of the antiphase signal of the quadrature signal processed by the corresponding phase switcher and variable amplifier, a mixer that uses the normal phase signal of the second local signal to up-convert the frequency of the antiphase signal of the quadrature signal processed by the corresponding phase switcher and variable amplifier, and a mixer that uses the antiphase signal of the second local signal to up-convert the frequency of the antiphase signal of the quadrature signal processed by the corresponding phase switcher and variable amplifier.

14. The wireless device according to claim 9, wherein the processing is applied to plurality of transmission signals with mutually different transmission destinations, and the plurality of phase switchers, the plurality of variable amplifiers and the plurality of mixers are respectively provided for each of the transmission signals.

15. The wireless device according to claim 14, wherein the respective transmission signals processed by the plurality of phase switchers, plurality of variable amplifiers and plurality of mixers are combined by the combination section and outputted as the common signal corresponding to the one antenna element of the plurality of antenna elements.

16. The wireless device according to claim 9, wherein the wireless device is configured to receive signals, and when signals are received:

each of the plurality of mixers down-converts a frequency of an input signal combining plurality of reception signals;

each of the plurality of phase switchers switches a phase rotation amount of the signal whose frequency has been down-converted by the corresponding mixer selectively in accordance with an arrival direction of the reception signal, and rotates the phase of the signal; and each of the plurality of variable amplifiers provided in respective correspondence with the plurality of phase switchers alters an amplitude of one of an input signal or an output signal of the corresponding phase switcher in accordance with the arrival direction of the reception signal.

* * * * *